United States Patent
Lee

(10) Patent No.: US 8,957,610 B2
(45) Date of Patent: *Feb. 17, 2015

(54) MULTI-PORT RECONFIGURABLE BATTERY

(76) Inventor: Chong Uk Lee, San Diego, CA (US)

(*) Notice: Subject to any disclaimer, the term of this patent is extended or adjusted under 35 U.S.C. 154(b) by 297 days.
This patent is subject to a terminal disclaimer.

(21) Appl. No.: 13/495,077

(22) Filed: Jun. 13, 2012

(65) Prior Publication Data
US 2012/0256568 A1    Oct. 11, 2012

Related U.S. Application Data

(63) Continuation-in-part of application No. 13/368,421, filed on Feb. 8, 2012, which is a continuation-in-part of application No. 12/459,531, filed on Jul. 2, 2009, now abandoned.

(51) Int. Cl.
| | | |
|---|---|---|
| *H02P 1/00* | (2006.01) | |
| *H02J 7/00* | (2006.01) | |
| *H02J 7/14* | (2006.01) | |
| *H02P 5/685* | (2006.01) | |
| *H02P 5/69* | (2006.01) | |
| *B60R 16/033* | (2006.01) | |

(Continued)

(52) U.S. Cl.
CPC ............ *H02J 7/0024* (2013.01); *H02J 7/1423* (2013.01); *H02P 5/685* (2013.01); *H02P 5/69* (2013.01); *B60R 16/033* (2013.01); *B60L 7/14* (2013.01); *B60L 11/007* (2013.01); *B60L 11/1803* (2013.01); *B60L 11/1816* (2013.01); *B60L 11/1864* (2013.01); *B60L 11/1866* (2013.01); *B60L 11/1877* (2013.01); *B60L 15/007* (2013.01); *B60L 15/20* (2013.01); *B60L 7/26* (2013.01); *B60L 15/2009* (2013.01); *Y02T 10/7005* (2013.01); *Y02T 10/7055* (2013.01);

(Continued)

(58) Field of Classification Search
USPC .......................... 318/139, 140; 320/116–121
See application file for complete search history.

(56) References Cited

U.S. PATENT DOCUMENTS

| | | |
|---|---|---|
| 3,923,116 A | 12/1975 | Thomspon et al. |
| 4,142,135 A | 2/1979 | Fujita |

(Continued)

FOREIGN PATENT DOCUMENTS

| | | |
|---|---|---|
| WO | 00/32917 | 6/2000 |
| WO | 2011/108925 | 9/2011 |

OTHER PUBLICATIONS

International Search Report for PCT/US2013/038110, dated Oct. 11, 2013, 1 page.

*Primary Examiner* — Rina Duda
(74) *Attorney, Agent, or Firm* — Lipsitz & McAllister, LLC

(57) ABSTRACT

A multi-port reconfigurable battery has at least one bank of statically joined series connected battery cells, each including a positive and negative pole connected through switches to respective output connections on at least one port. Processor controlled switches reconfigure the cells to provide power for electrical loads on one or more ports and simultaneously provide charging on one or more other ports. An alternative configuration divides groups of series connected cells into separate battery banks that permit other configurations. Ports are configurable to share one electrically common connection with other ports providing a simplified configuration (multi-tap reconfigurable battery). Applications include selectable motor speed control and battery regeneration schemes matched to motor output, and single or multiphase AC power output at selectable frequencies for use as an Uninterruptible Power Supply. The battery is also described as a power source for a forced-air induction system (e.g. electric supercharger) for a combustion engine.

49 Claims, 38 Drawing Sheets

(51) Int. Cl.
*B60L 7/14* (2006.01)
*B60L 11/00* (2006.01)
*B60L 11/18* (2006.01)
*B60L 15/00* (2006.01)
*B60L 15/20* (2006.01)
*B60L 7/26* (2006.01)

(52) U.S. Cl.
CPC .......... *B60L 2200/12* (2013.01); *B60L 2200/22* (2013.01); *B60L 2200/34* (2013.01); *B60L 2200/36* (2013.01); *B60L 2210/10* (2013.01); *B60L 2220/46* (2013.01); *B60L 2240/421* (2013.01); *B60L 2240/423* (2013.01); *B60L 2240/545* (2013.01); *B60L 2240/547* (2013.01); *B60L 2240/549* (2013.01); *B60L 2260/28* (2013.01); *Y02T 10/7088* (2013.01); *Y02T 10/7061* (2013.01); *Y02T 10/7216* (2013.01); *Y02T 10/642* (2013.01); *Y02T 90/121* (2013.01); *Y02T 90/14* (2013.01); *Y02T 90/127* (2013.01)
USPC ............................ 318/139; 318/140; 320/116

(56) References Cited

U.S. PATENT DOCUMENTS

| | | |
|---|---|---|
| 4,313,080 A | 1/1982 | Park |
| 4,894,764 A | 1/1990 | Meyer et al. |
| 4,916,329 A | 4/1990 | Dang et al. |
| 5,341,075 A | 8/1994 | Cocconi |
| 5,773,962 A | 6/1998 | Nor |
| 5,965,996 A * | 10/1999 | Arledge et al. ............... 320/116 |
| 6,047,787 A | 4/2000 | Deng et al. |
| 6,104,165 A | 8/2000 | Miyamoto et al. |
| 6,230,496 B1 | 5/2001 | Hofmann et al. |
| 6,255,826 B1 * | 7/2001 | Ohsawa et al. ............... 324/426 |
| 6,430,692 B1 | 8/2002 | Kimble et al. |
| 6,441,581 B1 | 8/2002 | King et al. |
| 6,462,510 B1 * | 10/2002 | Takada et al. ............... 320/116 |
| 6,627,345 B1 | 9/2003 | Zemlok et al. |
| 6,646,442 B2 * | 11/2003 | Katoh ............................ 324/433 |
| 6,882,129 B2 * | 4/2005 | Boskovitch et al. ........... 320/119 |
| 6,909,959 B2 | 6/2005 | Hallowell |
| 6,977,482 B2 | 12/2005 | Popescu-Stanesti et al. |
| 7,005,830 B2 | 2/2006 | Moore et al. |
| 7,075,194 B2 | 7/2006 | Weidenheimer et al. |
| 7,138,775 B2 * | 11/2006 | Sugimoto et al. ............. 318/140 |
| 7,208,894 B1 | 4/2007 | Earle |
| 7,242,159 B2 | 7/2007 | Ishikawa et al. |
| 7,456,521 B2 | 11/2008 | Weidenheimer et al. |
| 7,893,561 B2 | 2/2011 | Weidenheimer et al. |
| 2001/0035696 A1 | 11/2001 | Knowles et al. |
| 2003/0071523 A1 | 4/2003 | Silverman |
| 2005/0206331 A1 | 9/2005 | Donnelly |
| 2006/0076171 A1 | 4/2006 | Donnelly et al. |
| 2007/0052295 A1 | 3/2007 | Frucht |
| 2007/0062744 A1 * | 3/2007 | Weidenheimer et al. .... 180/65.2 |
| 2007/0080662 A1 | 4/2007 | Wu |
| 2009/0160247 A1 | 6/2009 | Nakamura et al. |
| 2011/0018352 A1 | 1/2011 | Lai |
| 2013/0049677 A1 | 2/2013 | Bouman |

* cited by examiner

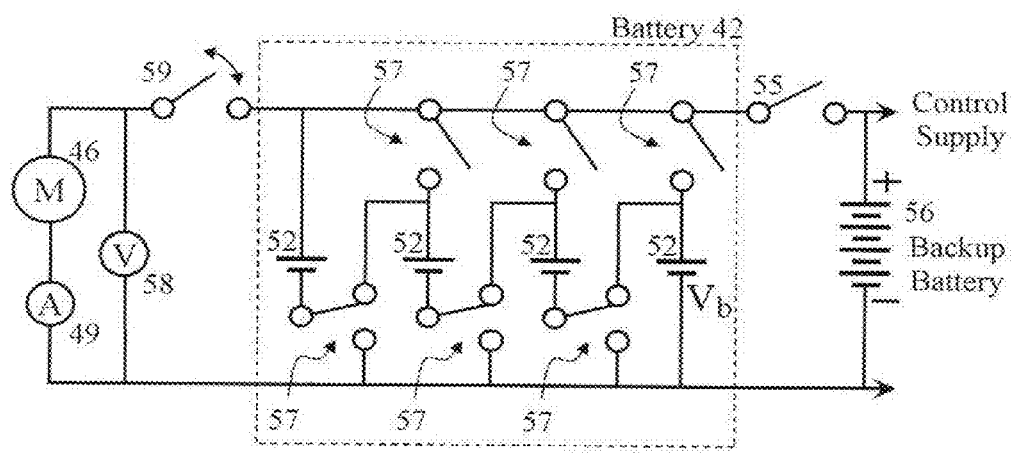
*Figure 5a* : Driving mode (series cells)
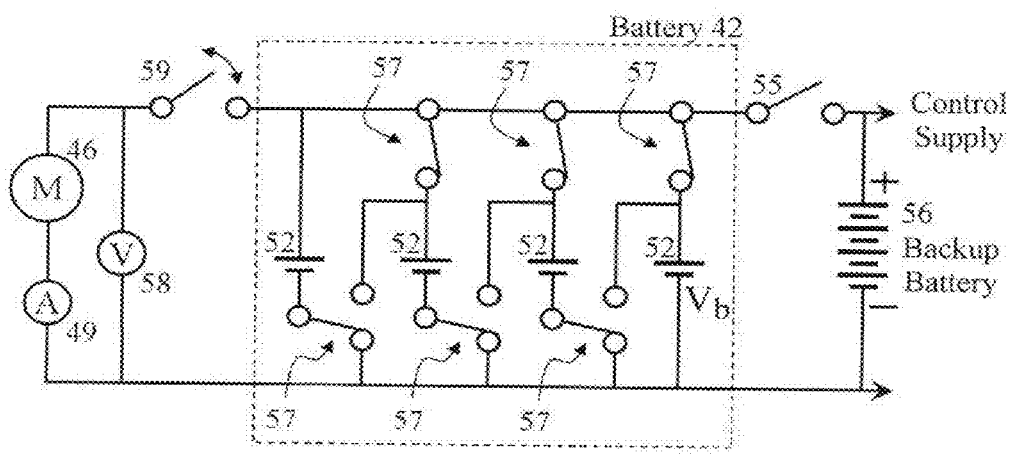
*Figure 5b* : Regenerative mode (parallel cells)

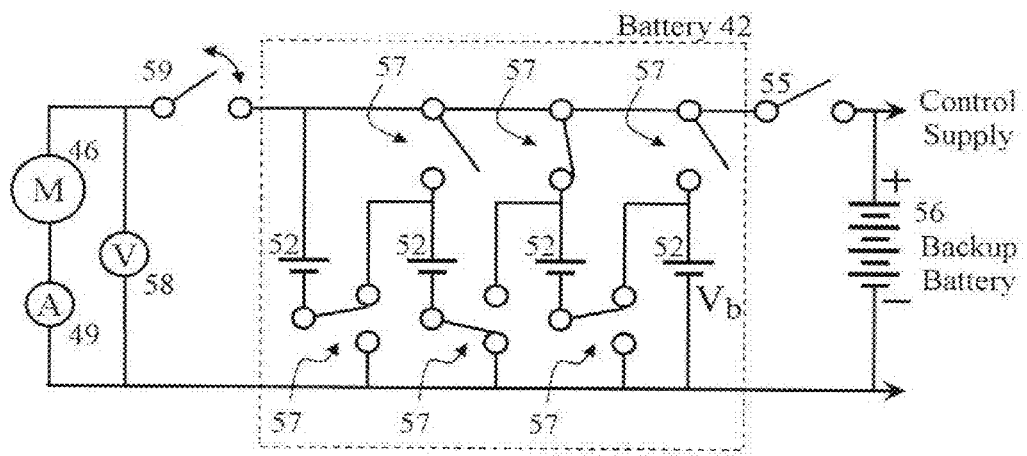
*Figure 5c* : Example of Intermediate Voltage
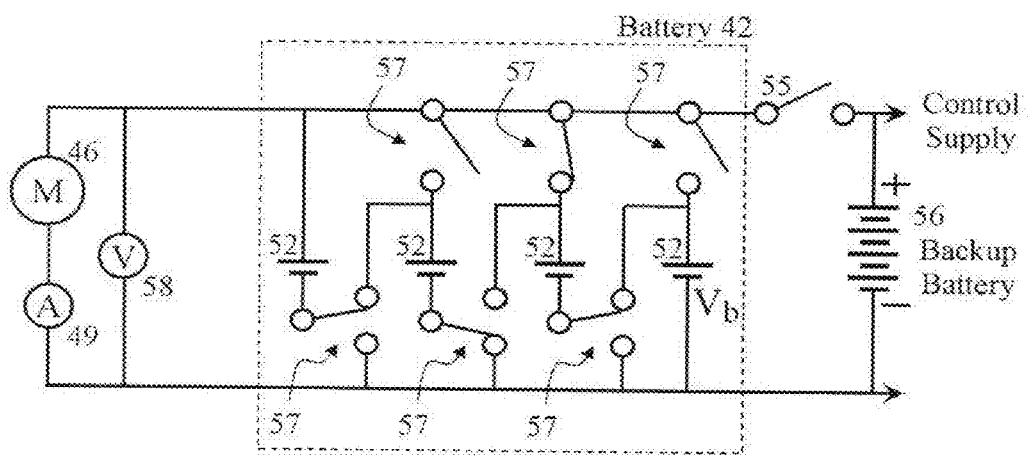
*Figure 6*

*Figure 7a* : Parallel motors
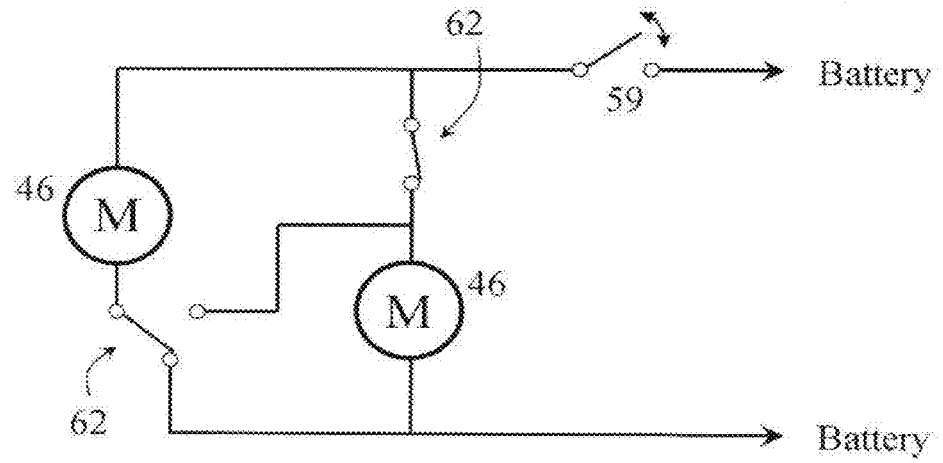
*Figure 7b* : Serial motors
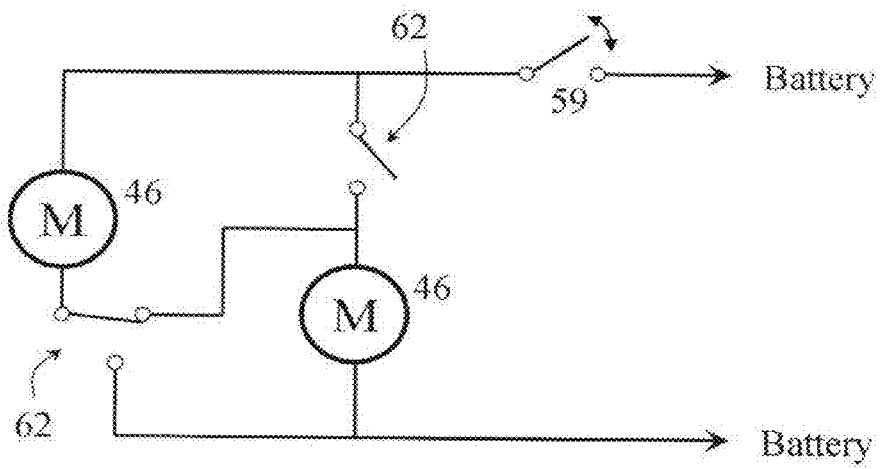

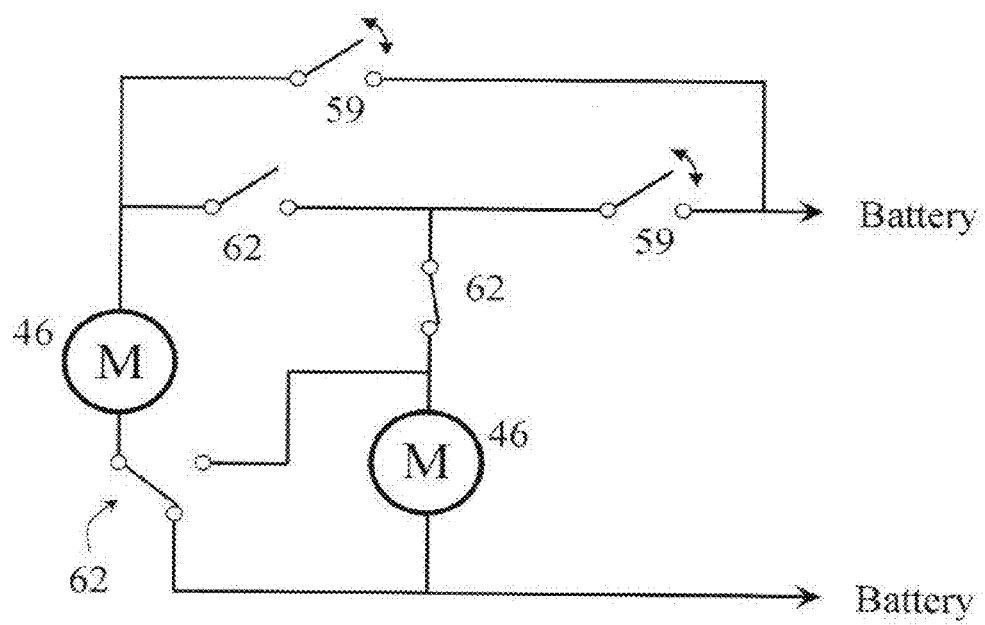
*Figure 8*: Variable driving / braking between motors

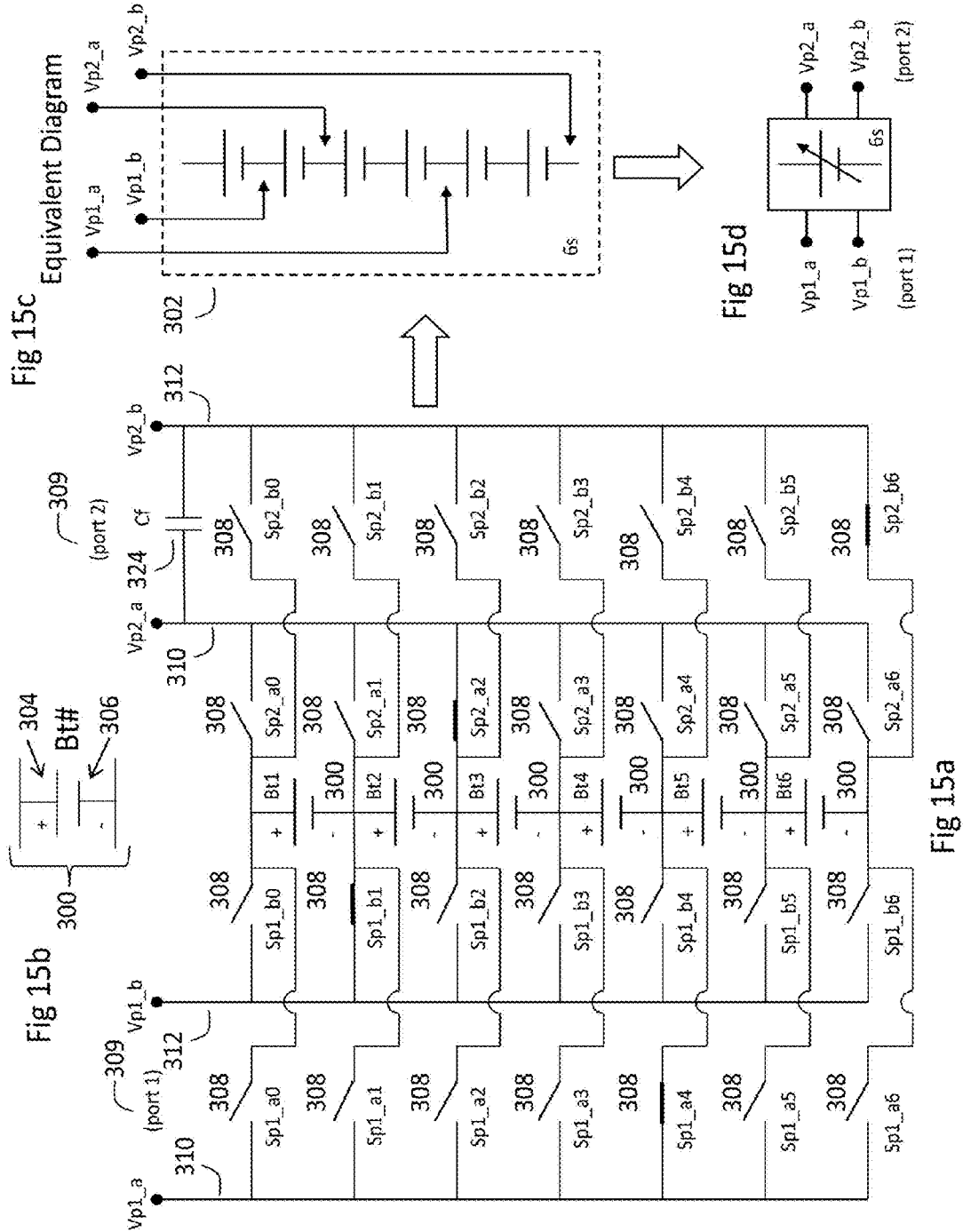

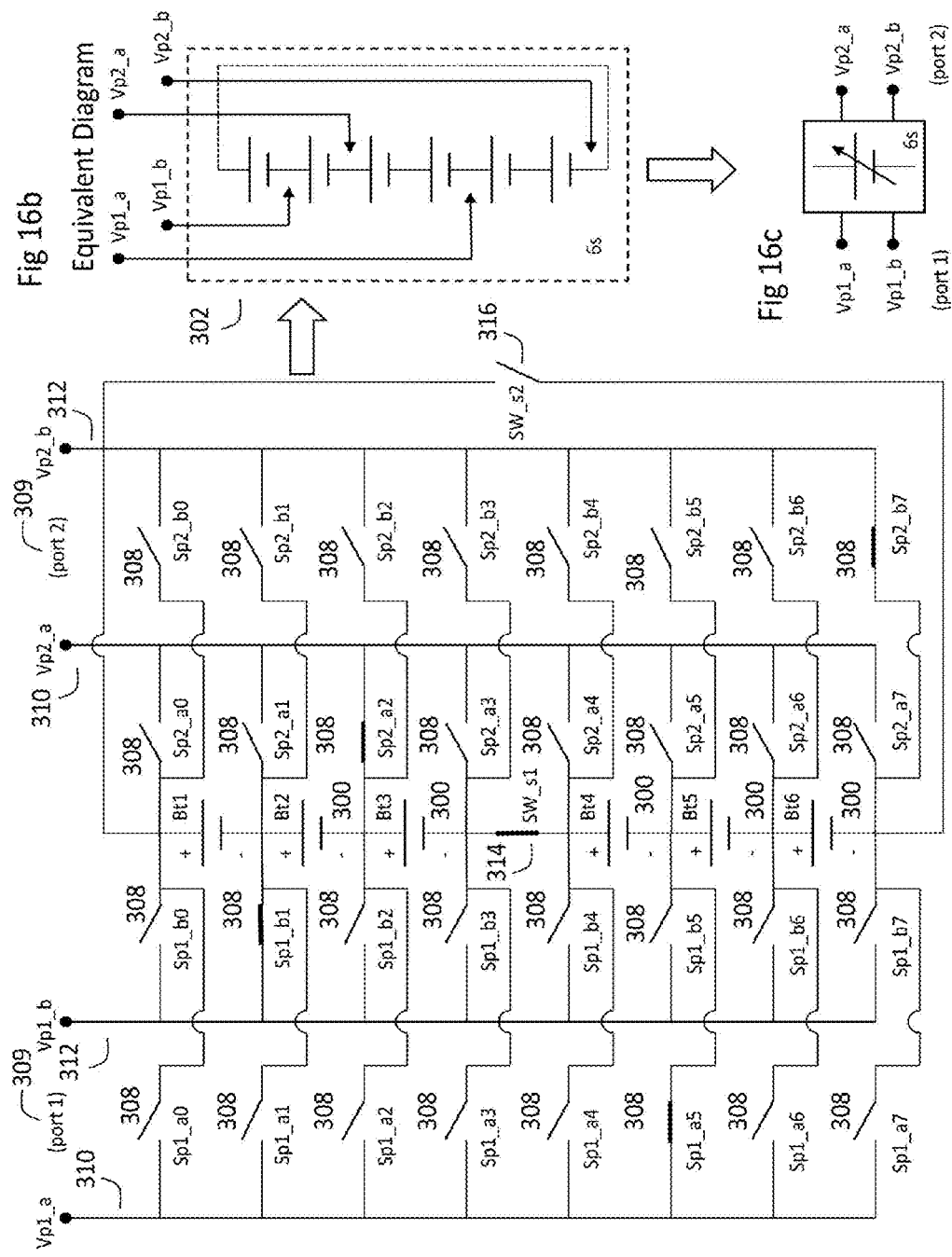

Fig 17b Equivalent Diagram

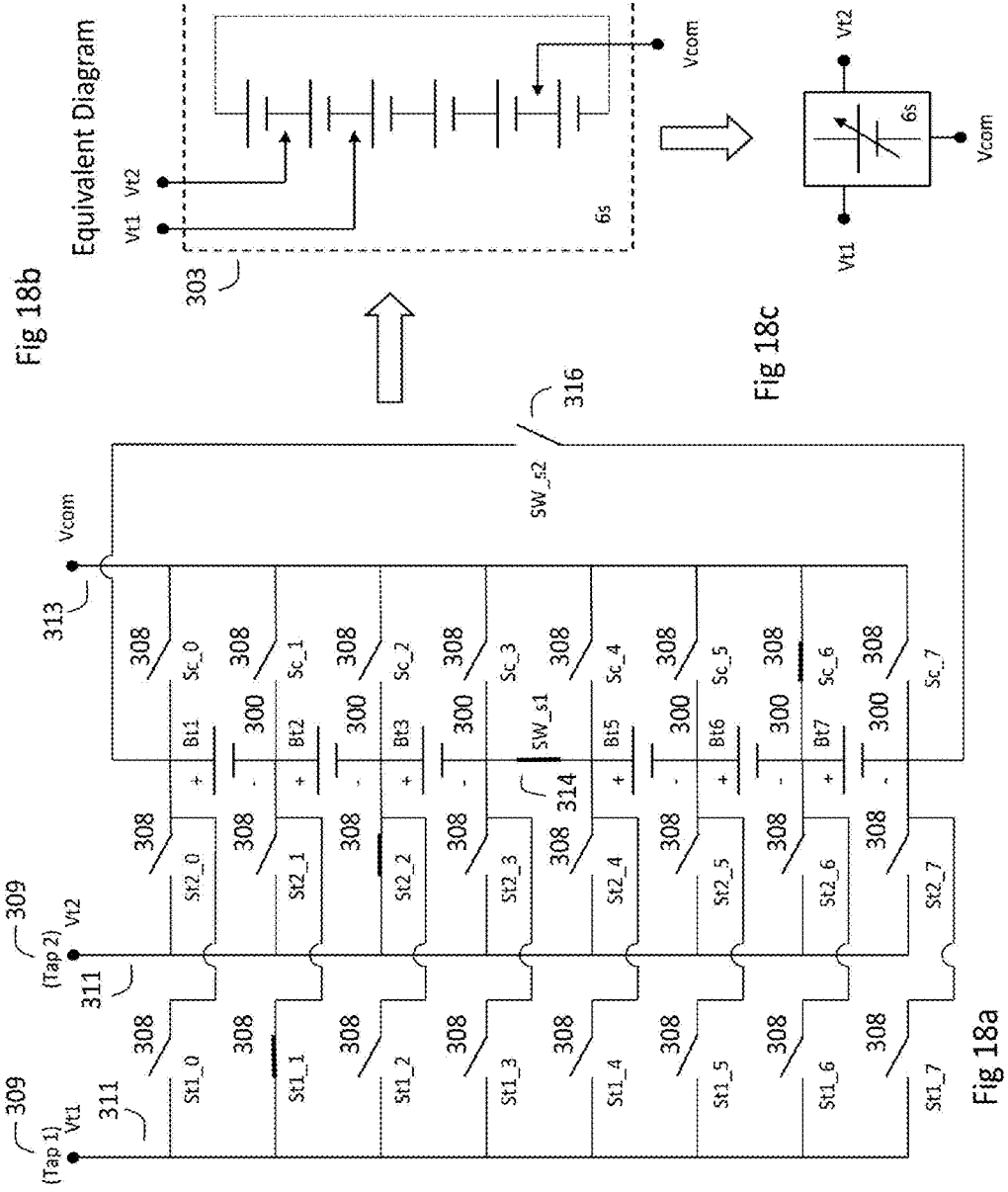

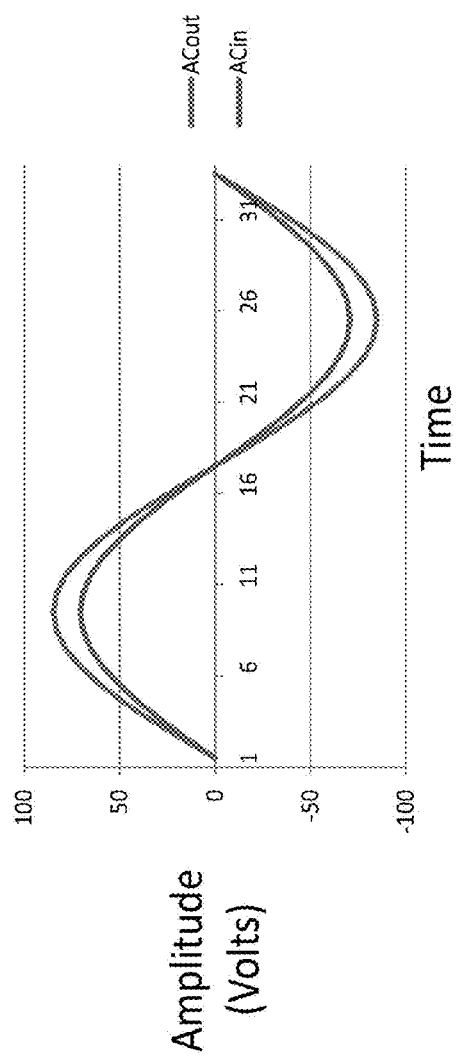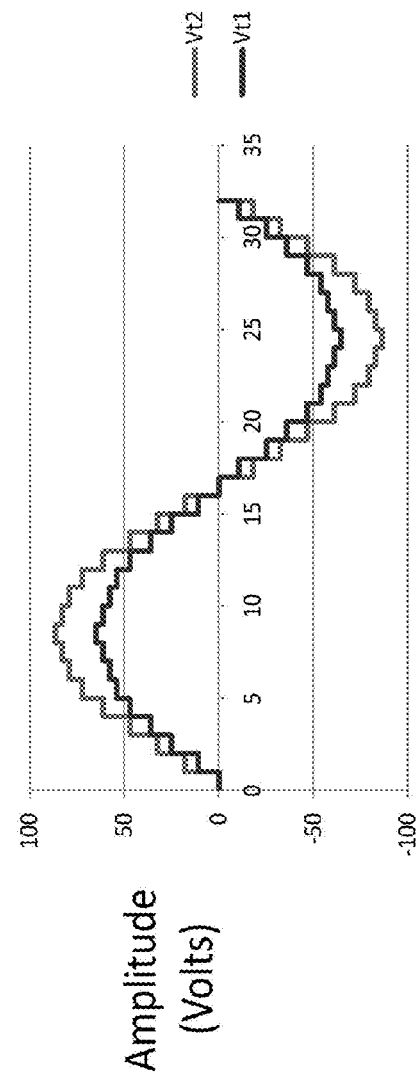

MULTI-PORT RECONFIGURABLE BATTERY

This application is a continuation-in-part of commonly owned, U.S. patent application Ser. No. 13/368,421 filed on Feb. 8, 2012, which was a continuation-in-part of commonly owned U.S. patent application Ser. No. 12/459,531 filed on Jul. 2, 2009, now abandoned, the entire contents of both of which are incorporated herein by reference.

BACKGROUND OF THE INVENTION

The present invention relates to the field of electric batteries designed for use with electric motors which are rechargeable using regenerative charging, such as batteries for electric bicycles. More specifically, the present invention relates to a reconfigurable battery, reconfigurable electric motors for use with such a reconfigurable battery, methods for reconfiguring a battery for driving variable electrical loads, and methods for reconfiguring a battery for charging and for reconfiguring electric motors for charging a battery.

The present invention is described in connection with electric bicycles where a rechargeable battery drives an electric motor. In prior art electric bicycles, in some instances the current from the battery is regulated by a speed controller that controls the motor which provides assistance to the rider. In other instances, where the rider wants to slow down or brake going downhill, the motor acts as a generator and supplies the current back to the battery, thereby achieving regenerative braking that recovers part of the energy that would otherwise be lost when using a mechanical brake alone.

An electric motor typically uses a set of magnets, for example, electro magnets and permanent magnets. As the motor turns, the attractive and repulsive forces of these magnets are regulated electrically such that the motor turns continuously in the desired direction. This could be done by electro-mechanical switches (e.g. commutators), or could be done by solid state switches (e.g. FETs—Field Effects Transistors). FIG. 1 shows an example of a motor 12 connected to a battery 10. As the current $I_m$ flows into the motor 12 and the motor turns, the motor generates a back EMF (Electro Motive Force) which is a voltage roughly proportional to the speed of the motor 12. The current $I_m$ is defined as $(V_B - V_M)/(R_M + R_B)$ where $R_M$ is the internal resistance of the motor 12 and $R_B$ is the internal resistance of the battery. Given a fixed applied voltage $V_B$ (e.g. from the battery 10) the back EMF reduces the amount of current that flows into the motor 12, because the current flow is proportional to the difference between the motor voltage $V_M$ (back EMF) and the battery voltage $V_B$. For example, if the motor 12 is turning (with some outside assistance) at a rate such that the back EMF equals the battery voltage $V_B$, than there will be no current flow. If the motor 12 turns faster than this such that the back EMF is higher than the battery voltage $V_B$, then the current flows the other way, thereby recharging the battery 10. One extreme case is a stall, when the motor 12 is at rest. In such a case, the back EMF is zero since the motor is at rest, the current flow from the battery 10 will be at its maximum, and the motor 12 will produce its highest torque.

When the bicycle is moving and the motor 12 produces a finite back EMF, the motor 12 can be used as a generator to recharge the battery 10, while achieving a desired level of braking. In order to achieve this, the voltage out of the motor 12 is increased to a level higher than the battery 10 using a device known as an inverter.

A block diagram of a typical prior art electric bicycle system without regenerative braking is shown in FIG. 2. A battery 10 provides current to a motor 12 though a speed controller 11. The speed controller 11 governs the current flow to the motor 12, thereby controlling its speed. The speed controller 11 may be set to a desired speed by a rider using a control knob 13.

A block diagram of a further prior art electric bicycle system that provides regenerative braking is shown in FIG. 3. FIG. 3 is similar to FIG. 2 but also includes an inverter 14 in parallel with the controller 11. A switch 15 is provided for coupling the motor 12 to the controller 11 (in a drive mode) or the inverter 14 (in a braking mode). During the braking mode, current is generated by the motor 12 and passed to the battery 10 by the inverter 14, in order to charge the battery.

It should be noted that a practical system involves two distinct operations, one that drives the motor and the bicycle wheel(s) by supplying current from the battery to the motor(s), and another that uses the current from the motor(s) to charge the battery to achieve regenerative braking, thereby slowing down the bicycle. It should be further apparent from FIG. 3 that in order to recharge the battery, one needs an inverter that increases the voltage from the motor to a value higher than the battery voltage, in order for the current to flow back into the battery.

For a typical rechargeable battery, the charging voltage must be higher than the battery voltage. The higher the charging voltage relative to the battery voltage, the more current flows into the battery. Controlling the charging voltage is one of the ways to control the rate of recharging, as well as the rate of braking. Another way to control the recharging rate is pulse width modulation (PWM), where a switch between the charging source and the battery regulates an on-off duty cycle. Of course, the charging voltage still needs to be higher than the battery voltage for such a device to work.

In most electric vehicles such as electric bicycles and electric cars that utilize regenerative braking, the electrical system typically consists of several subsystems, namely a motor, a speed controller, an inverter, and a battery. Sometimes the speed controller regulates both the drive and braking current via PWM. Potentially, a clever inverter design could regulate both driving and braking by regulating the voltage to the motor for driving, and regulating the voltage to the battery for regenerative braking, thereby eliminating the need for a separate speed controller.

However, an inverter is not an easy device to design or cheaply produce, as it must handle a large amount of current (especially during quick braking) and sometimes a high output voltage, while its input voltage can fluctuate over a wide range. The input voltage in this case is the back EMF from the motor, typically close to zero when the bicycle is coming to a stop, and close to the maximum battery voltage when the bicycle is coasting on a level ground at its maximum speed (usually the battery voltage limits the top speed).

Also an inverter typically achieves its functionality using rapid switching devices. One inverter design could turn the DC current from the motor to AC current first, increase the voltage using a step-up transformer, and convert the AC current back to DC in order to recharge the battery. Another inverter design could use temporary energy storage elements such as capacitors and inductors in a charge-pump configuration in order to raise the voltage. The switching frequency involved is typically in the order of 1-100 KHz. In most of the known inverter designs, the energy loss is significant, and the cost is very high due to the high current requirement (100 Amps or more) in addition to the weight. For this reason, only a small percentage of electric bicycle products incorporate regenerative braking in their design.

It would be advantageous to provide a battery and/or electric motor configuration that provides driving and regenerative braking, for example in an electric bicycle, over a reasonable range of operations without the need for an inverter.

It would also be useful to provide a reconfigurable battery and battery control system that provides duty cycle modulation of an array of battery cells for intermediate output voltage control without incurring large switching losses, while simultaneously reducing switching induced transient signals.

It would also be beneficial to provide a reconfigurable battery and battery control system that provides multiple ports for simultaneous charging and discharging of an array of battery cells. A reconfigurable battery that provides various electrical waveform patterns, frequencies, and phases would also be useful in electrical and electronics applications such as Uninterruptible Power Supplies (UPS) and in combustion engine applications such as electrical motor powered forced air induction systems.

Forced-air induction systems increase combustion engine performance by increasing intake air pressure, allowing a greater quantity of fuel to be mixed or injected into the engine with the increased air. This increased fuel and air results in increased combustion energy and increased engine power. Increased air pressure is referred to as "boost". Forced air induction is also useful while operating combustion engines in vehicles and aircraft at higher altitudes to compensate for reduced air pressure at high altitude. Forced-air induction systems such as superchargers and turbochargers contain fans or air compressors that function to increase pressure. Drive power for supercharger systems can be mechanical, e.g. combustion engine crankshaft driven, exhaust gas driven, e.g. a turbocharger, or electrically driven, e.g. a compressor system consisting of an electric motor combined with an axial-flow or radial-flow fan.

Advantages of the Electrical Supercharger (ESC) include lack of parasitic power drain on the engine during application of boost. This is because ESC drive power comes from stored energy within the battery, or banks of batteries, and does not immediately harness engine output during acceleration as does a mechanical supercharger or turbocharger. Also, an ESC provides instant boost independent of engine RPM, because the electric motor provides its highest motor acceleration (current) at low electric motor RPM. Exhaust driven turbochargers experience a delay while the turbocharger waits for engine RPM and exhaust gas pressure to increase sufficiently to yield adequate boost ("turbo lag"). ESC's do not experience this delay. Exhaust gas driven turbochargers use a waste gate mechanism to siphon off unusable exhaust pressure. This device is not used by an ESC since only needed power is applied to the ESC during operation, saving weight, cost and design complexity. Also, for good drivability, high boost at low to mid RPM is desirable, and since boost from an ESC is independent of engine RPM, boost can be provided at the low to mid engine RPM range. An ESC produces enhanced engine torque at low engine RPM that leads to low average engine RPM for the same drivability as higher revving engines, thereby providing better gas mileage.

Boost requirements for significant engine performance gains depend on various engine characteristics including displacement, and compression ratio, but generally about 5 pounds per square inch (psi) of boost is needed. Although mechanically driven superchargers extract engine power (typically 10%-20%) while providing boost, the automotive industry has favored both mechanical and exhaust driven systems over electrical systems because the energy requirement to drive a supercharger exceeds typically sized vehicle alternators and lead-acid batteries. Electrical superchargers that use high capacity battery banks have been designed for experimental and racing applications but these battery banks need recharging prior to each use. Other forced-air induction designs using stock vehicle batteries and alternators are marketed however they have not been powerful enough for any meaningful improvement in engine performance because of insufficient electrical power to drive the motor/blower.

A battery design is needed that will supply the power requirement to drive an ESC and overcome the limitations of a typically sized automotive alternator to supply peak power requirements. Also needed is a design that will allow efficient battery charging using typical automobile alternators that supply voltages lower than the voltage needed to run an ESC. The multi-port reconfigurable battery of the present invention provides such a design.

The methods and apparatus of the present invention provide a series connected reconfigurable battery having these and other advantages.

SUMMARY OF THE INVENTION

The present invention relates to reconfigurable batteries, e.g., for use in the drive systems of electric vehicles such as bicycles, automobiles, trucks, locomotives, utility carts, and the like, as well as providing backup power to electrical and electronic devices. The battery in it's various configurations herein described is also referred to as a variable voltage battery (VVB). In particular, the present invention relates to a multi-port reconfigurable battery with a plurality of series connected battery cells for use in an electric vehicle drive system, and an uninterruptible power supply (UPS) and methods for reconfiguring a battery for charging and discharging through variable electrical loads.

In accordance with the invention, a multi-port reconfigurable battery supplying variable voltage is presented. The battery includes at least one bank of a statically joined plurality of series connected battery cells, where each battery cell is composed of a first voltage pole and a second voltage pole. The battery also includes a plurality of ports, each port including at least one processor controlled switch electrically connected between the first voltage pole of each of the battery cells and a first electrical output connection, and at least one processor controlled switch electrically connected between the second voltage pole of each of the battery cells and a second electrical output connection. The processor controlled switches are adapted to electrically reconfigure the battery cells by coupling a first voltage pole of one of the battery cells to the first electrical output connection and a second voltage pole of one of the battery cells to the second electrical output connection to provide a reconfigurable battery output voltage between the first and second electrical output connections. Furthermore, for each port, at least one switch may be electrically connected between the first voltage pole of a beginning battery cell in the statically joined plurality of series connected battery cells and the second electrical output connection. Also, for each port, at least one switch may be electrically connected between the second voltage pole of an end battery cell in the statically joined plurality of series connected battery cells and the first electrical output connection.

The multi-port reconfigurable battery output voltage is approximately equal to the voltage summation of the electrically reconfigured battery cells, and is in a range between zero volts and a maximum absolute value of an output voltage for the statically joined plurality of series connected battery cells.

In another embodiment of the present invention, a plurality of banks of statically joined plurality of series connected battery cells connect to one another in a parallel configuration.

In another embodiment, the battery can be formed by a series joining of a first bank of statically joined plurality of series connected battery cells to a second bank of statically joined plurality of series connected battery cells. In this configuration, a first intermediate processor controlled switch is connected between a second voltage pole of an end positioned battery cell in a first bank and a first voltage pole of a beginning positioned battery cell in a second bank. Also, a second intermediate processor controlled switch is connected between a first voltage pole of a beginning positioned battery cell in a first bank and a second voltage pole of an end positioned battery cell in a second bank. For each port of the battery, there is a connection of the first electrical output connection of the first bank to the first electrical output connection of the second bank. There is also a connection of the second electrical output connection of the first bank to the second electrical output connection of the second bank. However, the first intermediate processor controlled switch and the second intermediate processor controlled switch cannot simultaneously be in a closed state. Also, the second bank of statically joined plurality of series connected battery cells may be substituted by a single battery cell.

In a specialized configuration of the multi-port reconfigurable battery, the second electrical output connection is a common connection for all ports. This configuration is referred to in this application as a multi-tap configuration of the reconfigurable battery.

In another embodiment, the multi-port reconfigurable battery may include one or more inductive or capacitive elements for voltage or current waveform filtering. Also, a voltage monitoring means and/or a current monitoring means may be provided that includes a battery condition control system.

The switches and intermediate switches that make up the multi-port reconfigurable battery can be solid state and/or mechanical switches. Also, the first voltage pole is typically at a higher voltage potential than the second voltage pole.

The multi-port reconfigurable battery can provide energy for an electrical load such as vehicle with at least one electrical motor, electronic equipment, or a computer. Such a vehicle can be an electric bicycle, an electric scooter, an electric vehicle, a hybrid automobile, a hybrid truck, an electric powered wheelchair, and an electric powered golf cart.

The battery can also provide electrical power of either alternating current (AC) or direct current (DC) to an electrical load, where the AC or DC current can be any combination of constant, periodic or arbitrary waveforms. Also, the alternating current (AC) can be single frequency waveforms or variable frequency waveforms, and either single phase waveforms, or multi-phase waveforms. The battery can simultaneously provide alternating current (AC) from one or more ports and direct current (DC) from one or more other ports of the battery. Furthermore, the battery can be configured to simultaneously provide electrical power to a plurality of electrical loads by connecting each electrical load to a separate battery port.

The multi-port reconfigurable battery can be charged by connecting at least one AC or at least one DC power source to the battery, and the power source can be, for example, a generator, a main AC line, or a vehicle electrical system adapted for regenerative charging. The input voltage of the power source for charging the battery is variable from a voltage about equal to one of the battery cells that make up the battery to a voltage equal to about the sum of all battery cells in the battery. As such, the battery can be configured to simultaneously charge a portion of the battery cells while discharging an alternate portion of battery cells by connecting a power source to one or more ports and simultaneously connecting at least one electrical load to at least one other port. One example application of this design is where the battery functions as an uninterruptible power supply (UPS). As such, the multi-port reconfigurable battery includes at least one switch for regulating power entering the battery, at least one switch for regulating power exiting the battery; and a controller for monitoring voltage, current and regulating at least one processor controlled switch.

The UPS further includes a switch for allowing power to bypass the battery to supply power to a connected electrical load. A line filter for conditioning power exiting from the uninterruptible power supply can be added.

The present invention also includes a method for reconfiguring a multi-port battery, where for each port of a plurality of ports, a portion of a statically joined plurality of series connected battery cells is arranged into a first configuration adapted to provide a first battery voltage, and at least a portion of those statically joined plurality of series connected battery cells is reconfigured into a second configuration adapted to provide a second battery voltage. The reconfiguring step can include closing a first processor controlled switch to electrically couple a first voltage pole of a battery cell in the statically joined plurality of series connected battery cells to a first electrical output connection, and closing a second processor controlled switch to electrically couple a second voltage pole of a battery cell in the statically joined plurality of series connected battery cells to a second electrical output connection.

Further, when reconfiguring a series joined first bank of statically joined plurality of series connected battery cells to a second bank of statically joined plurality of series connected battery cells, the method includes the step of alternatively closing a first intermediate processor controlled switch connected between a second voltage pole of an end positioned battery cell in the first bank and a first voltage pole of a beginning positioned battery cell in the second bank, or a second intermediate processor controlled switch connected between a first voltage pole of a beginning positioned battery cell in the first bank and a second voltage pole of an end positioned battery cell in the second bank.

For both single bank and multiple bank multi-port reconfigurable batteries, the processor controlled switches can include either pulse width modulation processor controlled switches or pulse density modulation processor controlled switches. Also, the first voltage pole of a battery cell is typically at a higher voltage potential than the second voltage pole.

Also, for both single bank and multiple bank multi-port reconfigurable batteries, the method can include producing an intermediate output voltage where the second processor controlled switch is alternatively switched by pulse width modulation switching or pulse density modulation switching between a first configuration of series connected battery cells exhibiting a first voltage and a second configuration of series connected battery cells exhibiting a second voltage.

For both single bank and multiple bank multi-port reconfigurable batteries, the method of configuring the multi-port battery includes simultaneously providing energy to at least one electrical load and receiving energy for recharging. The electrical load can be a vehicle with at least one electric motor, electronic equipment, or a computer. An example method for recharging the multi-port battery includes connecting at least one power source to the battery, where the power source may provide regenerative charging via a vehicle braking action that activates at least one electric motor, inducing current flow to the battery.

For both single bank and multiple bank multi-port reconfigurable batteries, the method can also include the steps of monitoring voltage and current of battery power discharge, monitoring voltage and current of battery power charge, and controlling the reconfiguration based on this monitoring. An auxiliary power source for performing the monitoring, controlling, and reconfiguring of a plurality of series connected battery cells can also be provided. The method also applies when joining the second electrical output connection for each port of the plurality of ports to a common electrical connection.

Also provided is an electronic controller enabled method of forming a periodic alternating current waveform exhibiting a voltage pattern including the following steps: a) selecting a waveform peak-to-peak voltage amplitude less than or equal to twice the maximum output voltage deliverable from a reconfigurable multi-port battery, b) selecting a wave period, c) selecting an output port, d) dividing the selected wave period into a series of contiguous and realizable time increments, e) calculating and assigning to each time increment in the series of contiguous and realizable time increments, an incremental voltage step such that the concatenation of all the incremental voltage steps approximates the voltage pattern of the periodic alternating current waveform, f) selecting an initial time increment from the series of contiguous and realizable time increments. Thereafter, g) configuring the reconfigurable multi-port battery to output the incremental voltage step associated with the time increment on an output port, h) waiting until the time increment has elapsed, i) selecting a next time increment in the series of contiguous time increments, j) repeating the configuring step g), repeating the waiting step h) and repeating the selecting step i) until the wave period has elapsed. Finally, k) continuing to form the periodic waveform determined by steps f) through j) until an instruction to change or halt the steps is received by the controller.

The method can also include applying at least one of an inductive or a capacitive element for voltage and/or current waveform filtering.

The method can support creating a multiphase alternating current waveform by including the steps of: a) initiating the method of forming a periodic alternating current waveform on a separate output port, b) waiting 1/p time period of a waveform cycle, and c) repeating steps a) and b) an additional p−1 times, where p is an integer greater than one and corresponds to the number of phases in the multiphase waveform created.

The method of forming a periodic alternating current waveform can be applied to an example electrical device. The multi-port reconfigurable battery can be configured to operate as an uninterruptible power supply by including the steps of sensing a reduced main voltage condition or a failed main voltage condition, forming a periodic alternating current waveform using the steps outlined above, and applying the periodic alternating current waveform to the output port. The uninterruptible power supply is configured to supply nominal voltage under reduced main voltage conditions or under loss of main voltage.

The multi-port reconfigurable battery can also be used to drive an electrical load consisting of one or more electric motors used in a forced-air induction system adapted for a combustion engine. The electric motor can be a single-phase electric motor or a three-phase electric motor. The battery functions as a power supply for the electric motor driven forced-air induction system. The battery includes at least one switch for regulating power entering the battery, at least one switch for regulating power exiting the battery, a controller for monitoring voltage, current and regulating at least one processor controlled switch, and a controller for monitoring performance of the motor driven forced-air induction system and the combustion engine and regulating power to at least one electric motor of the forced-air induction system.

A method of configuring a multi-port reconfigurable battery to power an electric motor driven forced-air induction system using an electronic controller is disclosed. Control steps include sensing a throttle condition of a combustion engine and initializing an instruction to activate the electric motor driven forced-air induction system for a predetermined throttle condition. The method includes the steps of sensing a throttle condition of a combustion engine and initializing an instruction to activate the electric motor driven forced-air induction system for a predetermined throttle condition. Other steps include determining voltage required by the electric motor driven forced-air induction system, and configuring the multi-port reconfigurable battery to deliver the voltage required to the electric motor driven forced-air induction system. Additional steps include continuously monitoring power delivery by the multi-port reconfigurable battery, and reconfiguring the multi-port reconfigurable battery if the battery voltage is less than the voltage required or the controller otherwise interrupts the instruction.

Recharging of the multi-port reconfigurable battery is accomplished by connecting at least one power source to the battery, where the power source can be at least one of an alternator, or generator.

BRIEF DESCRIPTION OF THE DRAWINGS

The present invention will hereinafter be described in conjunction with the appended drawing figures, wherein like reference numerals denote like elements, and:

FIG. 5a shows an example embodiment of a reconfigurable battery in a first battery cell configuration in accordance with the present invention;

FIG. 5b shows an example embodiment of a reconfigurable battery in a second battery cell configuration in accordance with the present invention;

FIG. 5c shows an example embodiment of a reconfigurable battery in a further battery cell configuration in accordance with the present invention;

FIG. 6 shows a further example embodiment of a reconfigurable battery in accordance with the present invention;

FIG. 7a shows an example embodiment of a reconfigurable electric motor assembly in a first configuration in accordance with the present invention;

FIG. 7b shows an example embodiment of a reconfigurable electric motor assembly in a second configuration in accordance with the present invention;

FIG. 8 shows an example embodiment of a reconfigurable electric motor assembly with unequal distribution of load in accordance with the present invention;

FIG. 15a shows an example embodiment of a configured multi-port reconfigurable battery with two ports in accordance with the present invention.

FIG. 15b shows a single battery cell circuit diagram having positive and negative poles.

FIG. 15c shows an equivalent circuit diagram of an example embodiment of a configured multi-port reconfigurable battery with two ports in accordance with the present invention.

FIG. 15d shows a simplified circuit diagram of an example embodiment of a configured multi-port reconfigurable battery with two ports in accordance with the present invention.

FIG. 16a shows an example embodiment of a configured circular configuration multi-port reconfigurable battery with two taps in accordance with the present invention.

FIG. 16b shows an alternative equivalent circuit diagram of an example embodiment of a configured circular configuration multi-port reconfigurable battery with two ports in accordance with the present invention.

FIG. 16c shows a simplified circuit diagram of an example embodiment of a configured circular configuration multi-tap reconfigurable battery with two ports in accordance with the present invention.

FIG. 17a shows an example embodiment of a configured multi-tap reconfigurable battery with two taps and a common connection in accordance with the present invention.

FIG. 17b shows an equivalent circuit diagram of an example embodiment of a configured multi-tap reconfigurable battery with two taps and a common connection in accordance with the present invention.

FIG. 17c shows a simplified circuit diagram of an example embodiment of a configured multi-tap reconfigurable battery with two taps and a common connection in accordance with the present invention.

FIG. 18a shows an example embodiment of a configured circular configuration multi-tap reconfigurable battery with two taps and a common connection in accordance with the present invention.

FIG. 18b shows an alternative equivalent circuit diagram of an example embodiment of a configured circular configuration multi-tap reconfigurable battery with two taps and a common connection in accordance with the present invention.

FIG. 18c shows a simplified circuit diagram of an example embodiment of a configured circular configuration multi-tap reconfigurable battery with two taps and a common connection in accordance with the present invention.

FIG. 20g shows simulated AC input and AC output voltage waveforms during a brownout condition FIG. 20h shows the Voltage waveforms at the battery taps Vt1 and Vt2 during a brownout condition.

DETAILED DESCRIPTION

Figure 1:
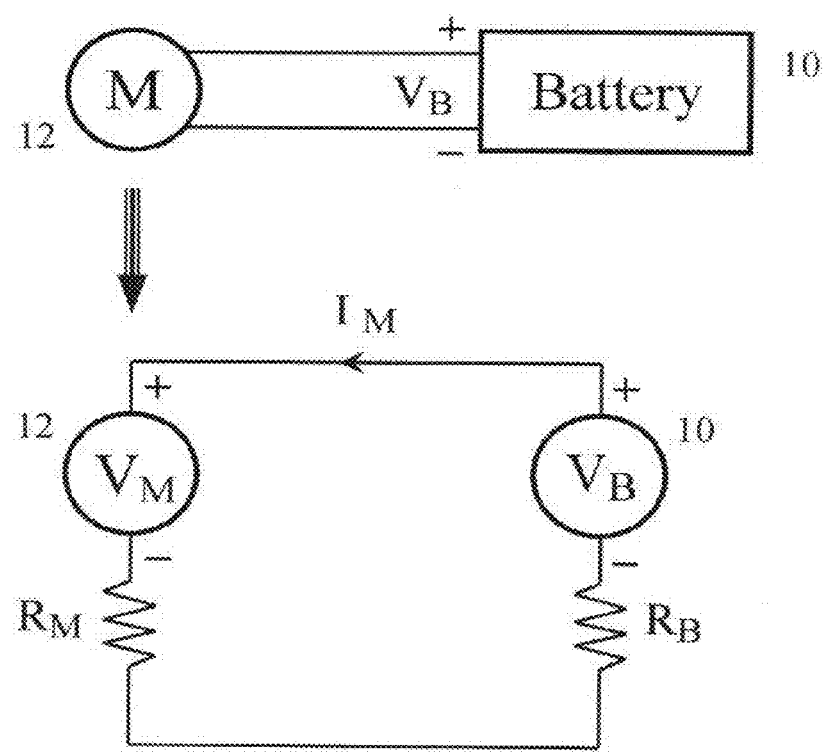
FIG. 1 shows a conventional electric motor and battery configuration.
Figure 2:
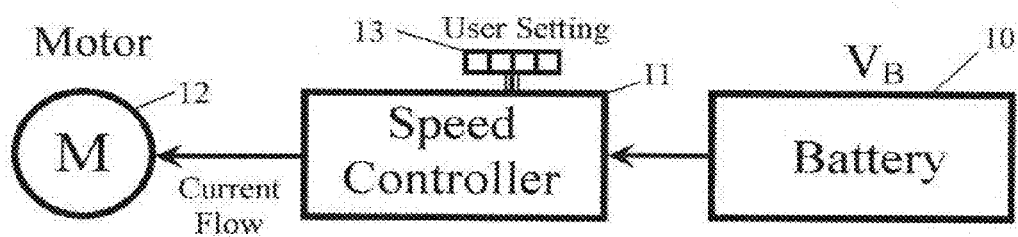
FIG. 2 shows a block diagram of a prior art electric bicycle system.
Figure 3:
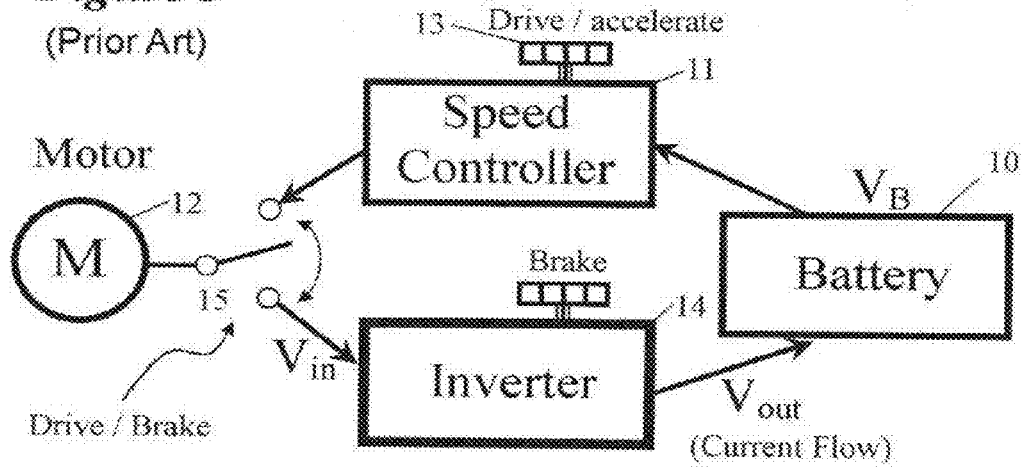
FIG. 3 shows a block diagram of a further prior art electric bicycle system.

The following detailed description provides example embodiments only, and is not intended to limit the scope, applicability, or configuration of the invention. Rather, the detailed description of the example embodiments will provide those skilled in the art with an enabling description for implementing an embodiment of the invention. It should be understood that various changes may be made in the function and arrangement of elements without departing from the spirit and scope of the invention as set forth in the appended claims.

Although the present invention is described in connection with electric bicycles where a rechargeable battery drives an electric motor, those skilled in the art will appreciate that it is equally applicable to other types of electric vehicles and battery charging systems.

In many electro-mechanical system designs (such as an electric bicycle), the complexity of the design problem is managed by breaking the system into separate sub-systems, each providing a specific functionality so that the overall system works well. Each sub-system can be designed more or less independently of the other sub-systems, as long as it meets its given design requirement. A typical prior art electric vehicle design such as an electric bicycle may be divided into the following subsystems: drive train with an electric motor, a speed controller, an inverter, a battery, and perhaps an intelligent central controller that coordinates the other subsystems. As an example, the battery sub-system may typically be supplied by a battery manufacturer with specifications including voltage and current ratings; an inverter designer may work with a specification for a range of possible input voltages from the motor that can be raised high enough to recharge the battery; a mechanical designer would design the drive train and the interface to the motor, and so on, for the other sub-systems. With such an approach, it may be easy to miss system level simplifications or synergies between sub-systems when focusing on one sub-system at a time.

The fundamental problem to be solved when recharging a battery from a motor is to keep the charging voltage higher than the battery voltage. The present invention solves this by effectively lowering the battery voltage during charging periods. This is accomplished in accordance with the present invention by means of a reconfigurable battery. As long as the battery voltage is lower than the voltage generated by the motor, recharging is accomplished. Accordingly, with the present invention, there is no need to raise the voltage out of the motor using an inverter.

A typical battery needed in an electric bicycle must generate 10 s of volts, requiring half a dozen to dozens of battery cells. For example, a typical prior art electric bicycle uses a 36V, 13 Ah NiMH battery. Each battery cell would typically generate between 1.2V (e.g. NiCd or NiMH cells) and 3.6 V (LiIo or LiPo cells). Many of these cells must be connected in series to generate the required voltage for the motor.

Figure 4:
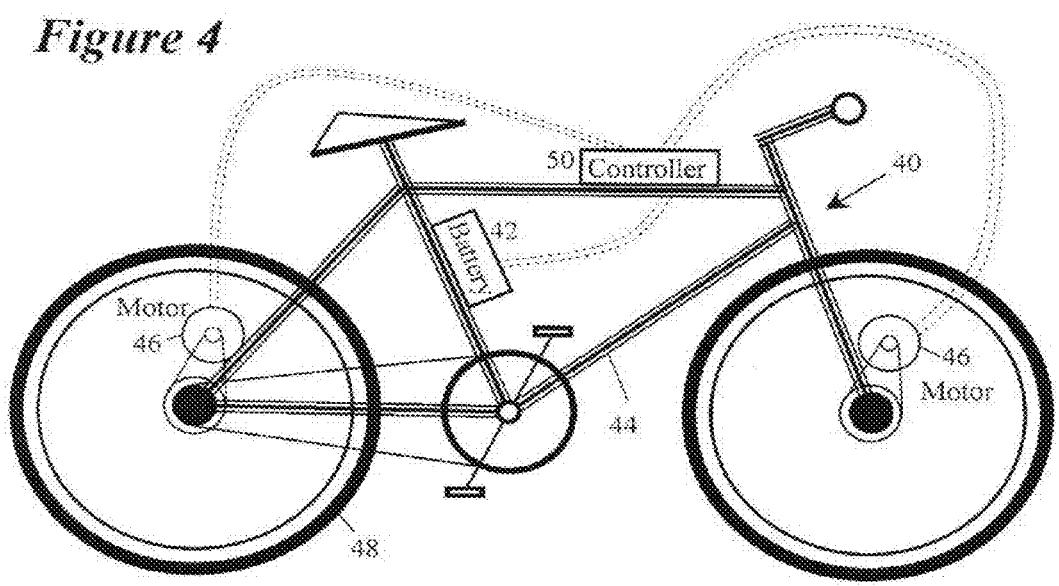
FIG. 4 shows an example embodiment of an electric bicycle in accordance with the present invention.

With the present invention, a reconfigurable battery is provided which is adapted to dynamically re-connect and reconfigure the battery cells as the needs of the system change (e.g., from providing current for driving the motor to receiving current for recharging the battery, and vice versa). FIG. 4 shows a simplified embodiment of an electric bicycle 40 in accordance with the present invention. A configurable battery 42 with a plurality of cells is mounted to a bicycle frame 44. At least one motor 46 is mounted on the frame 44 and adapted to drive a wheel 48 of the bicycle 40. The battery 42 and the motor 46 are both in communication with a controller 50. The controller 50 may be adapted to control the current supplied to the motor 46 from the battery 42 for driving the wheel 48, to control the current supplied from the motor 46 to the battery 42 for recharging the battery 42, and for reconfiguring the battery 42 (or reconfiguring a plurality of motors 46) as discussed in detail below.

FIGS. 5a and 5b illustrate one example embodiment of a reconfigurable battery in accordance with the present invention. FIG. 5a shows a plurality of battery cells 52 of a battery 42 arranged in a first configuration adapted to provide a first battery voltage to an electric motor 46. FIG. 5b shows the battery cells 52 reconfigured into a second configuration adapted to provide a second battery voltage. It should be appreciated that only a portion of the plurality of battery cells may be reconfigured to provide a second configuration. The second battery voltage may be lower than the first battery voltage. The battery 42 can then be charged when the plurality of cells 52 are arranged in the second configuration.

In the first configuration as shown in FIG. 5a, the plurality of battery cells 52 may be arranged in series. In the second configuration as shown in FIG. 5b, the plurality of battery cells 52 may be arranged in parallel.

Alternatively, in the second configuration, only a first portion of the plurality of battery cells 52 may be arranged in parallel and a second portion of the battery cells 52 may be arranged in series. In addition, in a variation of the second configuration as shown in FIG. 5c, the plurality of battery cells 52 may be arranged with at least a first portion of the battery cells in series and a second portion of the battery cells in series, with the first portion and the second portion of the battery cells arranged in parallel. For example, it is noted that in the examples shown with four battery cells 52, the battery 42 can be reconfigured to at least three possible voltages (where Vb is the voltage across each cell 52): 4×Vb (all 4 cells in series as in FIG. 5a), 1×Vb (all 4 cells in parallel as shown in FIG. 5b), and 2×Vb (two pairs of cells in series, with the resulting two pairs arranged in parallel, as shown in FIG. 5c), The charging may comprise regenerative charging provided by the electric motor(s) 46 during a vehicle braking action. In such an example embodiment, at least one of the motor voltage and current of the motor 46 may be monitored. The reconfiguring of the plurality of battery cells 52 may be controlled based on the monitoring. For example, a current sensor 49 could be used to monitor the current through the motor and/or a voltage sensor 58 could be used to monitor the motor voltage, and the sensors 49 and 58 could relay the voltage and/or current information needed to a controller (e.g., controller 50 of FIG. 4) to make a decision on how to reconfigure the battery 42 to the desired battery voltage. Alternatively, a sensor could monitor the motor speed in order to provide equivalent information to the controller 50. In addition, an auxiliary power source (e.g., backup battery 56) may be provided for powering the controller 50 and the sensors 49 and 58.

In addition, an amount of braking power required by the braking action may be monitored and provided to the controller 50, and the reconfiguring of the plurality of battery cells 52 may be controlled based on the monitoring. The applied braking force may be monitored by current sensor 49 (or by circuitry provided within the electric motor 46 itself) and communicated to the controller 50.

Switching means 57 may be provided, enabling the reconfiguring of the plurality of battery cells. The switching means 57 may be connected to at least one of the battery cells. For example, the switching means 57 may comprise one of pulse width modulation switching means or pulse density modulation switching means controlled by the controller 50.

A speed control switch 59 may also be provided. Switch 59 may be a pulse width modulation switching mechanism and the controller 50 may be a PWM control system adapted to adjust the on-off duty cycle of the PWM switch 59 between the motor 46 and the battery 42. The current sensor 49 may be used to calculate the average amount of current flowing. For example, if the desired amount of current cannot be maintained because the voltage difference between the motor 46 and the battery 42 is too small, the battery 42 may be reconfigured to provide a lower voltage during regenerative charging, or a higher battery voltage for driving or accelerating. For a typical DC motor, the torque of a motor (or the braking force of the motor) is proportional to the current flowing in (or out) of the motor.

The backup battery 56 may or may not be needed, and may be used to run the control circuits and the sensors 49 and 58. This backup battery 56 can be kept charged whenever the motor voltage is higher, with the additional switch 55 controlling the amount of charging.

In one example embodiment, the battery 42 maybe provided in an electric vehicle and be adapted for regenerative charging. For example, the battery 42 may be provided in an electric bicycle (as shown in FIG. 4). Those skilled in the art will appreciate that the reconfigurable battery 42 may be used in other types of electric vehicles, such as an electric scooter, an electric automobile, a hybrid vehicle, an electric powered wheelchair, an electric powered golf cart, or the like. Also, it should be appreciated that the reconfigurable battery of the present invention may be adapted for use in virtually any type of device that requires the use of rechargeable batteries, in order to reduce the time needed to charge such batteries.

Thus, with the present invention, the battery 42 may be dynamically reconfigured (e.g., via the controller 50) during operation of the system. For example, the controller 50 may configure the battery cells 52 in a series configuration when the electric vehicle is in a drive mode, as shown in FIG. 5*a*, and may configure the battery cells 52 in a parallel configuration during recharging or regenerative braking, as shown in FIG. 5*b*.

FIG. 6 shows an alternative embodiment where the main PWM switch (switch 59 of FIGS. 5*a* and 5*b*) is not needed. In this example embodiment, the reconfiguration switches 57 are controlled in PWM fashion (or alternatively PDM—Pulse Density Modulation).

In some electric bicycle designs, it may be advantageous to use more than one electric motor. For example, one motor may be provided for the front wheel and one motor may be provided for the rear wheel in order to double the drive torque and be able to provide regenerative braking at both wheels. Other possible configurations may call for more motors, possibly two for each wheel. With the present invention, multiple electric motors can be reconfigured to gain certain advantages, similar to reconfiguring of the battery as discussed above. One motivation for reconfiguring an arrangement of electric motors would be to increase or decrease the over-all motor voltage to help regenerative braking, especially at low speeds where each individual motor voltage could be too low to charge even a single battery cell.

Another motivation would be to increase the torque of the motors by arranging the motors in parallel. More current can flow to the aggregate motor(s) when in a parallel arrangement, as if the vehicle is in a "low gear." If the battery is reconfigured into a parallel arrangement as well, it will be able to supply the higher current the motor demands. Thus, by reconfiguring the arrangement of multiple electric motors as well as the arrangement of multiple battery cells, one may be able to find the optimum combination of series/parallel arrangements for the motors and series/parallel arrangements for the battery cells to accomplish varying situations for the electric vehicle, whether in a drive mode or in a regenerative braking mode.

Accordingly, the present invention also includes methods and apparatus for reconfiguring electric motors, which as discussed below may be combined with the methods and apparatus for reconfiguring a battery.

In one example embodiment as shown in FIG. 7*a*, two or more electric motors 46 are arranged in a first configuration adapted to provide at least one of a first torque output during a driving action and a first regenerative voltage output during a braking action. As shown in FIG. 7*b*, the two or more electric motors 46 may be reconfigured into a second configuration adapted to provide at least one of a second torque output during the driving action and a second regenerative voltage output during the braking action.

The first configuration as shown in FIG. 7*a* may comprise the two or more electric motors arranged in parallel. The second configuration as shown in FIG. 7*b* may comprise the two or more electric motors arranged in series.

In one example embodiment, a battery 42 for operating the two or more electric motors 46 may be provided (e.g., a battery 42 as shown in FIGS. 5*a*, 5*b*, 5*c*, or FIG. 6). The battery 42 may comprise a plurality of battery cells, and one of the first or second configuration of the two or more electric motors 46 may be selected for regenerative charging of the battery 42.

The battery 42 may comprise a plurality of battery cells 52, which may be arranged in a first battery configuration (e.g., as shown in FIG. 5*a*) adapted to provide a first battery voltage for operating the two or more electric motors 46 during the driving action. At least a portion of the plurality of battery cells 52 may be reconfigured into a second battery configuration (e.g., as shown in FIG. 5*b*) adapted to provide a second battery voltage during the braking action, where the second battery voltage is lower than the first battery voltage. The battery 42 can then be charged when the two or more electric motors 46 are arranged in the second configuration and the plurality of cells 52 are arranged in the second battery configuration.

In the first battery configuration, the plurality of battery cells 52 may be arranged in series as shown in FIG. 5*a*. In the second battery configuration, the plurality of battery cells may be arranged in parallel as shown in FIG. 5*b*.

Alternatively, in the second battery configuration, a first portion of the plurality of battery cells 52 may be arranged in parallel and a second portion of the battery cells 52 may be arranged in series. In addition, in the second battery configuration, the plurality of battery cells 52 may be arranged with at least a first portion of the battery cells 52 in series and a second portion of the battery cells 52 in series, with the first portion and the second portion of the battery cells 52 arranged in parallel (as shown in FIG. 5*c*).

The voltage (or current) of the motors 46 may be monitored (e.g., via sensors 58 and 49 discussed above in connection with FIGS. 5*a* and 5*b*). Based on the monitoring, at least one of the reconfiguring of the plurality of battery cells 52 and the reconfiguring of the two or more electric motors 46 may be controlled (e.g., by controller 50). An auxiliary power source (e.g., backup battery 56) may be provided for powering the controller 50 and the sensors 49 and 58.

In addition, at least one of an amount of braking power required by the braking action and an amount of drive power required by the driving action may be monitored. For example, the applied braking force may be monitored by current sensor 49 (or by the circuitry provided within the electric motor 46 itself), and communicated to the controller 50. At least one of the reconfiguring of the plurality of battery cells 52 and the reconfiguring of the two or more electric motors 46 may be controlled based on the monitoring.

Battery cell switching means 57 may be provided to enable the reconfiguring of the plurality of battery cells 52 (as discussed above). Motor switching means 62 (FIGS. 7a, 7b and 8) may be provided to enable the reconfiguring of the two or more electric motors 46. The motor switching means 62 may be connected to at least one of the electric motors 46. The motor switching means 62 may comprise, for example, one of pulse width modulation switching means or pulse density modulation switching means.

In one example embodiment, two or more electric motors 46 may be provided in an electric vehicle adapted for regenerative braking. For example, the two or more electric motors 46 may be provided in an electric bicycle, an electric scooter, an electric automobile, a hybrid vehicle, an electric powered wheelchair, an electric golf cart, or the like.

In embodiments of a reconfigurable battery, a reconfigurable electric motor assembly, or a combination thereof in which a single PWM switch (e.g., switch 59) is used, the controller 50 may be a PWM control system adapted to adjust the on-off duty cycle of the PWM switch between the motor and the battery. The current sensor 49 may be used to calculate the average amount of current flowing. If the desired amount of current cannot be maintained because the voltage difference between the motor 46 and the battery 42 is too small, either the battery 42 or the motor 46 is reconfigured to increase the voltage difference in the right direction (higher motor voltage for regenerative braking, or higher battery voltage for driving or accelerating.)

As discussed above, a speed control switch 59 may also be provided, which may comprise a pulse width modulation switching mechanism. Those skilled in the art will appreciate that an efficient switch is needed to accomplish the electric motor reconfiguration, and that it may also be possible to use multiple FET switches in place of the single PWM switch 59, especially when a parallel motor and a parallel battery combination is needed. It should also be appreciated that the single PWM switch 59 can be replaced by a variable resistance system, as long as the current flow can be regulated. A true variable resistor would dissipate more heat than a PWM switch, but should provide a workable alternative.

FIG. 8 shows a further example embodiment which provides different drive torque and regenerative braking for each motor 46, using two PWM switches 59 and three motor switching means 62. For example, with the FIG. 8 embodiment it is possible to apply greater torque from a motor 46 to a rear wheel of an electric bicycle 40 than from a motor 46 to a front wheel of the electric bicycle 40 during acceleration, and to obtain greater regenerative charging from a motor 46 at the front wheel of an electric bicycle than from a motor 46 at a rear wheel of an electric bicycle during braking.

FIGS. 9a through 9h illustrate an alternative example embodiment of a variable voltage reconfigurable battery and method in accordance with the present invention. The Figures show a single bank of a statically joined plurality of series connected battery cells 200 of a battery 202. A statically joined plurality of series connected battery cells 200 have no additional circuit elements, such as switches, that can break an electrical connection between adjacent battery cells. Each such group of statically joined plurality of series connected battery cells 200, is designated as a "Bank". Banks of battery cells 200 can be configured together in series or parallel connection.

In FIGS. 9a through 9h a bank of seven (7) battery cells 200 of a battery 202 arranged in a series configuration is shown. The battery cells are designated Bt1 through Bt7. Each battery cell 200 has a first voltage pole 204 and a second voltage pole 206. The first voltage pole 204 of each battery cell 200 shown is at a higher direct current (DC) voltage potential than the second voltage pole 206, and therefore the first voltage pole 204 is designated as "+" and the second voltage pole 206 is designated as "−". A first electrical output connection 210 is designated as Vout_p, and a second electrical output connection 212 is designated as Vout_n. The first electrical output connection 210 may function as the positive terminal of a battery 202, while the second electrical output connection 212 may function as the negative terminal of a battery 202. At least one switching means 208 provides electrical connection between the first voltage pole 204 of each battery cell 200 in the series to a first electrical output connection 210 (designated Vout_p).

In the Figures, the switching means 208 designated sequentially SW_p0 through SW_p6 connect the positive pole of each battery cell to Vout_p. Also, at least one switching means 208 provides electrical connection of a second voltage pole 206 of each battery cell 200 in the series to a second electrical output connection 212 (designated Vout_n). The switching means 208 designated sequentially SW_n1 through SW_n7 connect the negative pole of each battery cell to Vout_n. Additionally, at least one switching means 208 can electrically connect the first voltage pole 204 of a battery cell 200 at the beginning of the plurality of series connected battery cells 200 to the second electrical output connection 212.

The switching means 208 designated SW_n0 connects the positive pole of BT1 to Vout_n, At least one switching means 208 can electrically connect the second voltage pole 206 of an end battery cell 200 in the statically joined plurality of series connected battery cells 200 to the first electrical output connection 210. In the Figures, switching means 208 designated SW_p7 connects the negative pole of BT7 to Vout_p. The switching means 208 may, for example, comprise MOSFET transistors. In some implementations, Pulse Width Modulation or Pulse Density Modulation circuitry is included as part of the switching means. In other embodiments, the MOSFET transistors can be configured without PWM or PDM.

Closing a switching means 208 between a first voltage pole 204 and the first electrical output connection 210, and closing a switching means 208 between a second voltage pole 206 and the second electrical output connection 212 provides a voltage differential at the electrical output connections, and allows current to flow when the battery 202 is connected to a load (or to a battery charging circuit). In the Figures, output voltage Vout, is the difference in potential between the first electrical output connection 210 designated Vout_p, and the second electrical output connection 212 designated Vout_n.

The battery cells 200 are reconfigured to provide an output voltage that is approximately equal to the voltage summation of the electrically reconfigured battery cells 200, and is in a range between zero volts and a maximum output voltage for the plurality of series connected battery cells 200. The voltage is determined by the number and technology of the cells provided.

Any of the well known battery types can be used with the inventive structure. One such battery technology that is particularly suited for use with the present invention is the nano phosphate based lithium ion battery technology. Such batteries can handle more than an order of magnitude more current than prior battery technologies without becoming unstable. It is expected that other battery technologies that are developed in the future will also be suitable for use with the series battery embodiments disclosed herein.

Figure 9A:
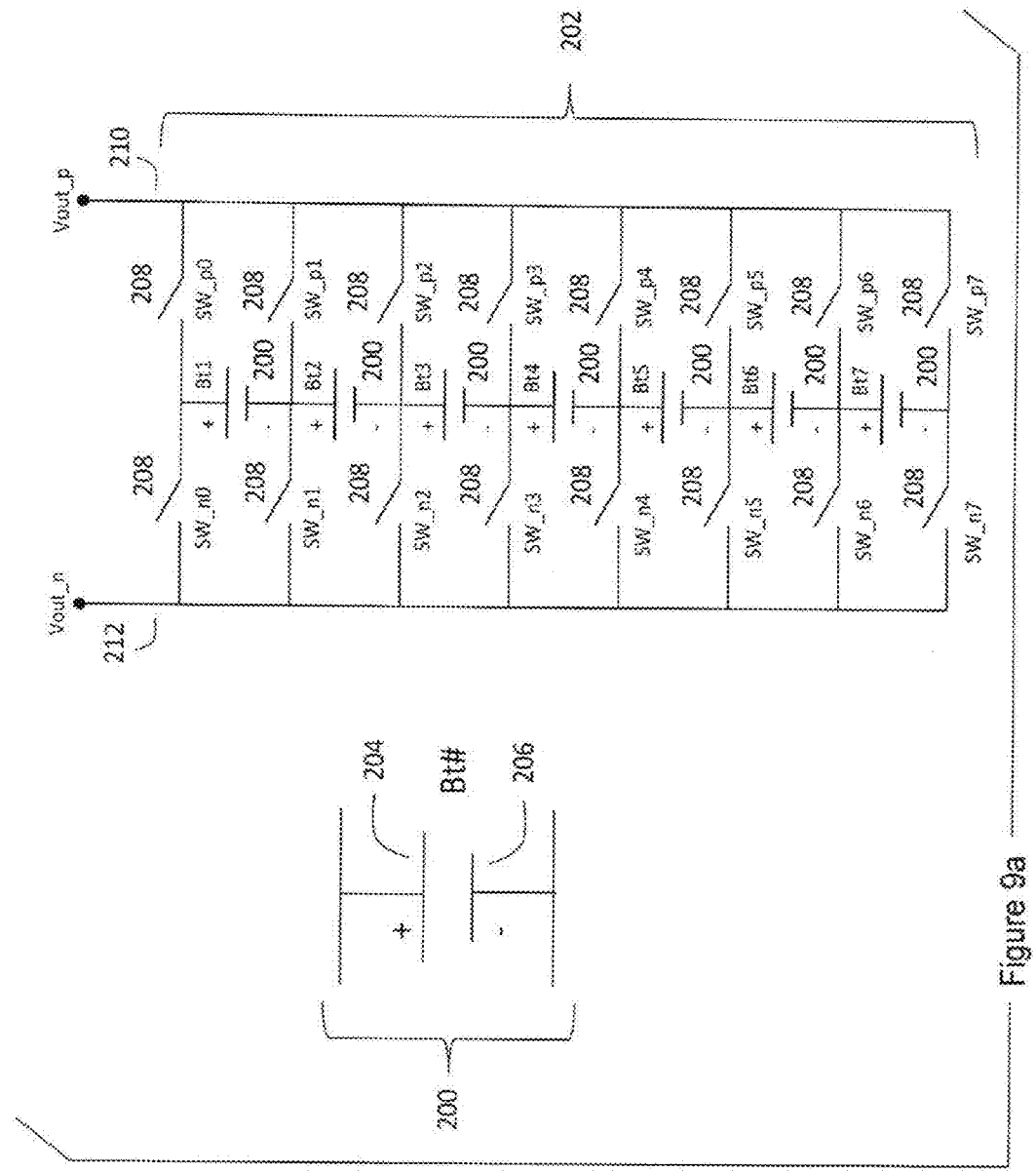
FIG. 9a shows an example embodiment of a reconfigurable battery in accordance with the present invention.
Figure 9B:
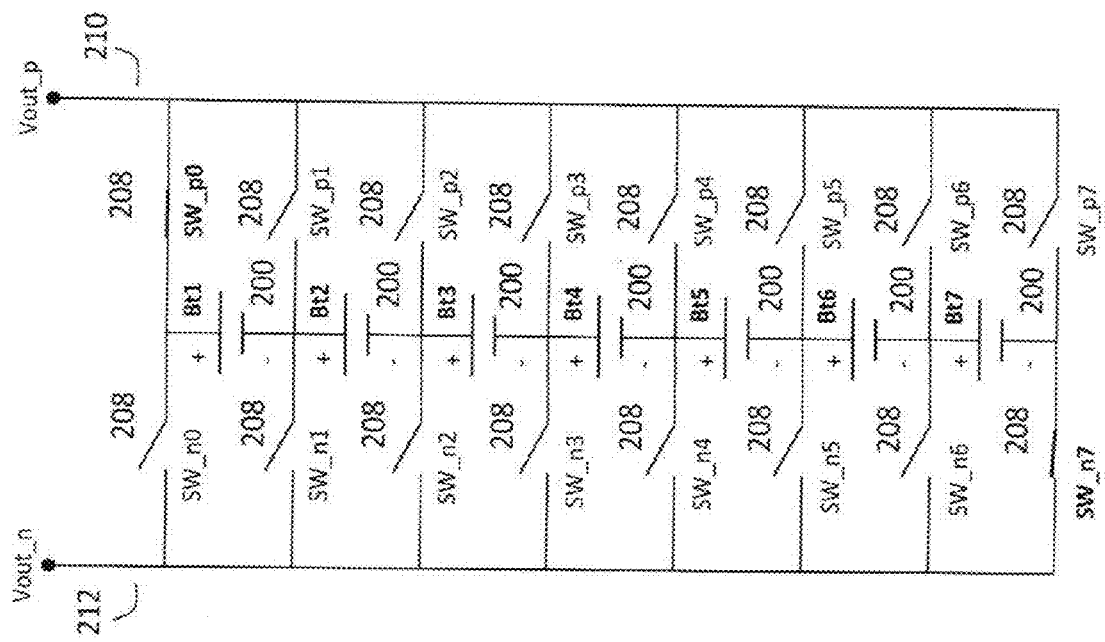
FIG. 9b shows an example embodiment of a configured reconfigurable battery with maximum output voltage in accordance with the present invention.

FIG. 9a shows a configuration with all switches 208 in an open state such that no current flow occurs, and Vout=0 volts. FIG. 9b shows a configuration whereby maximum voltage is realized from the bank of statically joined plurality of series connected battery cells 200 by closing the switching means 208 (in particular, switch SW_p0) connecting the positive pole of the first battery cell, Bt1, to Vout_p and closing the switching means 208 (in particular, switch SW_n7) connecting the negative pole of the last battery cell, Bt7, to Vout_n. Vout equals the sum of the voltages of connected battery cells in the series Bt1 through Bt7. For example, if each battery cell 200 is Lithium Ion technology with nominal voltage of 3.6V, for this configuration of seven battery cells, Vout=25.2 volts minus switching and other losses.

Figure 9C:
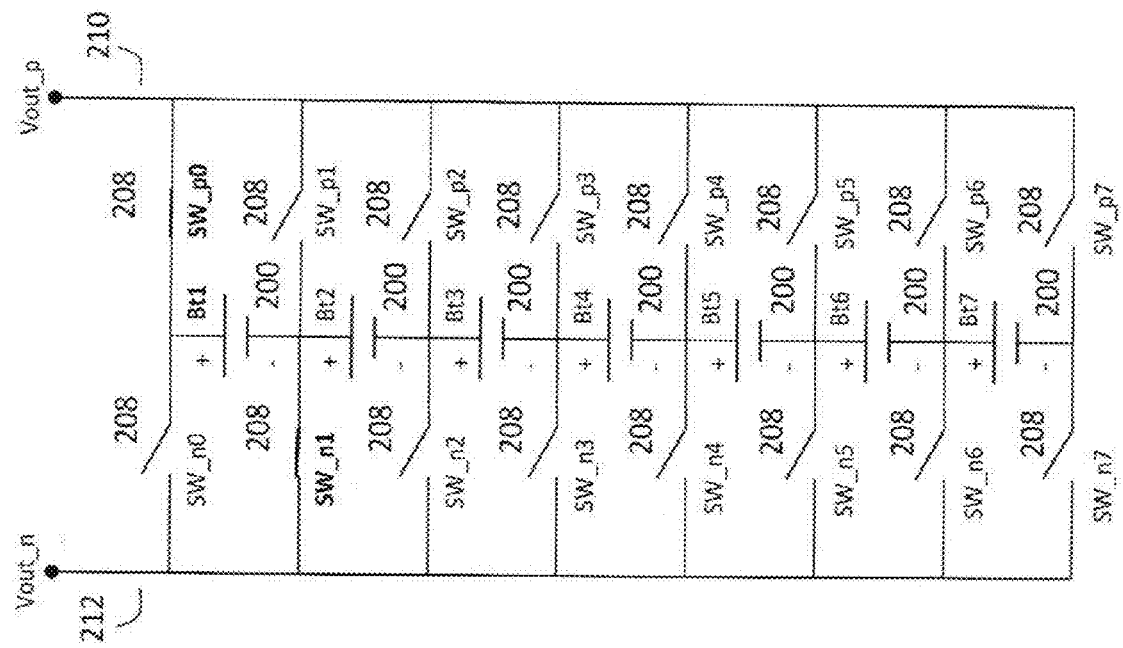
FIG. 9c shows an example embodiment of a configured reconfigurable battery with single battery cell output voltage in accordance with the present invention.

FIG. 9c shows an example configuration whereby a single cell voltage is realized at the output from the statically joined plurality of series connected battery cells 200. Voltage of cell Bt1 is realized between output connections Vout_p and Vout_n by closing switches SW_p0 and SW_n1.

Figure 9D:
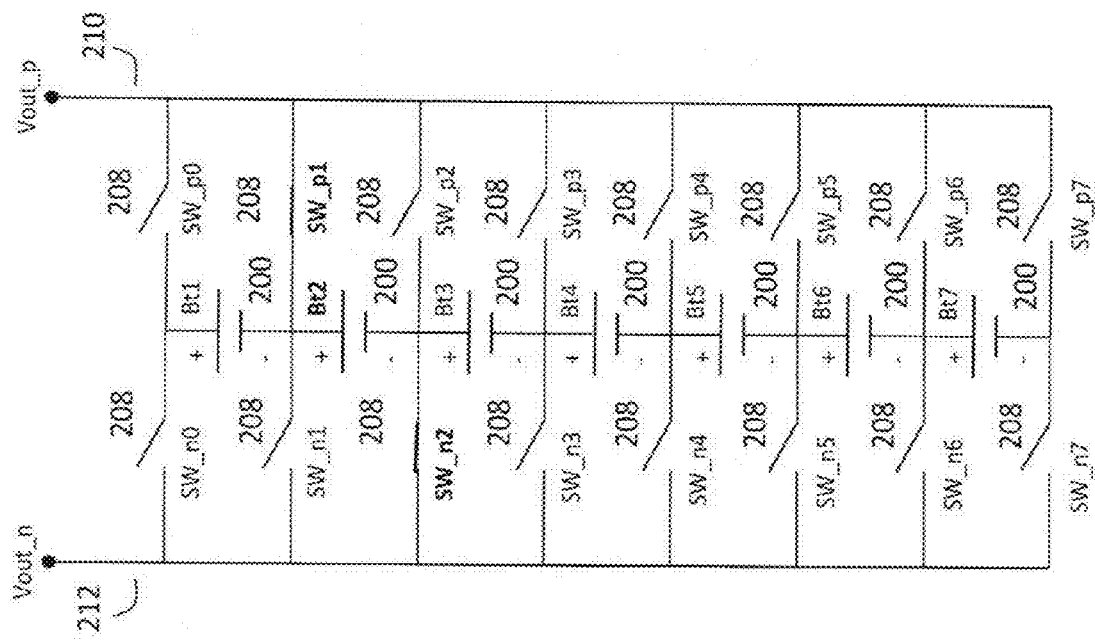
FIG. 9d shows an alternative example embodiment of a configured reconfigurable battery with single battery cell output voltage in accordance with the present invention.

FIG. 9d shows an alternative example configuration, where the output voltage is also about equal to a single cell voltage by connecting battery cell Bt2 to the first electrical output connection 210 and the second electrical output connection 212. Voltage of cell Bt2 is realized between output connections Vout_p and Vout_n by closing switches SW_p1 and SW_n2.

Figure 9E:
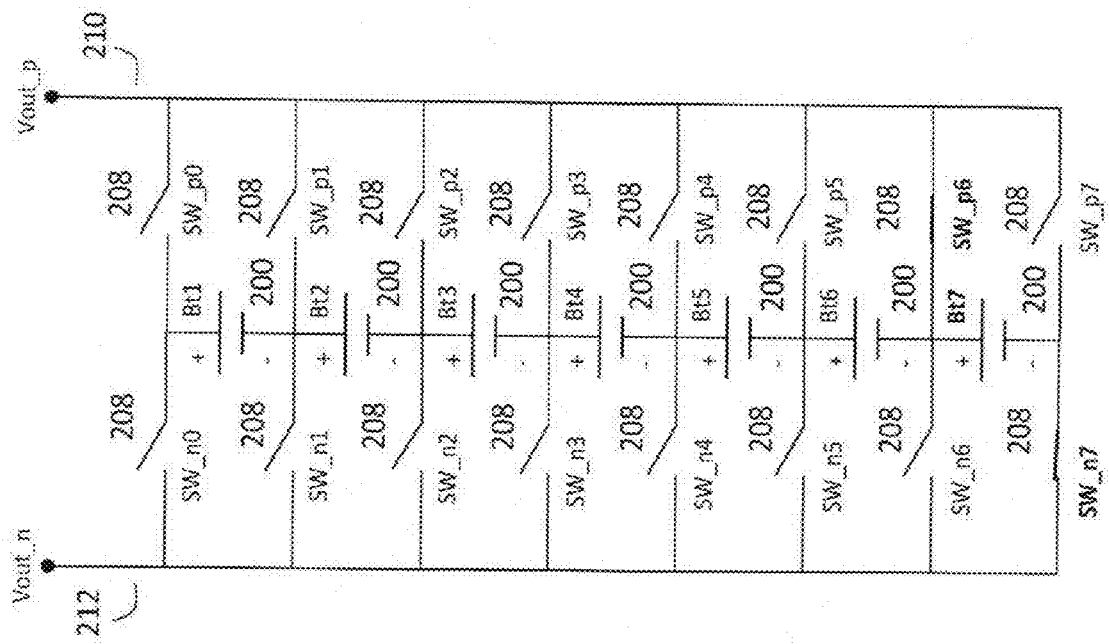
FIG. 9e shows an example embodiment of a configured reconfigurable battery with single battery cell output voltage in accordance with the present invention.

FIG. 9e shows another alternative example configuration, where output voltage is about equal to the voltage of a single battery cell, Bt7. Voltage of cell Bt7 is realized between output connections Vout_p and Vout_n by closing switches SW_p6 and SW_n7.

In any series configuration of a plurality of battery cells as described in this embodiment, there are N ways to realize a single cell voltage, where N is the number of cells in the battery.

Figure 9F:
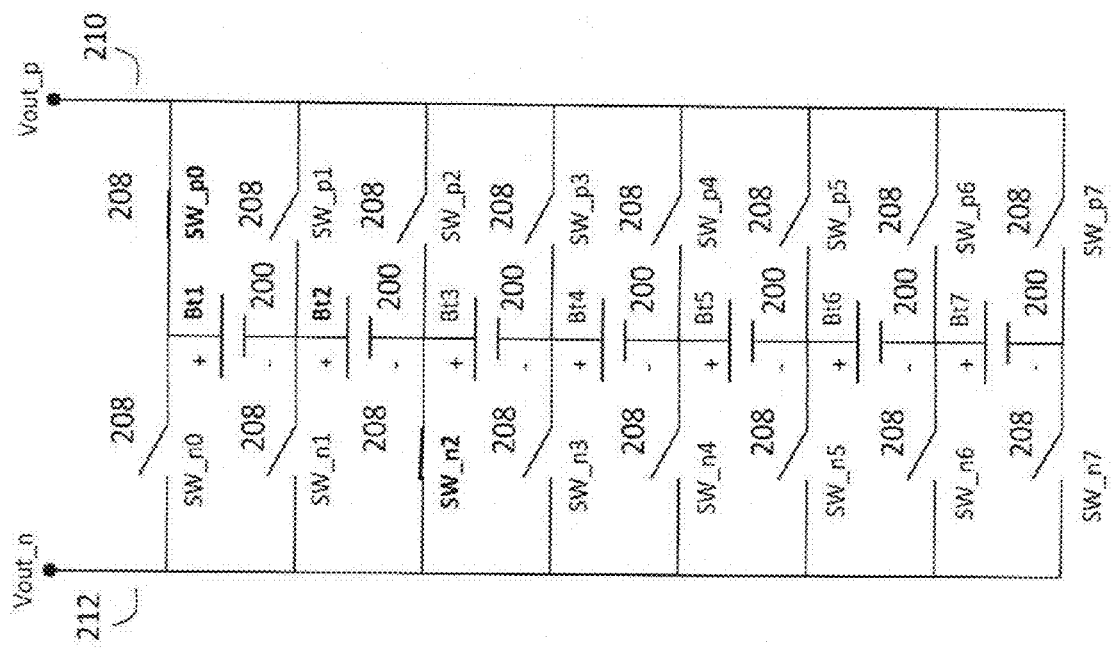
FIG. 9f shows an example embodiment of a configured reconfigurable battery with two battery cell output voltage in accordance with the present invention.
Figure 9G:
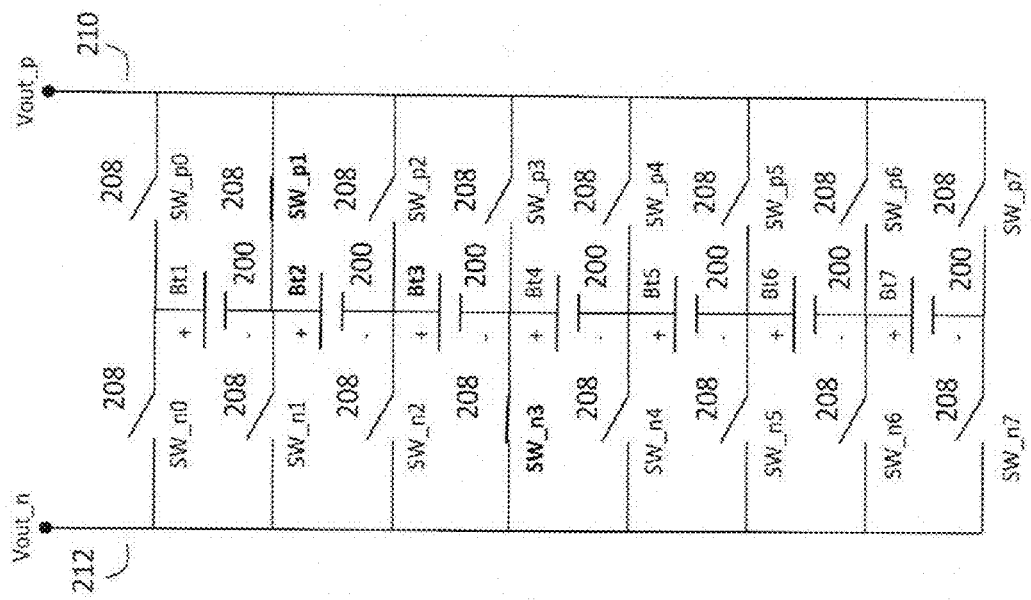
FIG. 9g shows an alternative example embodiment of a configured reconfigurable battery with two battery cell output voltage in accordance with the present invention.
Figure 9H:
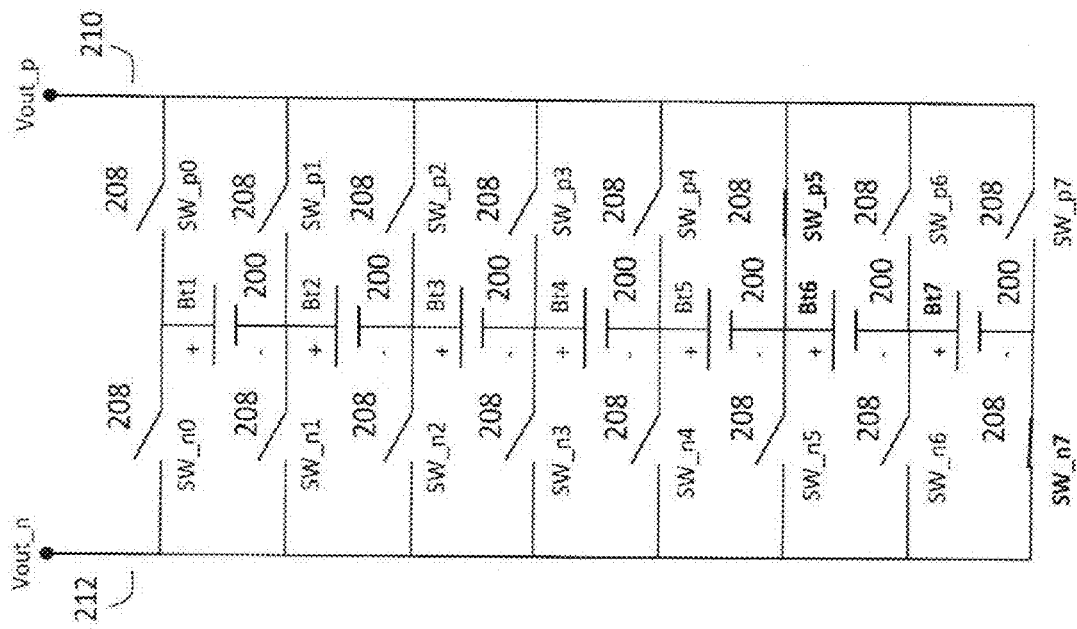
FIG. 9h shows a second alternative example embodiment of a configured reconfigurable battery with two battery cell output voltage in accordance with the present invention.

FIG. 9f shows a configuration whereby an intermediate voltage is realized at the voltage output from the series configured plurality of battery cells 200. In this example, the voltage sum of two (2) battery cells 200 is realized. In particular, the voltage sum of cells Bt1 and Bt2 is realized between output connections Vout_p and Vout_n by closing switches SW_p0 and SW_n2. FIG. 9g and FIG. 9h show two additional alternate configurations of connecting two series connected battery cells to the voltage output.

In a series configuration of a plurality of battery cells 200, as described in this exemplary embodiment, there are N−1 ways to realize a two-cell voltage, where N is the number of cells 200 in the battery.

Without including configurations of voltage polarity reversal, for any number of N statically joined plurality of series connected battery cells 200 as described in this exemplary embodiment, with a switched set of P electrically contiguous battery cells 200, there are (N−P)+1 ways to configure them.

Voltage polarity may be selectively reversed by activating a switching means 208 that would connect a first voltage pole 204 of a battery cell 200 to a second electrical output connection 212 instead of connecting it to a first voltage electrical output connection 210, and connecting a second voltage pole 206 to a first electrical output connection 210. For example, in the example configuration shown in FIG. 9c, closing switching means SW_n0 instead of SW_p0, and SW_μl instead of SW_n1 would cause polarity reversal at the electrical output connections 210 and 212. Such polarity reversal may be useful for motor activated braking.

One useful consequence of having (N−P)+1 ways to configure P cells is that it allows cells to be load balanced in a time sequential manner, maintaining nominal voltage by alternating drain on sets of P electrically connected cells.

A useful consequence of connecting the battery cells 200 in a series configuration without switching means 208 between the cells allows switch induced voltage loss to be kept minimal because only two switching means 208 need be activated when an electrical load is applied.

Figure 10A:
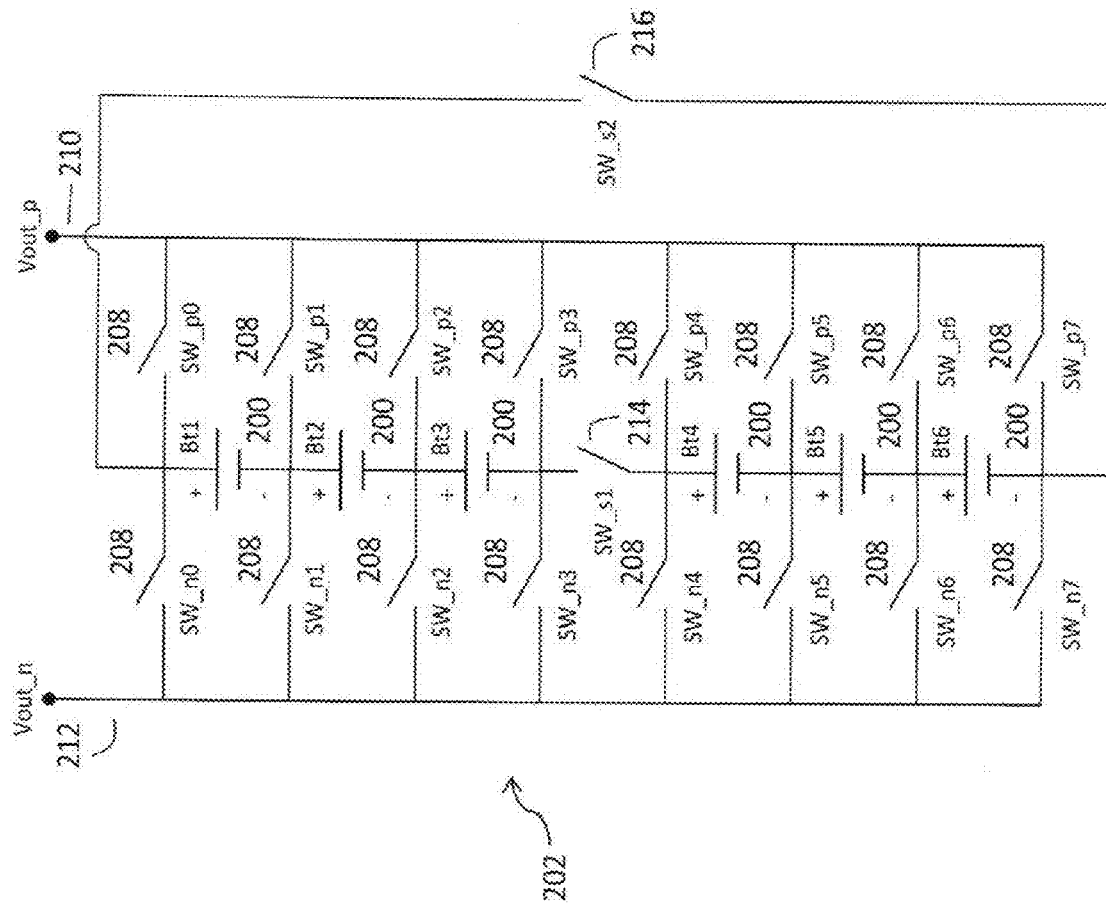
FIG. 10a shows an example embodiment of a reconfigurable battery with two banks of battery cells in accordance with the present invention.
Figure 10B:
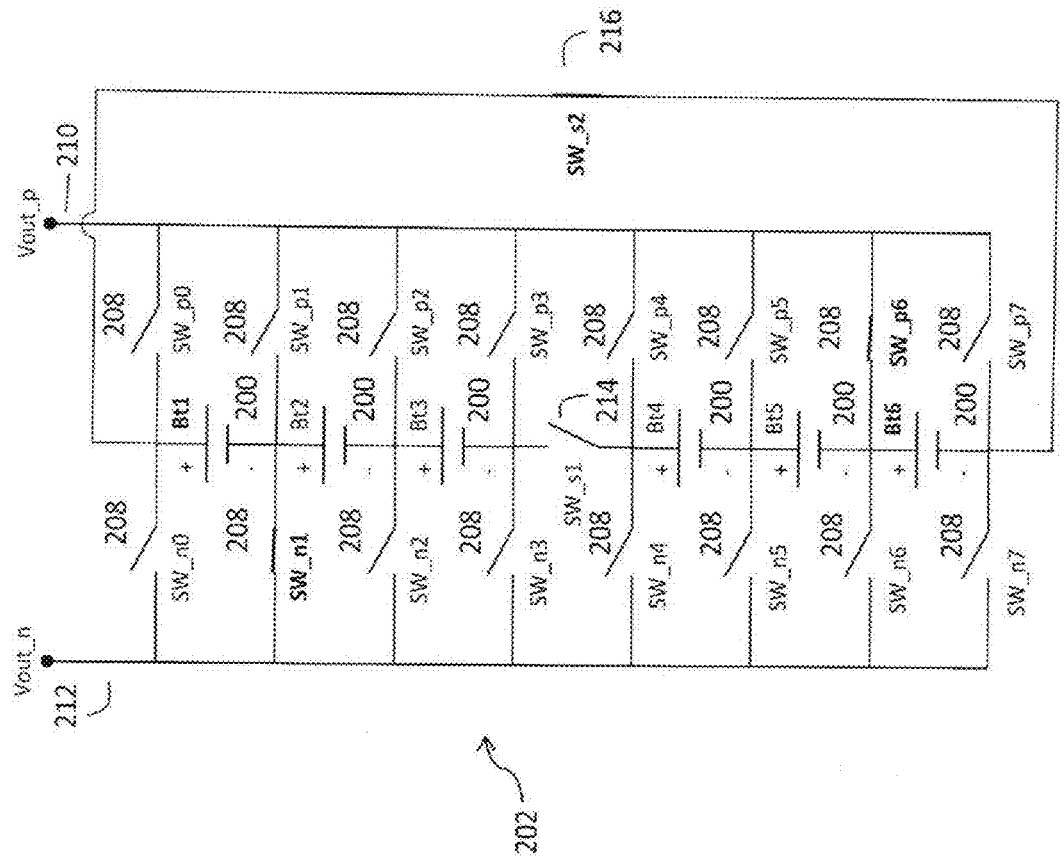
FIG. 10b shows an example embodiment of a configured reconfigurable battery with two banks of battery cells in accordance with the present invention.
Figure 10C:
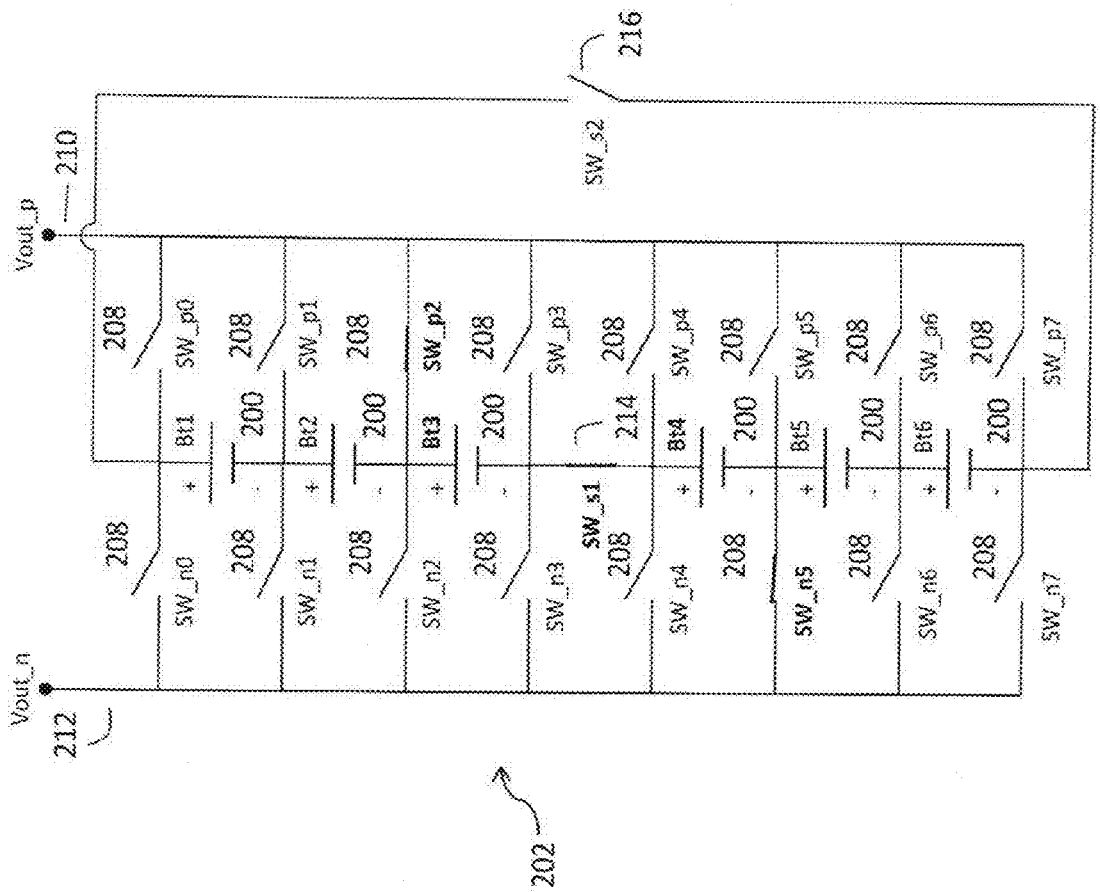
FIG. 10c shows an alternative example embodiment of a configured reconfigurable battery with two banks of battery cells in accordance with the present invention.

Another alternative example embodiment of a reconfigurable battery and method in accordance with the present invention is shown in FIGS. 10a through 10c. These Figures show a first bank of statically joined plurality of series connected battery cells 200, designated Bt1 through Bt3, that is joined to a second bank of statically joined plurality of series connected battery cells 200, designated Bt4 through Bt6, in a series connection. The switching means 208 designated sequentially SW_p0 through SW_p7 connect the batteries Bt1 through Bt6 to Vout_p. The switching means 208 designated sequentially SW_n1 through SW_n7 connect the batteries Bt1 through Bt6 to Vout_n A first intermediate switching means 214, designated as SW_μl, is connected between a second ("−") voltage pole 206 of an end positioned battery cell in a first bank, designated as Bt3, and a first ("+") voltage pole 204 of a beginning positioned battery cell in a second bank, designated as Bt4. A second intermediate switching means 216 is connected between a first ("+") voltage pole 204 of a beginning positioned battery cell, designated as Bt1, in a first bank and a second ("−") voltage pole 206 of an end positioned battery cell in a second bank, designated as Bt6. Essentially two (2) groupings of three (3) battery cells 200, referred to as banks, are configured in the example configuration. The first electrical output connection of the two banks are commonly connected, designated as Vout_p. Also, the second electrical output connection of the two banks are commonly connected, designated as Vout_n. It should be appreciated that additional banks can be provided in a similar configuration.

The placement of a switching means intermediate between the banks of battery cells effectively separates connectivity between two adjacent cells when the switches are open, resulting in the two banks of battery cells that can be independently configured. Each independent bank of statically joined plurality of series connected battery cells 200 functions in the manner described in the example embodiment of FIGS. 9a through 9h. The switching means 208, first intermediate switching means 214, and second intermediate switching means 216 may be MOSFET transistors with, e.g., Pulse width Modulation or Pulse Density Modulation circuitry included.

If the battery cells to be configured sit in a single bank, closing a switching means 208 between a first voltage pole 204 and the first electrical output connection 210, and closing a switching means 208 between a second voltage pole 206 and the second electrical output connection 212 manifests output voltage. However, if connection is desired between a battery cell 200 that sits in one bank and a battery cell 200 that sits in another bank, either the first intermediate switching means 214 or the second intermediate switching means 216 must be closed to realize voltage between the output connectors 210 and 212. To prevent a short circuit in the series configured battery 202, the first and second intermediate switches 214 and 216 may not both be simultaneously closed. With the first and second intermediate switches 214 and 216 both set in an open state, the two banks are connected in parallel.

FIG. 10a shows an example configuration of a series connected reconfigurable battery 202 with all switching means in an open state such that no voltage appears at the output.

Intermediate switches SW_s1 and SW_s2 are open, such that the two banks of cells are in a parallel connection. All switches 208 in the banks are also open so that Vout is equal to zero volts.

FIG. 10b shows an example configuration where two battery cells 200 on opposite ends of the two banks, battery cells Bt1 and Bt6, are electrically connected in series through switching means SW_s2. Closed switching means SW_n1 connects battery cell Bt1 to Vout_n and closed switching means SW_p6 connects Bt6 to Vout_p. At the same time, closed second intermediate switching means SW_s2 configures voltage summation of battery cells Bt1 and Bt6.

FIG. 10c shows a configuration where two adjacent battery cells Bt3 and Bt4, one in each bank, are configured through the first intermediate switching means 214. Closed switching means SW_p2 connects battery cell Bt3 to Vout_p, closed switching means SW_n5 connects Bt4 to Vout_n, and closed first intermediate switching means SW_μl configures voltage summation of battery cells Bt3 and Bt4.

The present embodiment is useful because it permits series connection between battery cells 200 on opposite ends of a plurality of battery cells 200 without requiring electrical connection with cells occupying the middle section of battery cells 200. This helps with battery discharge load distribution and selective charging of cells. This example embodiment affords increased configuration flexibility while only increasing active switching overhead by the two switching means 214 and 216 over the embodiment of FIG. 9a through 9h.

Figure 11:
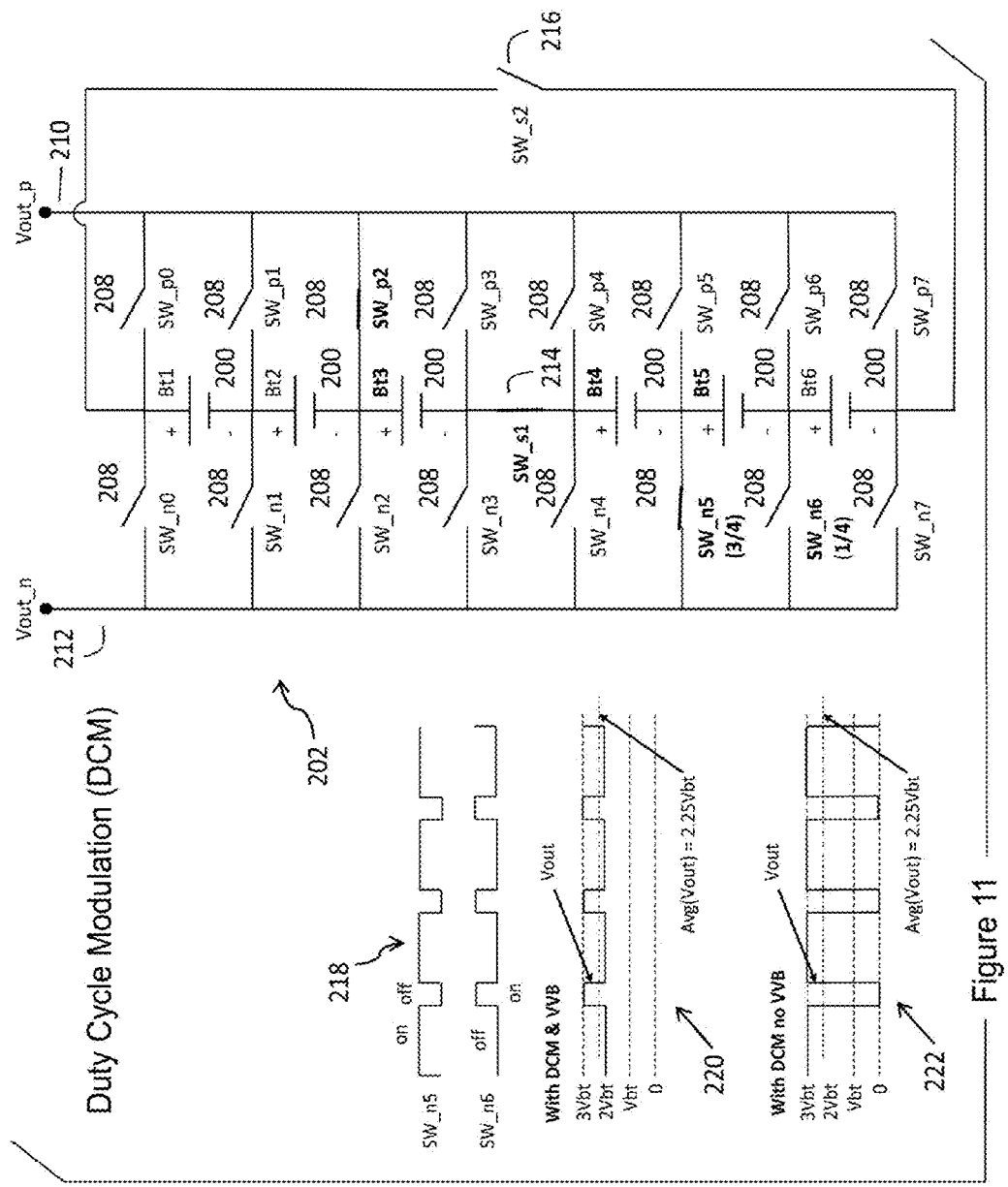
FIG. 11 shows an example embodiment of duty cycle modulation of a configured reconfigurable battery with two banks of battery cells in accordance with the present invention.

Another alternative example embodiment of a method of reconfiguring a battery 202 in accordance with the present invention for series connected battery cells 200 is shown in FIG. 11. The switching means 208 further includes Duty Cycle Modulation ("DCM") by alternatively switching between a first configuration of series connected battery cells 200 exhibiting a first voltage and a second configuration of series connected battery cells 200 exhibiting a second voltage. Duty cycle modulation produces an intermediate output voltage ranging between a first voltage and a second voltage. The example configuration illustrated in FIG. 11 shows modulation of switching means SW_n5 connected to battery Bt4 alternatively switching between an open and closed state. Switching means SW_n6 connected to battery Bt5 inversely mirrors the cycle of switching means SW_n5 by alternatively switching between a closed and open state. As a result, output voltage is averaged between a voltage of two series connected cells 200 and three series connected cells 200. This causes a relatively small voltage difference during switch cycling. The small voltage change is contrasted with a significantly larger voltage change that would occur if the three series connected batteries were to toggle between an off and on state. The result of duty cycle modulation is intermediate control of output voltage with reduced switching transient for voltage, current, and resulting motor torque.

A simulated digital pulse trace 218 and a simulated voltage trace 220 are shown in FIG. 11. The simulated digital pulse trace 218 demonstrates timing of alternating on and off states of switches SW_n5 and SW_n6. The simulated voltage trace 220 shows the corresponding output voltage, Vout, as a function of time. For this example embodiment, the on state duty cycle of switching means SW_n6 is a quarter of that for switching means SW_n5. As a result, the average output voltage for this example embodiment is equal to ¾(voltage(BT3)+voltage(BT5))+¼(voltage(BT3)+voltage(BT5)+voltage(BT6))=2.25 Voltage (BT) if all battery cell 200 voltages are equal. An illustrative voltage trace using full voltage on-off pulse width modulation 222 is shown for comparison. Note the larger voltage swing between the on and off states without a variable voltage battery, as shown in simulated trace 222.

Figure 12:
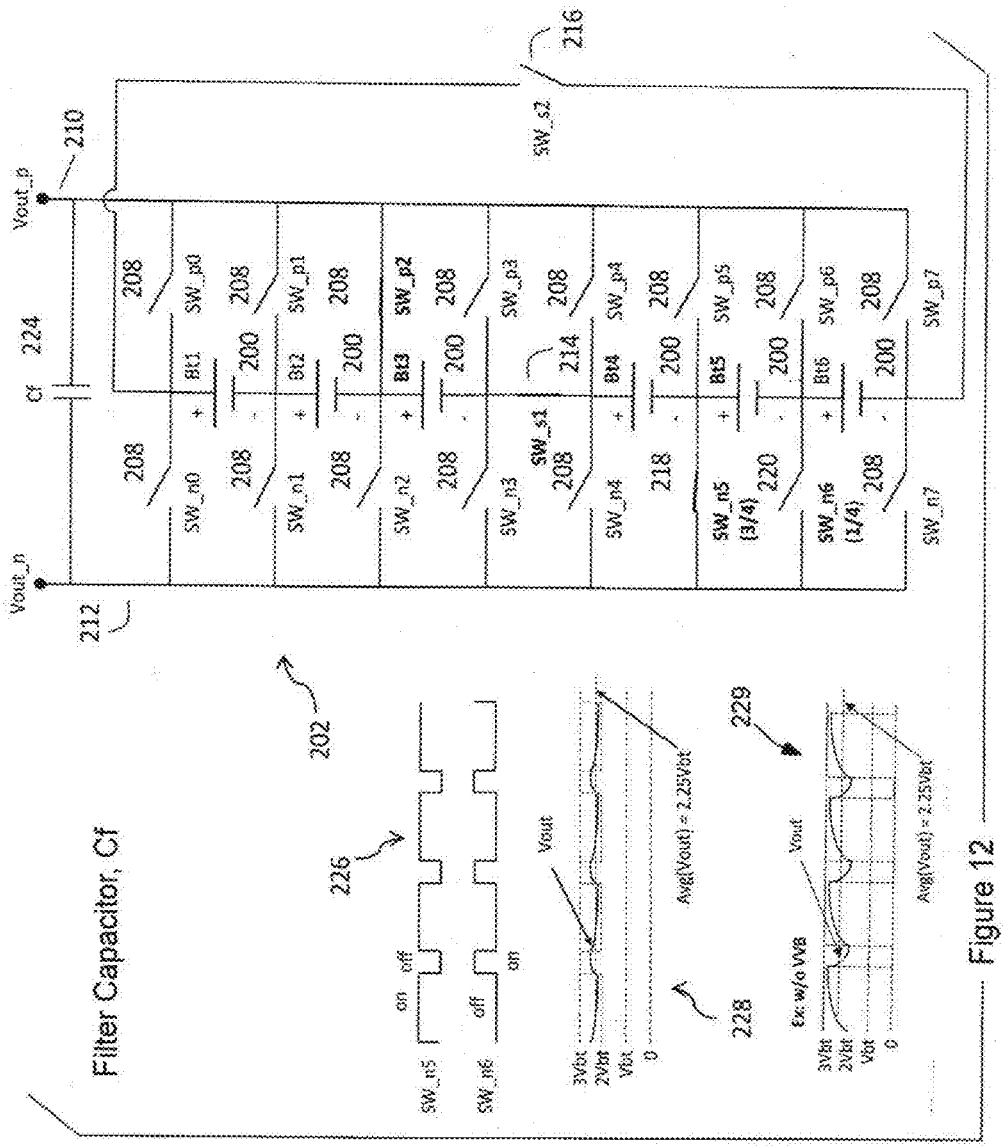
FIG. 12 shows an example embodiment of duty cycle modulation with capacitance filtering of a configured reconfigurable battery with two banks of battery cells in accordance with the present invention.

At least one capacitance filter 224, as shown in FIG. 12, may be added to the above described embodiments to smooth out the output voltage. In the example embodiment of the present invention, a single capacitor 224 is placed across the output voltage connections 210 and 212. The capacitor is connected in a circuit using duty cycle modulation as described in the preceding embodiment. A simulated digital pulse trace 226 and a simulated voltage trace 228 demonstrate the resulting smoothed waveform obtained by adding the filter to the variable voltage battery ("VVB") of the present invention. Depending on the switch type, switching method, and waveform filter used in this embodiment, switching rates can be reduced, possibly resulting in energy savings, reduced Electromagnetic Interference (EMI), and smoother motor operations. Inductive filtering can be substituted for (or used in conjunction with) the capacitive filtering, e.g., by providing an inductor in series between the battery and the load. An illustrative voltage trace 229 illustrates, for comparison, the case where the variable voltage battery of the present invention is not used. Note the larger voltage swing between the on and off states without the VVB, as shown in simulated trace 229.

Figure 13:
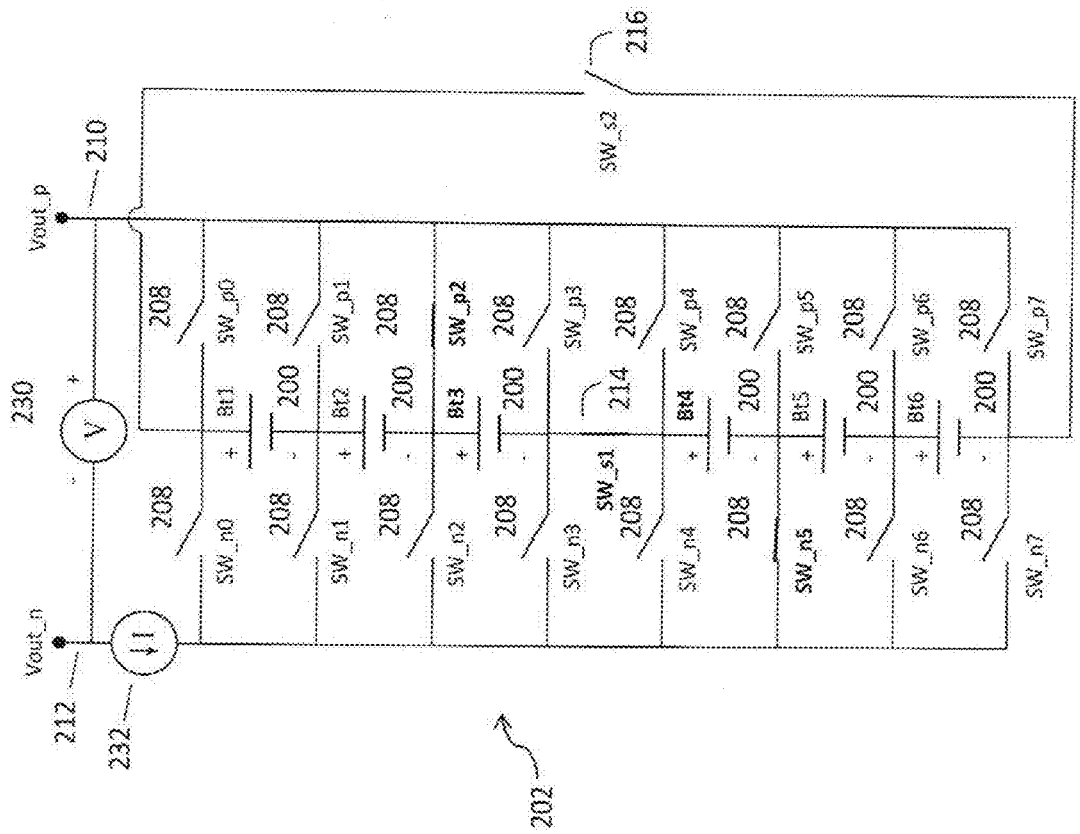
FIG. 13 shows an example embodiment of a configured reconfigurable battery with two banks of battery cells and voltage and current monitoring in accordance with the present invention.

The previously described embodiments may include voltage monitoring 230 and current monitoring 232 as shown in the example embodiment of a reconfigurable series connected plurality of battery cells in FIG. 13. Voltage and current monitoring systems and methods in combination with switching means 208 described herein, allow identification and status monitoring of battery cell 200 charge and discharge states.

The reconfigurable battery 202 described in the preceding embodiments used in combination with at least one electric motor 226 allows motor speed control by regulating battery output voltage based on the number of cells configured in series. Also, battery cell 200 recharge schemes may be customized by selectively configuring the number and relative position of series connected battery cells 200 that match motor 226 output voltage during regenerative braking and charging.

Figure 14:
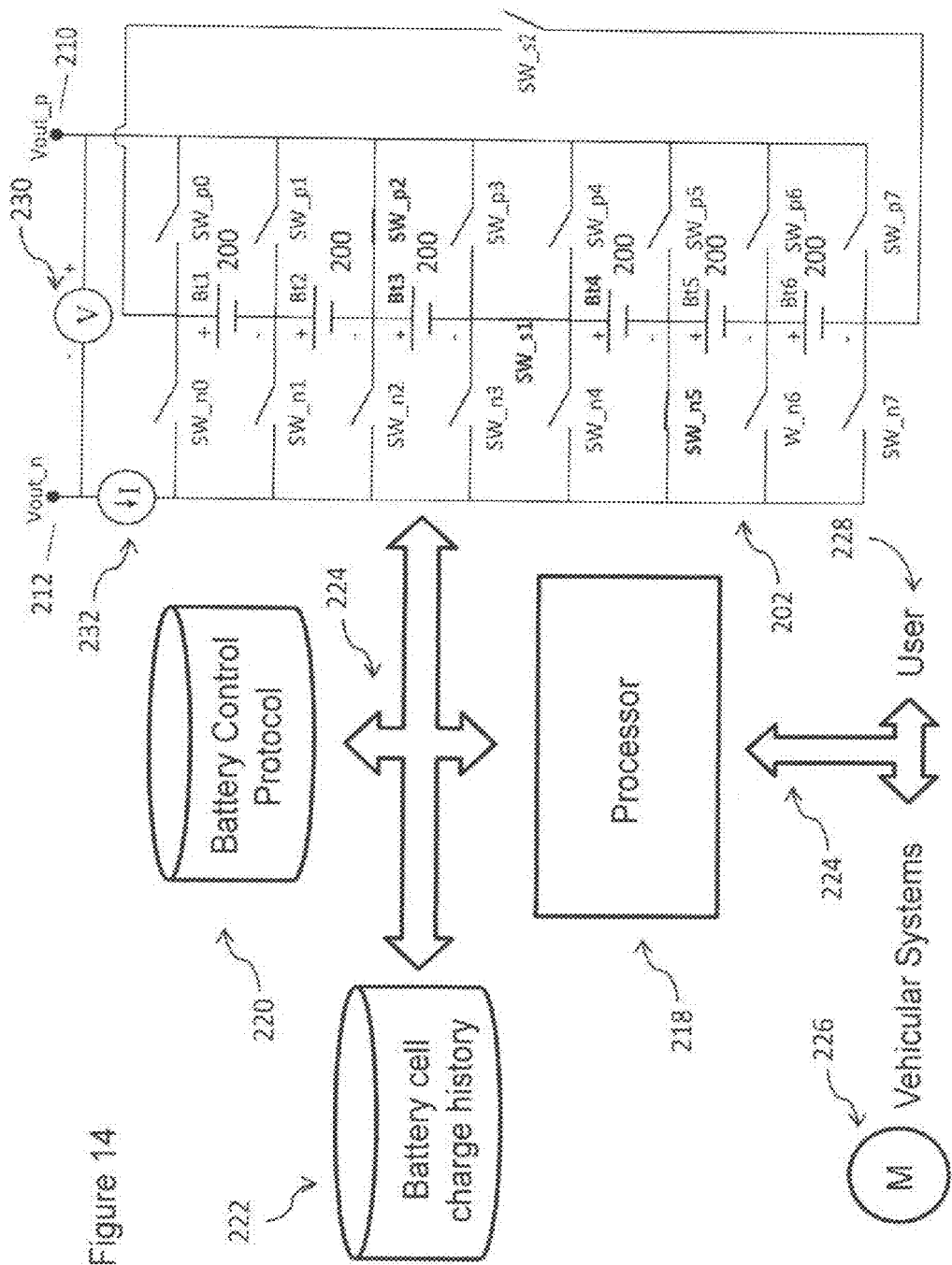
FIG. 14 shows an example embodiment of a configured reconfigurable battery and a switching control system in accordance with the present invention.

FIG. 14 shows a battery reconfiguration control system that can interface with vehicular systems (e.g. motors 226) and communicate with users 228 to control the reconfiguration of switches 208 to bypass weak or dead battery cells 200, short out dying cells 200 if necessary to regain current handling capacity, and balance battery cell 200 usage. An electronic processor 218 such as a microprocessor with associated primary and secondary memory 220 and 222, voltage 230 and current 232 sensors, and associated software can maintain charge/discharge history to help regulate battery cell life and provide load balancing during discharge and recharge states. Battery cell 200 temperature monitoring may also be included since battery duty cycle varies as a function of temperature. Such temperature monitoring is particularly useful for charge and discharge control, as well as for diagnosis of failing cells. Control signals may be exchanged between the sensors 230 and 232, the battery 202, motors 226, and processors 218 using dedicated communication pathways 224 or over power connections 210 and 212.

Powering the battery reconfiguration control system down and powering it up again requires following a predetermined protocol. Power down occurs, for example, when the reconfigurable battery 202 becomes discharged, and requires that all switching means 208 and 214 and 216 be placed in an inactive state (open) as shown in FIGS. 9a and 10a. Powering the system up again begins with activation of the processor 218, perhaps a microprocessor, followed by accessing configuration settings, status of the battery cells, past history and exception states from memory 220 and 222. If a charging cycle is begun, control logic analyzes the information received from memory 220 and 222 and configures switching means 208 to accomplish the task most effectively.

It is noted that measuring the average current flow can take time that may result in an undesirable amount of delay. An alternative is to calculate the current flow expected so that the resistance or the PWM duty cycle can be adjusted in synchrony with the reconfiguration of the battery, the motor, or both.

It should now be appreciated that the present invention provides advantageous methods and apparatus for reconfiguring a battery having a plurality of battery cells, reconfiguring an electric motor assembly, or a combination thereof.

In accordance with the invention, potential loss is avoided when full current output is needed by keeping the battery cells in a series connection without intervening switches within the series path. Moreover, by tapping at different points in the series connected batteries, the voltage output can be varied with only two switch losses being incurred. The output voltage of the battery can even be set to zero, and if desired (e.g., for emergency braking), the voltage polarity of the battery can be reversed. If all of the series battery cells are used (e.g., the bottom switch on one side and the top switch on the other side are closed), maximum output voltage is achieved. If less than the total number of cells is used, the voltage will be lower. With a battery structure according to the invention, there are many different combinations of switch closings for the same (lower) voltage output. These combinations can be selected in a time sequential manner to even out the drain on the cells without taxing any one cell too much, while maintaining a constant voltage output.

A key benefit of the inventive variable voltage battery is that it allows speed control and regenerative braking in a battery powered vehicle to be easily achieved. This is due to the fact that the battery voltage adapts to the needs of the motor when driving and to the voltage output of the motor during regenerative braking. For example, one of the two switches used to set the battery voltage can be modulated (e.g., using PWM) to provide the motor speed control. Alternatively, it is possible to modulate between two voltage output values to achieve a finer control of the average battery voltage output to the motor. In an all-or-nothing PWM speed control, the voltage to the motor instantly changes from its maximum value to zero when the switch is opened. In such a scenario, there will be a large voltage spike when the motor gets disconnected from the battery since the magnetic field in the motor must collapse. With the disclosed finer voltage control between two voltages, there is much less transient since the circuit is still closed with the battery.

The switching for "reconfiguration" of the battery and for modulation of the switches can occur at a very high rate, e.g., at KHz or even MHz frequencies if the switches (e.g. power MOSFETs) are turned on and off quickly. A lower switching rate, however, can potentially save a bit of power since large MOSFET transistors require more current as the switching rate increases. Thus, there is a tradeoff between switching speed and power requirements.

Moreover, since the voltage fluctuation during the switching operations in accordance with the invention can be as small as one battery cell voltage (e.g. 3.6V for Lithium Ion battery cells as compared to the 48V battery pack used in conventional small electric vehicles such as bicycles), the switching transients are smaller both in voltage, current, and torque. If a motor powered by a normal battery is controlled using PWM, there will usually be a large voltage spike whenever the PWM switch is open due to the inductive nature of the motor. In fact, when the switch is open a large voltage can develop causing a spark thereacross as the inductor tries to maintain the current flow. With the present invention, the provision of a variable voltage battery keeps the circuit from opening completely. The battery simply goes from one voltage to another, and part of the battery is always connected to the motor. This provides a continuous current path at all times, except when the voltage has to ramp down to zero. With the inventive VVB, even when the voltage is ramped down to zero a current path can be provided by properly reconfiguring the battery. Therefore, the VVB based operation of the present invention is much gentler, both for driving and for regenerative braking. Adding a filter capacitor as described hereinabove can help to some degree where a VVB is not used, but using the inventive VVB results in better performance for a given size capacitor.

The invention also provides significant advantages over designs using an inverter (e.g. DC to DC converter), as such inverters suffer from significant conversion losses and introduce complexities when trying to charge the battery in a regenerative braking mode.

The configurations of the present invention can also "short-out" (i.e., bypass) a dead or weak battery cell so that the entire battery does not suffer a failure due to a single bad cell. Even multiple bad cells can be bypassed and the battery pack will still perform well, albeit at a reduced maximum voltage. An algorithm can be used to sniff out a weak or bad cell that does not maintain reasonable voltage or current during discharge or misbehaves during re-charging. As will be appreciated by those skilled in the art, such a feature would require current and voltage sensors and a suitable controller. Another algorithm that can be provided in accordance with the invention is one that provides load balancing to keep all the battery cells evenly charged during re-charging or regenerative braking.

It should further be appreciated that the included embodiments describing a plurality of battery cells may also be interpreted as a plurality of battery banks or a plurality of batteries, without departing from the scope of the present invention. For example, each battery cell described herein may consist of two or more battery cells in a series or parallel connection.

FIG. 15a shows an example embodiment of a configured multi-port reconfigurable battery 302 with two (2) ports 309 each having a first electrical output connection 310 and a second electrical output connection 312 in accordance with the present invention. The figure show a single bank of a statically joined plurality of series connected battery cells 300 of a battery 302. A statically joined plurality of series connected battery cells 300 have no additional circuit elements, such as switches, that can break an electrical connection between adjacent battery cells 300. Each such group of statically joined plurality of series connected battery cells 300, is designated as a "Bank". Banks of battery cells 300 can be configured together in series or parallel connection.

In FIGS. 15a, 15c and 15d a single bank of six (6) battery cells 300 of a battery 302 arranged in a series configuration is shown. The series string of 6 batteries are designated "6 s" in FIGS. 15c and 15d in conformity with industry standard designation indicating six (6) cells connected in series. The battery cells 300 are designated Bt1 through Bt6. Each battery cell 300 has a first voltage pole 304 and a second voltage pole 306. The first voltage pole 304 of each battery cell 300 shown is at a higher direct current (DC) voltage potential than the second voltage pole 306, and therefore the first voltage pole 304 is designated as "+" and the second voltage pole 306 is designated as "−".

FIG. 15b shows a battery cell 300 circuit diagram having positive and negative poles. In FIGS. 15a, 15c and 15d, two independent electrical output ports 309 (designated port1 and port2) are shown. Each electrical output port 309 is independent of other electrical output ports 309 that supply energy from the battery to at least one (1) load. Each electrical output port 309 has a first electrical output connection 310 (designated as Vp1_a for port1 and Vp2_a for port2) and a second electrical output connection 312 (designated as Vp1_b for port1 and Vp2_b for port2). The first electrical output connection 310 may function as the positive terminal of a battery 302, while the second electrical output connection 312 may function as the negative terminal of a battery 302, or vice versa.

At least one switching means 308 provides electrical connection between the first voltage pole 304 of each battery cell 300 in the series to a first electrical output connection 310 (designated Vp1_a or Vp2_a) of each port 309. Similarly, at least one switching means 308 provides electrical connection between the second voltage pole 306 of each battery cell 300 in the series to a second electrical output connection 312 (designated Vp1_b or Vp2_b) of each port 309.

In FIG. 15a, the switching means 308 designated sequentially Sp1_a0 through Sp1_a6 connect the poles of the series connected battery cells 300 to the first electrical output connection 310, (designated Vp1_a) of port1. Also, at least one switching means 308, designated sequentially Sp1_b0 through Sp1_b6, electrically connect the voltage poles 306 of each battery cell 300 in the series to a second electrical output connection 312 (designated Vp1_b) of port1. A similar set of switches 308 (designated Sp2_a0 through Sp2_a6) connect the series connected battery cells 300 to the first electrical output connection 310 of port2 and a second set of switches 308 (designated Sp2_b0 through Sp2_b6) connect the series connected battery cells 300 to the second electrical output connection 312 of port2. The switching means 308 may, for example, comprise MOSFET transistors. In some implementations, Pulse Width Modulation or Pulse Density Modulation circuitry is included as part of the switching means 308. In other embodiments, the MOSFET transistors can be configured without PWM or PDM.

The selective opening and closing of these switching means 308 determines whether the first electrical output connection 310 or the second electrical output connection 312 functions as the "+" connection. In FIG. 15a, for example, closing of switches Sp1_b1 and Sp1_a4 allows Vp1_b to function as the positive ("+") battery connection and Vp1_a to function as the negative ("−") battery connection for port1. Similarly, closing of switches Sp2_b6 and Sp2_a2 allows Vp2_a to function as the positive ("+") battery connection and Vp2_b to function as the negative ("−") battery connection for port2. In effect, the ports 309 are shown with opposite polarity.

Furthermore, closing a switching means 308 between a first voltage pole 304 and the first electrical output connection 310, and closing a switching means 308 between a second voltage pole 306 and the second electrical output connection 312 provides a voltage differential at the electrical output connections, and allows current to flow when the battery 302 is connected to a load (or to a battery charging circuit). The battery cells 300 are reconfigured to provide an output voltage that is approximately equal to the voltage summation of the electrically reconfigured battery cells 300, and is in a range between zero volts and the maximum output voltage (positive or negative polarity) for the plurality of series connected battery cells 300. The voltage is determined by the number and technology of the cells provided.

FIG. 15a shows a configuration whereby a voltage equal to the sum of voltages from three (3) cells is realized at port1, with a negative polarity, by closing the switching means 308 (in particular, Sp1_b1) connecting the positive pole of the second battery cell, Bt2, to Vp1_b and closing the switching means 308 (in particular, switch Sp1_a4) connecting the negative pole of the fourth battery cell, Bt4, to Vp1_a. The output voltage, Vout, equals the sum of the voltages of connected battery cells 300 in the series Bt2 through Bt4. For example, if each battery cell 300 is Lithium Ion technology with a nominal voltage of 3.6V, for this configuration of six battery cells 300, Vout=−10.8 volts disregarding any switching and other losses. Also, a positive polarity voltage equal to the sum of battery cell voltages Bt3 through Bt6 is exhibited at port2 because switches Sp2_a2, and Sp2_b6 are closed.

FIG. 15c shows an equivalent circuit diagram of the example embodiment of a configured multi-port reconfigurable battery 302 with two (2) ports 309 in accordance with the present invention. The location of the arrow on the line designated as the first electrical connection and the location of the arrow on the line designated as the second electrical connection, of each port 309, indicates a closed circuit connection at the designated battery cell pole position. For example, in the figure, Vp1_a and Vp1_b connect across 3 battery cells 300. Vp1_a exhibits a negative potential relative to Vp1_b, which exhibits a positive potential. The potential difference, Vout, is equal to the sum of three (3) battery voltages in series, but with negative polarity.

FIG. 15d shows a simplified circuit diagram of an example embodiment of a configured multi-port reconfigurable battery 302 with 2 ports 309 in accordance with the present invention. Only information about the number and labeling of ports 309 connections, and the number of cells in the reconfigurable battery are discernable from the diagram. No information regarding the voltage amplitude or polarity are discernable from the diagram. Nor are details regarding the load on individual battery cells 300 discernable from the diagram.

An alternative example embodiment of a multi-port reconfigurable battery 302 and method in accordance with the present invention is shown in FIGS. 16a through 16c. These Figures show a first bank of statically joined plurality of series connected battery cells 300, designated Bt1 through Bt3, that is joined to a second bank of statically joined plurality of series connected battery cells 300, designated Bt4 through Bt6, in a series connection. In FIG. 16a through 16c, two independent electrical output ports 309 (designated port1 and port2) are shown. At least one switching means 308 provides electrical connection between the first voltage pole 304 of each battery cell 300 in the series to a first electrical output connection 310 (designated Vp1_a or Vp2_a) of each port 309. Similarly, at least one switching means 308 provides electrical connection between the second voltage pole 306 of each battery cell 300 in the series to a second electrical output connection 312 (designated Vp1_b or Vp2_b) of each port 309.

In FIG. 16a, the switching means 308 designated sequentially Sp1_a0 through Sp1_a7 connects the poles of the series connected battery cells 300 to the first electrical output connection 310, (designated Vp1_a) of port1. Also, at least one switching means 308, designated sequentially Sp1_b0 through Sp1_b7, electrically connects the voltage poles of each battery cell 300 in the series to a second electrical output connection 312 (designated Vp1_b) of port1. A similar set of switches 308 (designated Sp2_a0 through Sp2_a7) connect the series connected battery cells 300 to the first electrical output connection 310 of port2 and a second set of switches 308 (designated Sp2_b0 through Sp2_b7) connect the series connected battery cells 300 to the second electrical output connection 312 of port2. A first intermediate switching means 314, designated as SW_µl, is connected between a second ("−") voltage pole 306 of an end positioned battery cell in a first bank, designated as Bt3, and a first ("+") voltage pole 304 of a beginning positioned battery cell in a second bank, designated as Bt4. A second intermediate switching means 316, designated as SW_s2, is connected between a first ("+") voltage pole 304 of a beginning positioned battery cell, designated as Bt1, in a first bank and a second ("−") voltage pole 306 of an end positioned battery cell in a second bank, designated as Bt6. Essentially two (2) groupings of three (3) battery cells 300, referred to as banks, are configured in the example configuration. For each port 309, the first electrical output connection 310 of the two banks are commonly connected. Similarly, for each port 309, the second electrical output connection 312 of the two banks are commonly connected. It should be appreciated that additional banks can be provided in a similar configuration.

The placement of a switching means intermediate between the banks of battery cells 300 effectively separates connectivity between two adjacent cells when the switches are open, resulting in the two banks of battery cells 300 that can be independently configured. In this disclosure, the configuration is named a "circular configuration". Each independent bank of statically joined plurality of series connected battery cells 300 functions in the manner described in the example embodiment of FIGS. 15a through 15c. The switching means 308, first intermediate switching means 314, and second intermediate switching means 316 may be MOSFET transistors with, e.g., Pulse width Modulation or Pulse Density Modulation circuitry included.

If the battery cells 300 to be configured sit in a single bank, closing a switching means 308 between a first voltage pole 304 and the first electrical output connection 310, and closing a switching means 308 between a second voltage pole 306 and the second electrical output connection 312 manifests output voltage. However, if connection is desired between a battery cell 300 that sits in one bank and a battery cell 300 that sits in another bank, either the first intermediate switching means 314 or the second intermediate switching means 316 must be closed to realize voltage between the output connectors 310 and 312. To prevent a short circuit in the series configured battery 302, the first and second intermediate switches 314 and 316 may not both be simultaneously closed. With the first and second intermediate switches 314 and 316 both set in an open state, the two banks are connected in parallel.

FIG. 16a shows a configuration whereby a voltage equal to the sum of voltages from three (3) cells is realized at port1, with a negative polarity, by closing the switching means 308 (in particular, Sp1_b1) connecting the positive pole of the second battery cell, Bt2, to Vp1_b and closing the switching means 308 (in particular, switch Sp1_a5) connecting the negative pole of the fourth battery cell, Bt4, to Vp1_a. The output voltage, Vout, equals the sum of the voltages of connected battery cells 300 in the series Bt2 through Bt4. Also, a positive polarity voltage equal to the sum of battery cell voltages Bt3 through Bt6 is exhibited at port2 because switches Sp2_a2, Sp2_b7, and intermediate switch SW_s1 are closed. The two banks of cells are in series connection because intermediate switch SW_s1 is closed and intermediate switch SW_s2 is open.

FIG. 16b shows an equivalent circuit diagram of the example embodiment of a circular configured multi-port reconfigurable battery 302 with 2 ports 309 in accordance with the present invention. The location of the arrow on the line designated as the first electrical connection and the location of the arrow on the line designated as the second electrical connection, of each port 309, indicates a closed circuit connection at the designated battery cell pole position. The dashed line connecting the first battery cell in the series and the last battery cell in the series indicates a circular configuration.

FIG. 16c shows a simplified circuit diagram of an example embodiment of a configured multi-port reconfigurable battery 302 with 2 ports 309 in accordance with the present invention. Only information about the number and labeling of ports 309 connections, and the number of cells in the reconfigurable battery are discernable from the diagram.

Figures 17A, 17B, 17C:
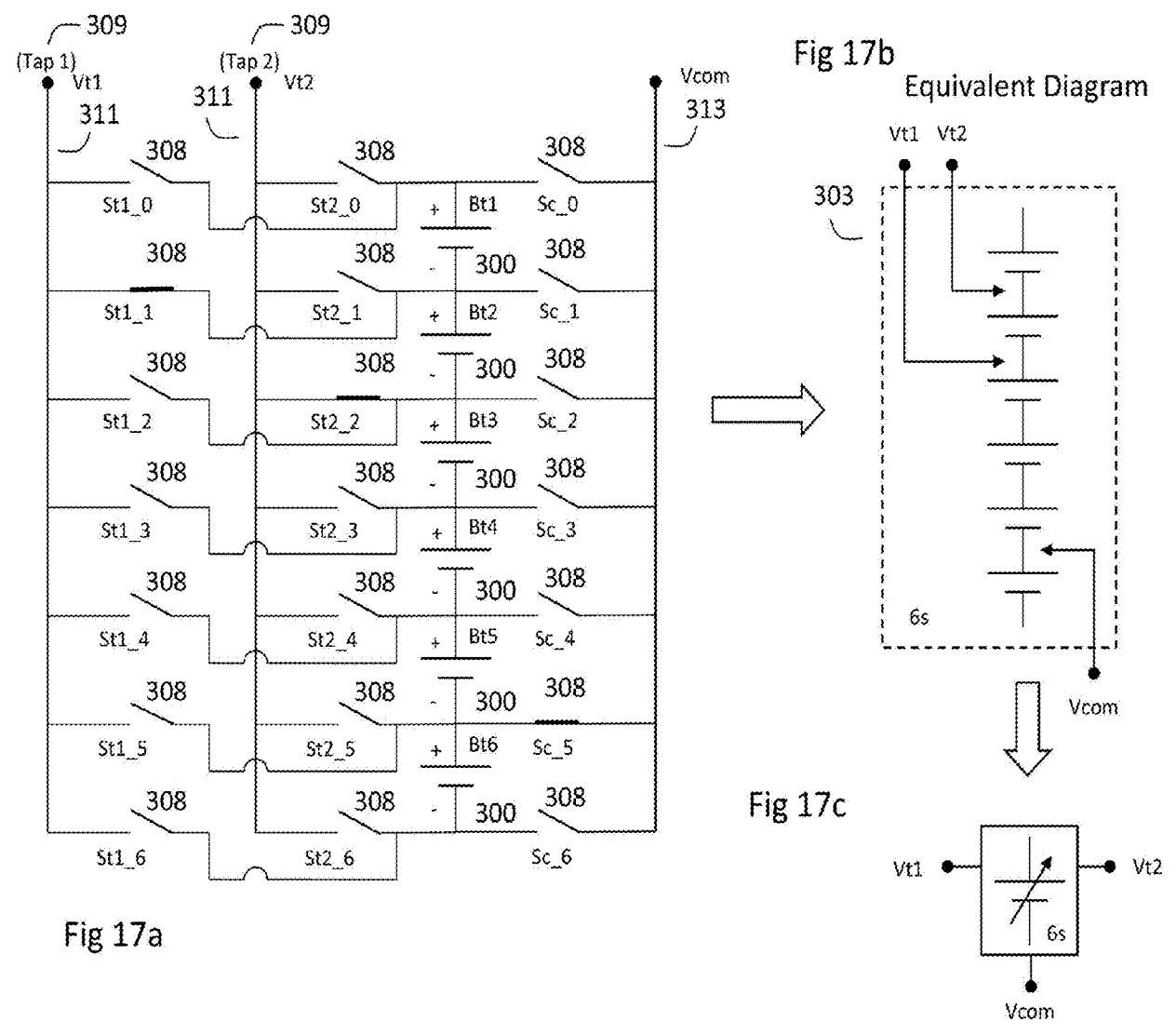

FIG. 17a shows an example embodiment of a configured multi-tap reconfigurable battery 303 with two (2) taps and a common connection in accordance with the present invention. The multi-tap configuration is a specialized implementation of the multi-port configuration. The circuit description is similar to the multi-port embodiments, except that the second electrical output connection 312 of each port 309, shown in FIG. 16a for example, is tied to a common electrical connection, Vcom 313, as shown in FIG. 17a. Each first electrical output connection 310 shown in FIG. 16a for example, is a first connection 311 of a voltage tap 309 in FIG. 17a, that can be moved independently of other connected voltage taps 309. Each first connection 311 of a voltage tap 309 is designated with "Vt" and a number. In this Figure, the potential difference at Vt1 is equal to the voltage sum of three (3) batteries in series, while Vt2 is equal to the sum of four (4) batteries in series, both exhibiting positive polarity. One advantage to the common electrical connection is the reduction of electrical cables and connectors. Another advantage is that the Voltage potential at the second electrical output connection 313 is consistent. The multi-tap design is more restrictive than the multi-port design because movement of the second electrical output connection 313 affects all taps 309.

FIG. 17b shows an equivalent circuit diagram of an example embodiment of a configured multi-tap reconfigurable battery 303 with two (2) taps 309 and a common connection, Vcom 313 in accordance with the present invention.

FIG. 17c shows a simplified equivalent circuit diagram of an example embodiment of a configured multi-tap reconfigurable battery 303 with two (2) taps 309 and a common connection, Vcom 313 in accordance with the present invention. Only information about the number and labeling of taps 309, and the number of cells 300 in the reconfigurable battery 303 are discernable from the diagram.

FIG. 18a shows an example embodiment of a configured circular configuration multi-tap reconfigurable battery 303 with two (2) taps 309 and a common connection, Vcom 313, in accordance with the present invention. The circuit description is similar to the multi-port embodiments of FIG. 16a, except that the second electrical output connection of each tap (port) 309 is tied to a common electrical connection, Vcom 313. Intermediate switches SW_s1 and SW_s2 control the connectivity of the two banks of batteries as shown.

In this Figure, the potential difference at Vt1 is equal to the voltage sum of three (3) batteries 300 in series, while Vt2 is equal to the sum of 4 batteries 300 in series, and both have positive polarity. In the "Circular Configuration", the battery cells 300 are series connected, and the beginning battery cell 300 can be in direct electrical contact with an ending battery cell 300, but a short is prevented because switches SW_s1 & SW_s2 cannot simultaneously be in a closed state.

FIG. 18b shows an alternative equivalent circuit diagram of an example embodiment of a configured circular configuration multi-tap reconfigurable battery 303 with two (2) taps 309 and a common connection, Vcom 313, in accordance with the present invention.

FIG. 18c shows a simplified circuit diagram of an example embodiment of a configured circular configuration multi-tap reconfigurable battery 303 with two (2) taps 309 and a common connection, Vcom 313, in accordance with the present invention.

Either positive or negative voltage is output from each first connection 311 of a tap 309 depending on the battery cell location of the "common" (Vcom 313) connection. If, for example, a battery cell voltage is Vbt (3.6V for most Lithium-Ion cells) and if there are N-cells, the maximum absolute output voltage will be N×Vbt (for the circuits shown in FIGS. 17 and 18, 6×3.6=21.6V). The output voltages at the taps, Vt1 and Vt2 can range between—N×Vbt and +N×Vbt. For example, for the circuit shown FIGS. 17 and 18, the range is +/−21.6V. This maximum range is only achieved if Vt1 and Vt2 are of same polarity. If they are of different polarity, the range is reduced, depending on the connection point for Vcom 313.

As a result of the possible change in polarity, Vt1 and Vt2 can be DC or AC. The taps 309 can change as fast as the battery can be reconfigured, limited by the speed of reprogramming the switches. Periodic and arbitrary waveforms can be produced. For example, Vt1 and Vt2 can be programmed to produce sinusoidal voltages at 60 Hz frequency or 50 Hz frequency to match electricity supplied by utility companies to home consumers in the U.S. and Europe.

Each tap 309 can be used independently from any other tap 309. For example, Vt1 can be used for recharging a subset of battery cells 300 of the battery, while simultaneously, Vt2 can be used to drive a load using another subset of battery cells 300. Changing the configuration of battery cells 300 used to drive a load allows load balancing. Simultaneously, changing the configuration of battery cells 300 during charging allows equalizing the battery charge of the cells. While the series configuration offers load balancing, and has the advantage of a simpler circuit with less switching loss, the "circular configuration" offers increased flexibility to configure cells 300 for load balancing the battery 303, either for recharging or for discharging.

In comparison, The Multi-Port variable voltage battery (VVB) and Multi-Tap VVB behave similarly. One advantage, however, of the multi-port design (described in FIGS. 15 and 16) over the multi-tap design (described in FIGS. 17&18), is that the multi-port reconfigurable battery 302 has multiple voltage ports 309 connected to series connected battery cells 300, without sharing a common reference to an electrical connection. This permits relative voltage "offsets" that are independent from other ports. It is, however, necessary to manage the permissible configurations so as to avoid unwanted current paths and current flow. The multi-port reconfigurable battery 302 (multi-port VVB) can produce multiple phase AC output at full bipolar voltage (+/− max VVB voltage). The multi-port reconfigurable battery 302 can also produce multiple phase AC output at unipolar voltage (between zero volts and max voltage of the variable voltage battery).

Applicant suggests an application of using the multi-port VVB 302 to power a brushless DC motor with 3 separate stator coils (6 wires), which applicant expects will double the peak-to-peak voltage delivered to each coil. This is in contrast with the "Wye" configuration (3 wires) used in other brushless DC motors that is composed of two coils in series between any pair of 3 phases, therefore peak to peak voltage is divided in half for each coil.

Attributes that the multi-port 302 and multi-tap 303 VVB configurations share in common include the ability to recharge and discharge simultaneously at varying voltages, and operation in bipolar modes, producing both positive and negative voltages. The batteries can also drive multiple loads (or multiple phases of the same device) at static or dynamic voltages. (e.g. AC, variable frequency sinusoids, or arbitrary waveforms), and can handle mixed sources or loads, some AC and some DC.

Examples of using these batteries for mixed sources and loads include situations where the recharging source is DC, while the driving load is AC, the recharging source is AC or rectified AC for charging the VVB, while the other ports 309 (or taps) simultaneously output DC of various voltages.

Another example application allows configuring the output of 3 taps (or ports) 309 to be in lock-step so as to produce 3-phase AC. One example is fixed frequency such as 60 Hz to produce 3-phase AC that is used to drive an AC induction motor. Also, using 3 output taps 309, variable frequency 3-phase output voltage can be produced to drive a brushless DC motor, synchronized to its rotation (sensor or sensor-less motor). This permits a more accurate approximation to a sinusoidal waveform than is found using square waves, allowing the motor to run more efficiently and with less vibration.

Another application uses the multi-port 302 or multi-tap 303 VVB to step up or step down voltage, as a power supply. Input voltage, to recharge the VVB, can be as low as one battery cell voltage, enough to recharge each battery cell 300 in round robin fashion, or as high as the sum of all battery cells 300 in series such that all battery cells can be charged simultaneously. Output voltage can be as high as the sum of all battery cells 300 in series, or as low as one battery cell voltage. This minimum can be lowered further with the use of PWM or PDM followed by filtering.

Figure 19A:
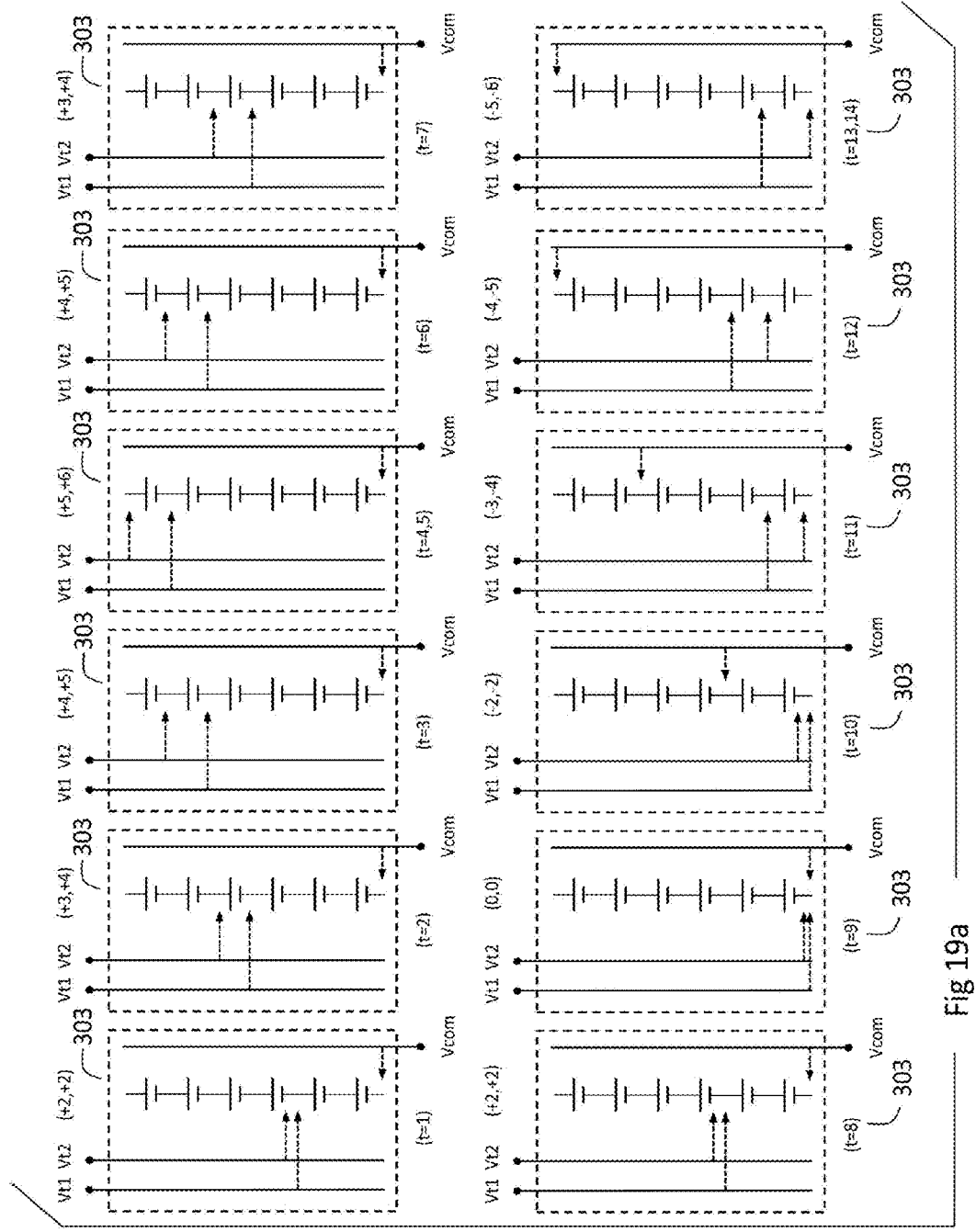
FIG. 19a shows a time lapse series of equivalent circuit diagrams of an example embodiment of a configured multi-tap reconfigurable battery with two taps and a common connection outputting 2 sinusoidal waveforms in lockstep in accordance with the invention.

FIG. 19a shows a simulated time lapse series of equivalent circuit diagrams of an example embodiment of a configured multi-tap reconfigurable battery 303 with two (2) taps 309 and a common connection resulting in output of two (2) sinusoidal waveforms in lockstep. Assuming that each battery cell yields one unit of voltage (e.g. 1 volt per cell), at time t=1, the configuration yields Vt1=2 & Vt2=2, at time t=2, Vt1=3 & Vt2=4, At time t=3, Vt1=4 & Vt2=5. The polarity of the voltages are positive and increasing with time. Note that the second electrical connection, Vcom 313, remains fixed, indicating that the switch at the negative pole of the last battery in the series remains closed. The voltage potentials at Vt1 and Vt2 increase because a progression of switches 308, connecting the output connections 310 to battery cells 300 up the series, close and open as time progresses. At time t=4 and 5, Vt1=5 & Vt2=6, wherein the voltage potential dwells at these voltages for 2 time units. At these time units, the peak voltage is reached. Thereafter, at time t=6, Vt1=4 & Vt2=5, and times t=7 through t=9, the voltages progressively decline with elapsed time (corresponding to a negative slope for a voltage-time trace). At time t=9, Vt1=0 & Vt2=0. At time t=10, Vcom 313 (ground) switches close two (2) battery units closer to the beginning of the series, without changing the switch configurations of Vt1 and Vt2, causing negative voltages at the output connections, Vt1=−2 & Vt2=−2. At time t=11, Vcom 313 switches close at a battery cell closer to the beginning of the series, resulting in a larger negative voltage at Vt1 and Vt2, i.e. Vt1=−3 & Vt2=−4. Note that there is more than one configuration possible to achieve the same negative output voltage (a total 3 configurations are possible in this example). Vcom 313 could be connected to a alternate battery cell 300 closer to the beginning of the series, and Vt1 and Vt2 would close alternate switches to achieve the same negative voltages. At time t=12, Vt1=−4 & Vt2=−5. Note that two (2) configurations are possible for this same output. At time t=13 & 14, Vt1=−5 & Vt2=−6, the peak negative voltage for the waveform is reached. Continuing the cycle will approximate, after filtering, a periodic AC sinusoidal waveform, as shown in FIG. 19*b*.

The time increment need not be equally spaced. For each output tap 309, the duration between reconfigurations can be independently adjusted to output the best approximation of the waveform desired to achieve reduced distortion. Also, an incremental voltage can be achieved by pulse width modulation or dithering within each voltage step.

Figure 19B:
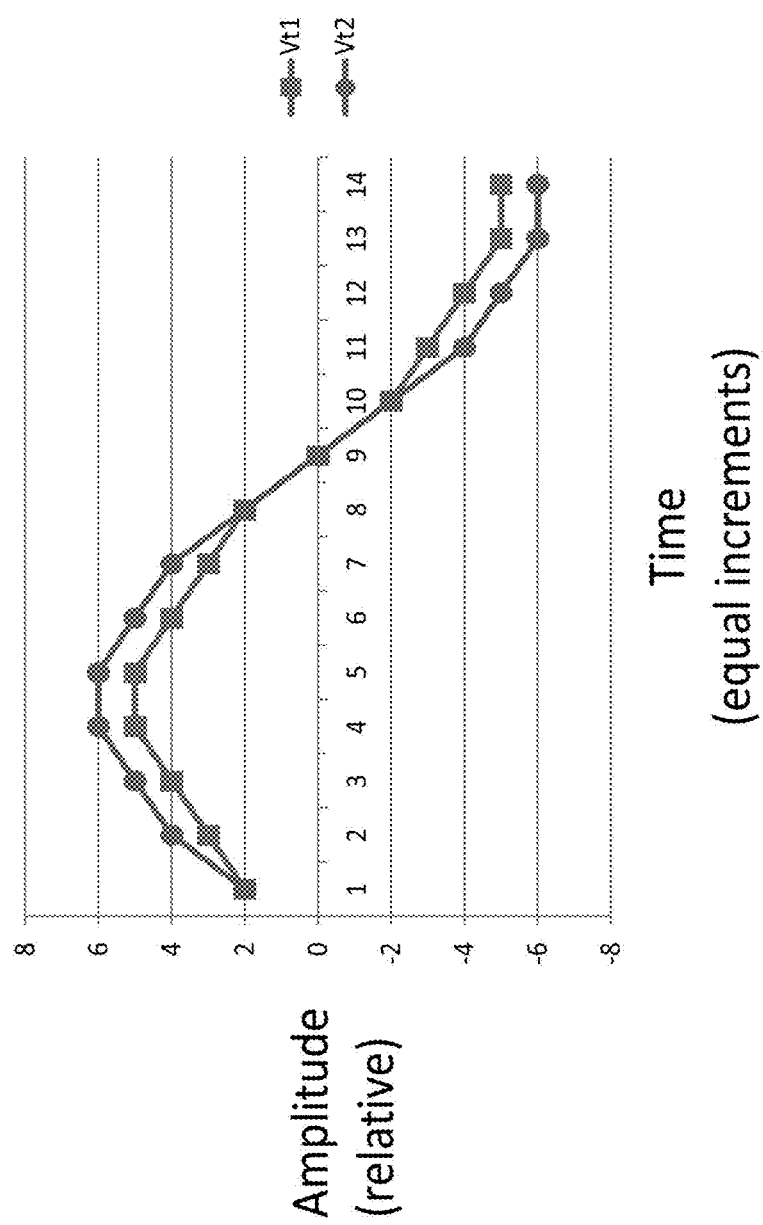
FIG. 19b shows a simulated voltage/time output trace of the time lapse series example embodiment of a configured multi-tap reconfigurable battery with two taps and a common connection outputting 2 sinusoidal waveforms in lockstep in accordance with the present invention.

FIG. 19*b* shows a simulated voltage/time output trace of the time lapse series of an example embodiment of a configured multi-tap reconfigurable battery 303 with two (2) taps 309 and a common connection such that two (2) sinusoidal waveforms in lockstep are output. The curve trace is an approximation of the expected waveform after applying filtering.

FIGS. 20*a* through 20*f* show an example embodiment of the present invention as the battery component for an Uninterruptible Power Supply (UPS). UPS systems are battery backup systems that are typically used by commercial enterprises and consumers to provide uninterrupted power should a power blackout occur (a disruption of voltage output from the utility power source). These devices can also provide consistent power during brownouts (when the voltage output from the utility power source is reduced). They are typically used to power electronics such as computers for a period of time to allow completion of a work task, and allow a controlled shutdown of the computer system. By varying the voltage of the battery in sync with the AC power source, the battery is charged directly from the wall outlet. When the AC power source fails (power outage), the battery controller varies the output voltage to yield 60 Hz AC power. A bit of PWM or voltage dithering at high frequency (>60 Hz) would make AC filter design for smoothing out the discrete voltage steps less complex, and therefore easier to design and build. The number of battery cells 300 required to implement the UPS is proportional to the output voltage per cell. The voltage must match the peak to peak AC voltage, which in the U.S. is typically 120V×sqrt(2)=170V, (120V RMS).

The present invention is ideally suited for such an application because the multi-tap or multi-port variable voltage battery can output AC voltages at frequencies used by the utility industry (60 Hz in the U.S.) to supply power to electronic equipment. The advantage of this system would be high efficiency. A good inverter that produces AC from a battery has 80 to 85% efficiency. With very few components responsible for power loss, a multi-port or multi-tap VVB-based inverter would be more efficient. Loss mechanisms of the VVB include resistive losses of the power FET switches.

Figure 20A:
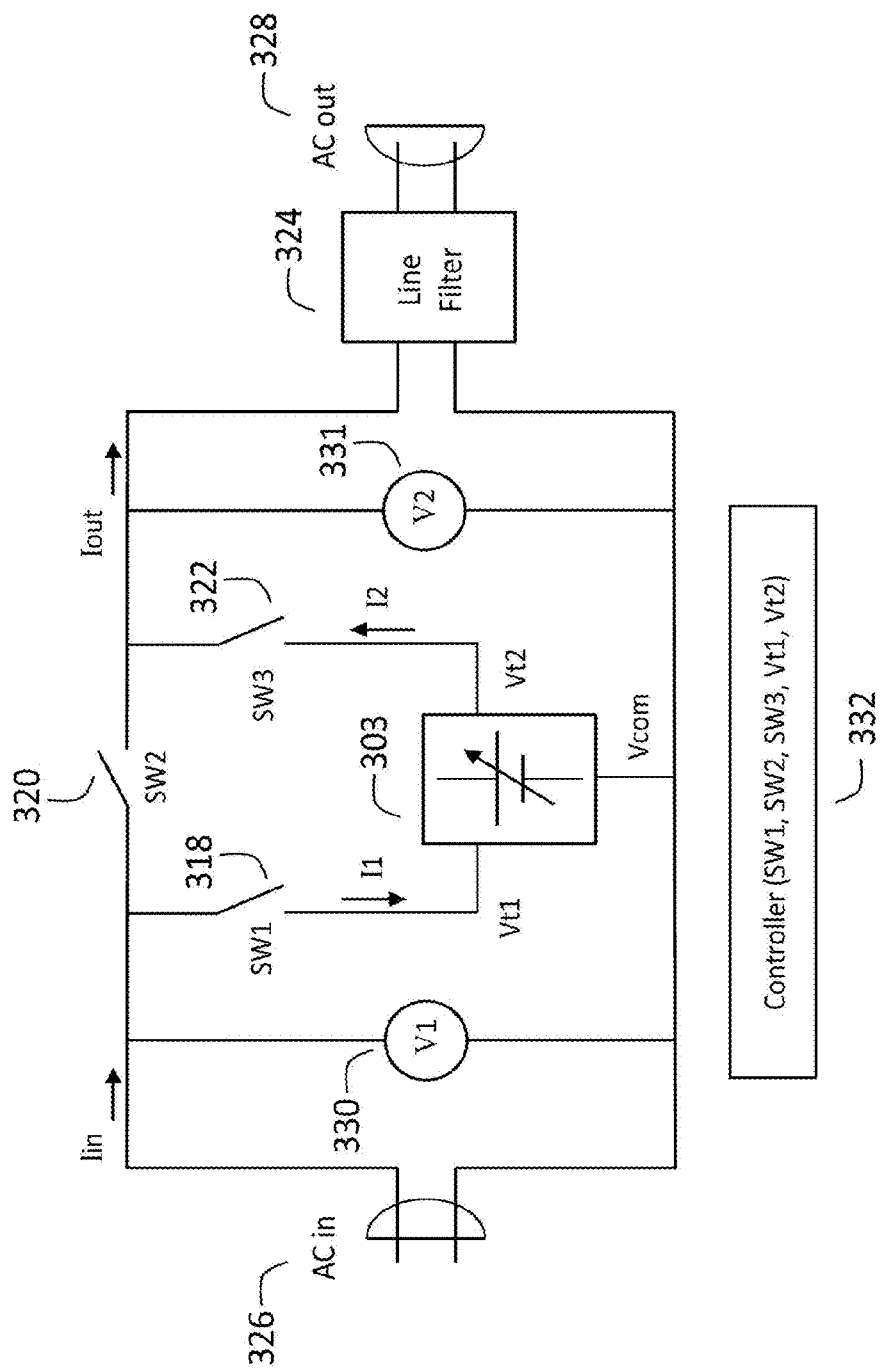
FIG. 20a shows a circuit diagram for an Off-line type Uninterruptible Power Supply (UPS) that uses a Multi-tap reconfigurable battery as the battery source in off-line mode.

FIG. 20*a* shows a circuit diagram for a UPS that uses a Multi-tap reconfigurable battery 303 as the battery source. Alternatively, a Multi-port reconfigurable battery 302 could also be used since the Multi-tap reconfigurable battery 303 is a specialized configuration of the Multi-port reconfigurable battery. AC Main voltage, supplied from a utility company for example, is fed to the circuit through receptacle 326 and monitored by voltmeter 330 (designated V1). Current supplied to recharge the battery is regulated by switch 318 (designated SW1). Switch 320 (designated SW2) allows voltage and current to be supplied directly to the electrical load. Switch 322 (designated SW3) regulates current supply from the battery to the load during a brownout or blackout condition. A voltmeter 331 (designated V2) monitors the voltage supplied by the battery 303. A line filter 324 conditions the AC voltage waveform supplied to the load from the battery 303 and/or main supply 326. A controller 332 monitors voltages V1 and V2 and Currents I1, I2, Iin and Iout. The controller 332 also regulates the internal battery switches 308, 314, 316 that in-turn control the battery output voltage, frequency, and battery cell 300 selection for charging and discharging. Switches 318 and 322 are made redundant if internal battery switches 308 can cause a controlled open circuit condition at the input and output taps/ports 309.

FIG. 20*a* illustrates the UPS in standby mode with all switch connections (designated SW1, SW2, And SW3) open, such that there is no current flow into or out of the Multi-tap reconfigurable battery 303.

Figure 20B:
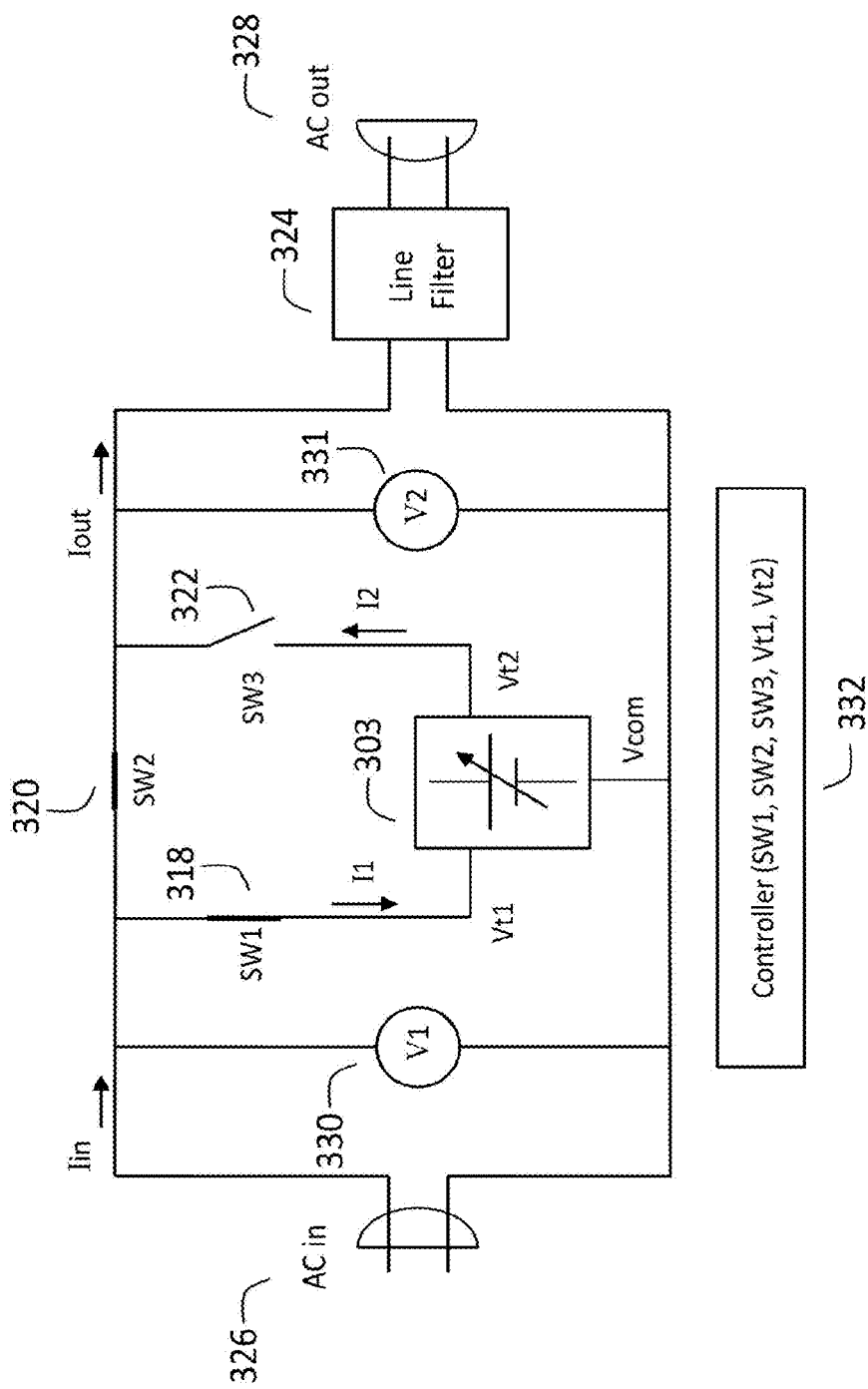
FIG. 20b shows a circuit diagram for an Off-line type UPS that uses a Multi-tap reconfigurable battery as the battery source in recharging mode.

FIG. 20*b* illustrates a UPS in battery recharge mode where the Main 60 Hz 120V AC input 326, for example, is directly connected to battery tap Vt1 through switch SW1. Battery tap Vt1 is programmed by controller 332 to track the incoming 60 Hz frequency and phase. Vt1 voltage is maintained slightly lower then the input main AC 326 in order to recharge the battery 303 at the appropriate rate. Main 60 Hz AC 326 is also connected through a switch, SW2, to the AC output line 328 as a pass-thru to allow the Main 60 Hz 120V AC to drive the load, while the battery 303 maintains full charge.

Figure 20C:
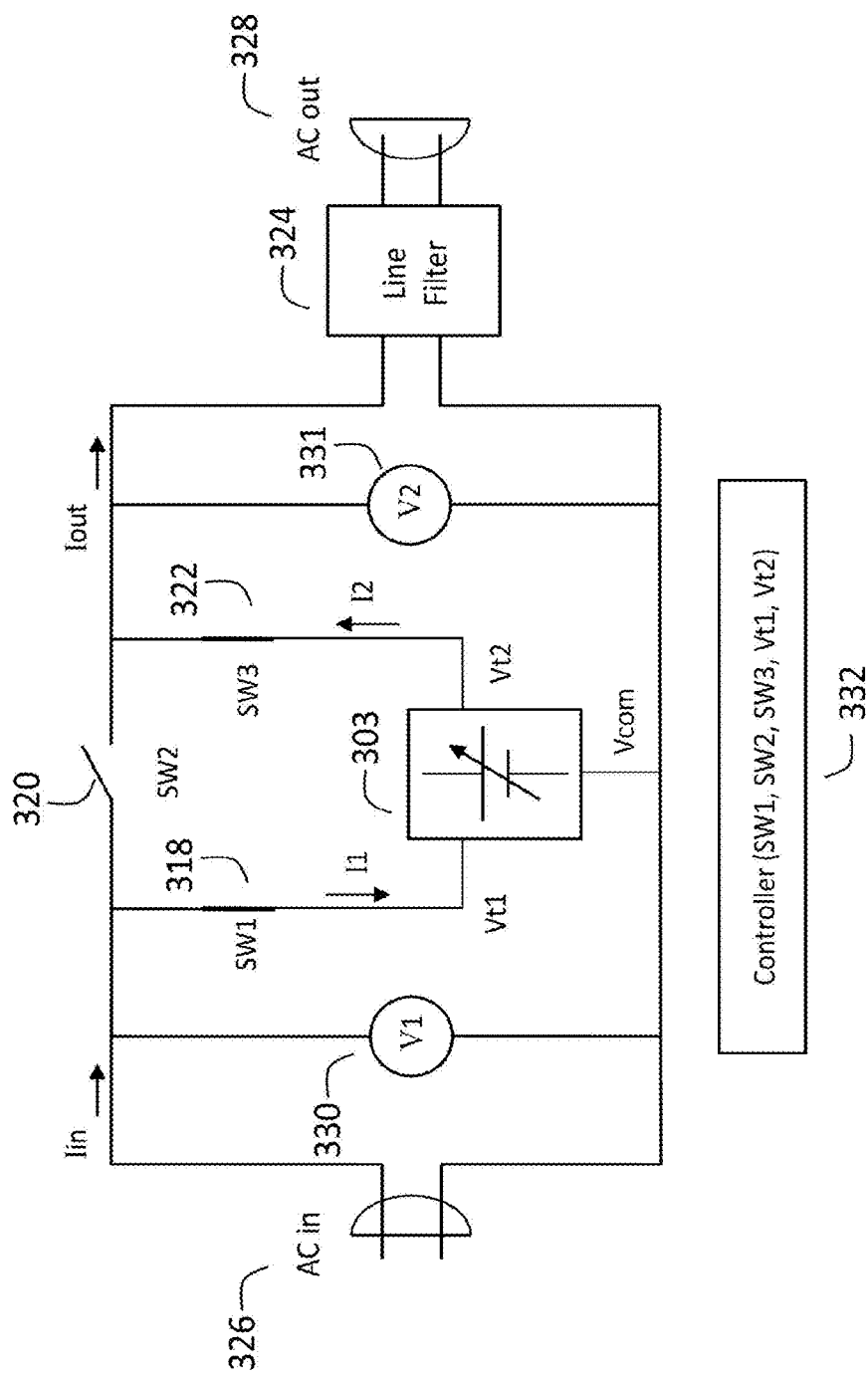
FIG. 20c shows a circuit diagram for an Off-line type UPS that uses a Multi-tap reconfigurable battery as the battery source in recharging and discharging modes.

FIG. 20*c* illustrates a UPS in recharge and discharge mode after detecting a brownout condition. When a brown-out is detected, battery tap, Vt2, is programmed to duplicate the frequency and phase of the main AC 326, but at the correct voltage amplitude. Vt2 is connected to the UPS output, while switch SW2 is opened so that current does not flow to the load directly from the Main AC in 326. The battery 303 continues to charge during a brownout by reconfiguring the battery 303 (reconfiguring the switches 308, 314, 316 between Vt1 and the battery cells 300) to charge at a voltage lower than 120V AC.

Figure 20D:
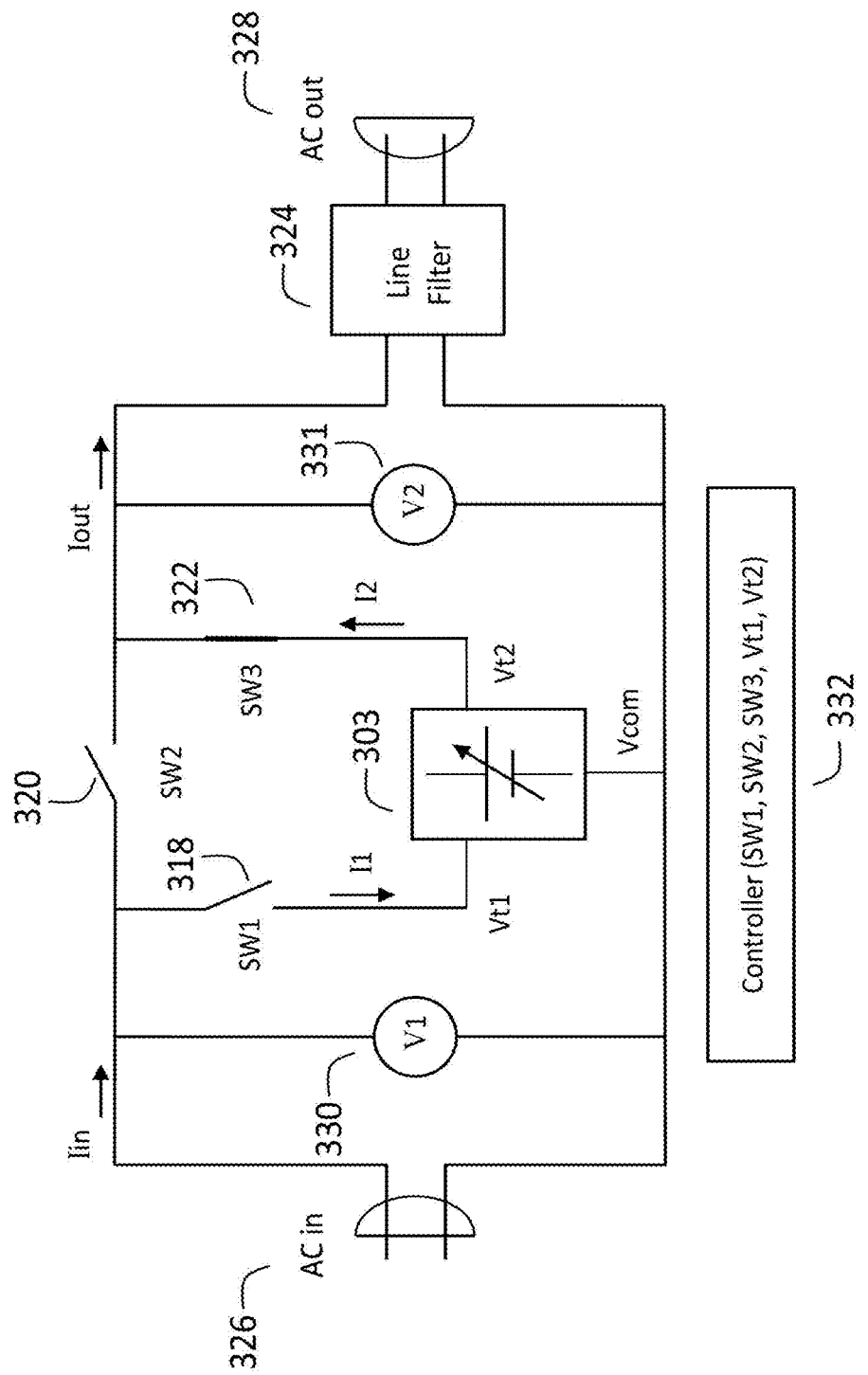
FIG. 20d shows a circuit diagram for an Off-line type UPS that uses a Multi-tap reconfigurable battery as the battery source in discharging only mode.

FIG. 20*d* illustrates the condition where a blackout has occurred and no power is available from main AC in 326. When main AC input 326 completely fails, Vt1 is disconnected by opening switch SW1. Vt2 continues to provide 60 Hz, 120 V to AC out 328 via SW3.

Figure 20E:
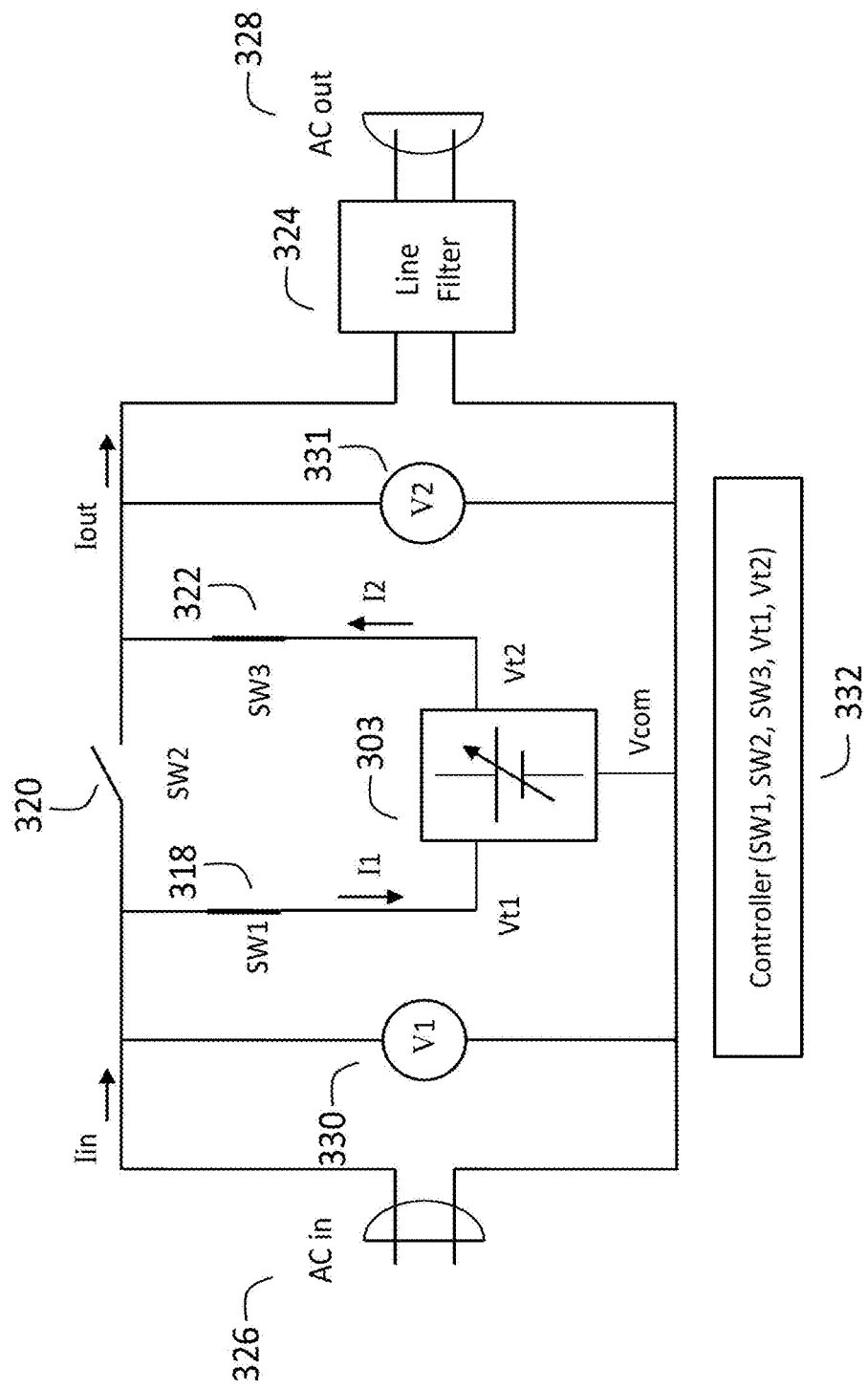
FIG. 20e shows a circuit diagram for an Off-line type UPS that uses a Multi-tap reconfigurable battery as the battery source in recovery and discharging mode.

FIG. 20*e* illustrates the condition at the point where the brown-out condition returns or main AC is restored. Frequency and phase of output, Vt2, is adjusted gradually to match the frequency and phase of the incoming AC 326. Vt1 also matches the incoming frequency and phase before reconnecting to main AC 326. Once the main AC 326 is fully restored and stable, UPS output 328 is connected back to main AC 326 through switch SW2 and Vt2 is disconnected as shown in FIG. 20*b*.

Figure 20F:
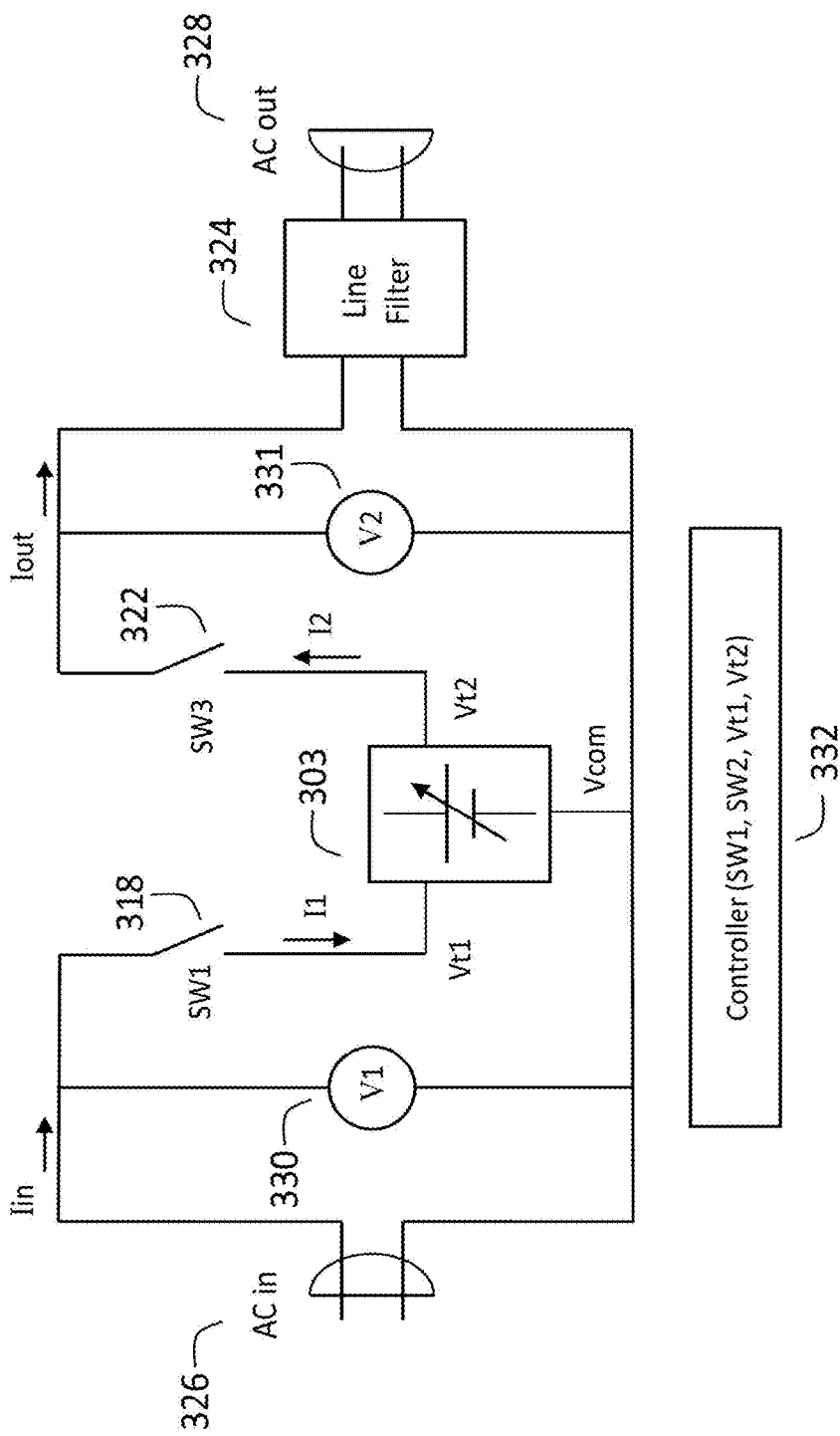
FIG. 20f shows a circuit diagram for an On-line type UPS that uses a Multi-tap reconfigurable battery as the battery source in offline mode.

FIG. 20*f* illustrates a UPS that continually regulates the voltage output to the electrical load. Bypass switch 320 has been eliminated such that all current to the load passes through the battery 303.

FIG. 20*g* illustrates simulated voltage waveforms during a brownout condition showing AC input voltage (designated ACin) at 83% of nominal from Main 326, and AC output voltage (designated ACout) 328 at nominal after conditioning by the UPS line filter 324. FIG. 20*h* illustrates the Voltage waveforms at the battery taps Vt1 and Vt2. The stair-step waveform of Vt1 indicates battery charging incrementally at a voltage 90% of ACin, at a voltage reduced from nominal Main AC voltage. The stair-step waveform of Vt2 indicates voltage output by the battery to the line filter 324 at tap Vt2.

The battery output voltage, Vt2, is corrected to nominal voltage, 120V AC RMS. For a Main AC frequency of 60 Hz, each time increment in FIGS. 20g and 20h is equal to 1/(32*60) of a second since a cycle is composed of 32 increments in this example. The switch positions of the UPS under brownout conditions are shown in FIG. 20c or alternatively in FIG. 20f.

In designing the UPS, since Vt1 and Vt2 are in sync and at the same polarity, full bipolar operation is possible, therefore VVB maximum voltage need only be half of the full AC peak-to-peak voltage swing (e.g. 120V×sqrt(2)/2=about 85V). Furthermore, Since Vt2 output will be a step-wise approximation of a pure sinusoid, a line filter 324 is provided between Vt2 and UPS output to better approximate a 60 Hz sinusoid and remove transient noise, as shown in FIGS. 20a through 20f. Instead of accepting sinusoidal AC input, the Multi-tap reconfigurable battery 303 can alternatively accept rectified (half wave or full wave) before feeding Vt1.

Figure 21A:
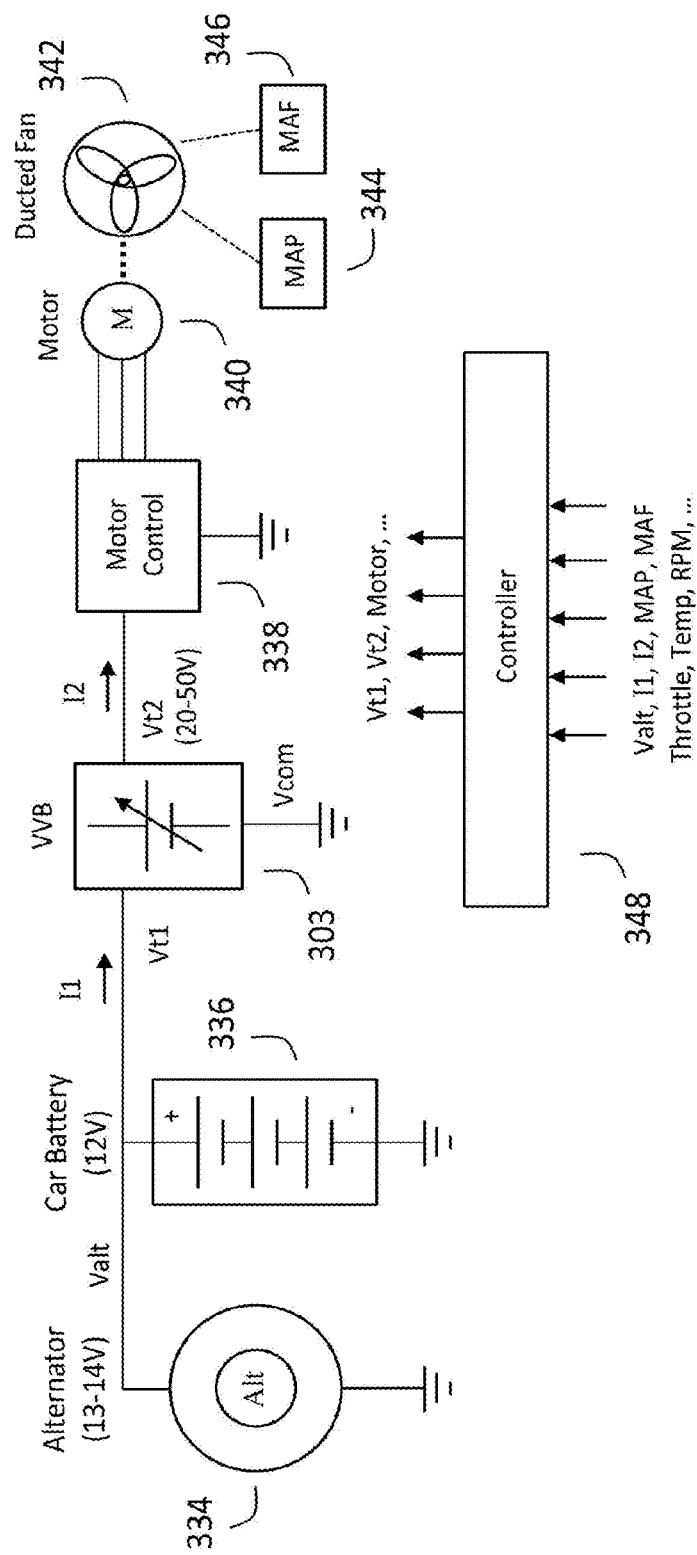
FIG. 21a shows a variable voltage battery configured for use as power supply for an electrical supercharger system.
Figure 21B:
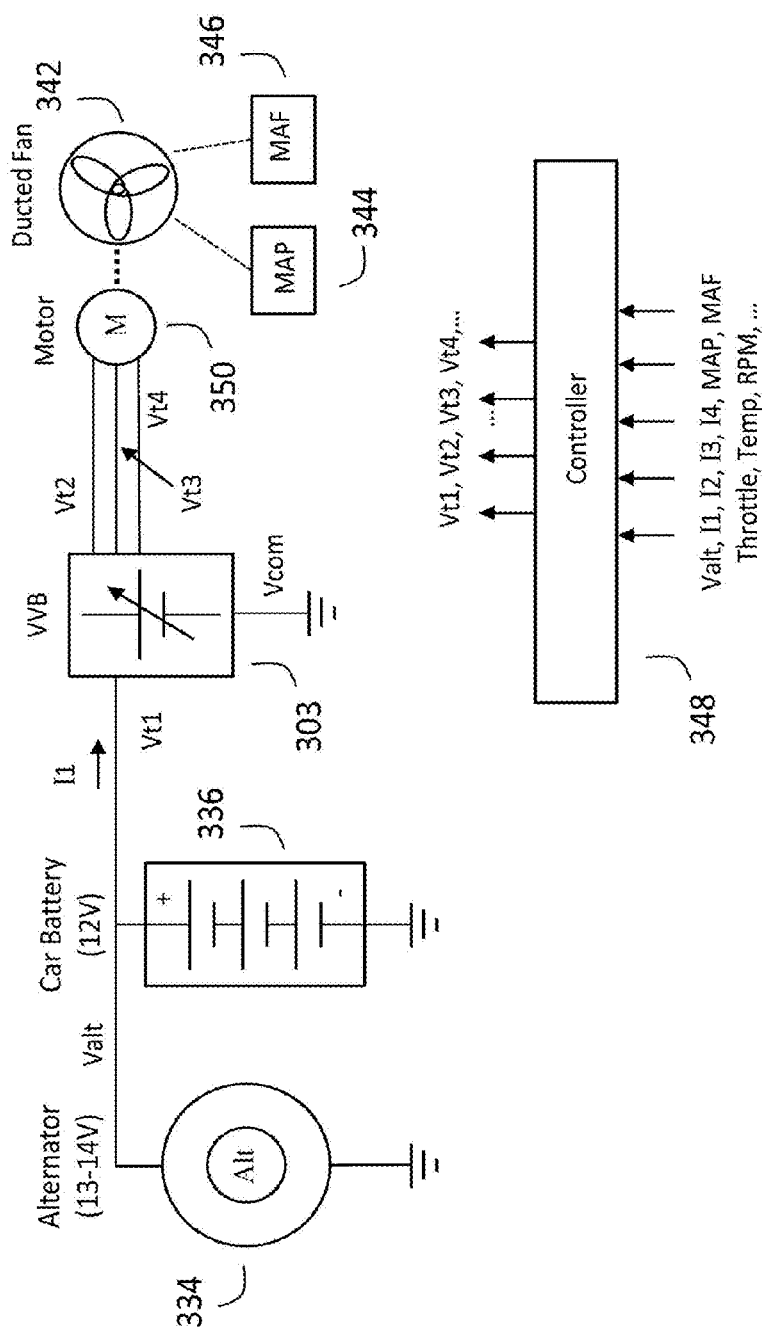
FIG. 21b shows a variable voltage battery configured for use as power supply for an alternative embodiment of an electrical supercharger system.
Figure 21C:
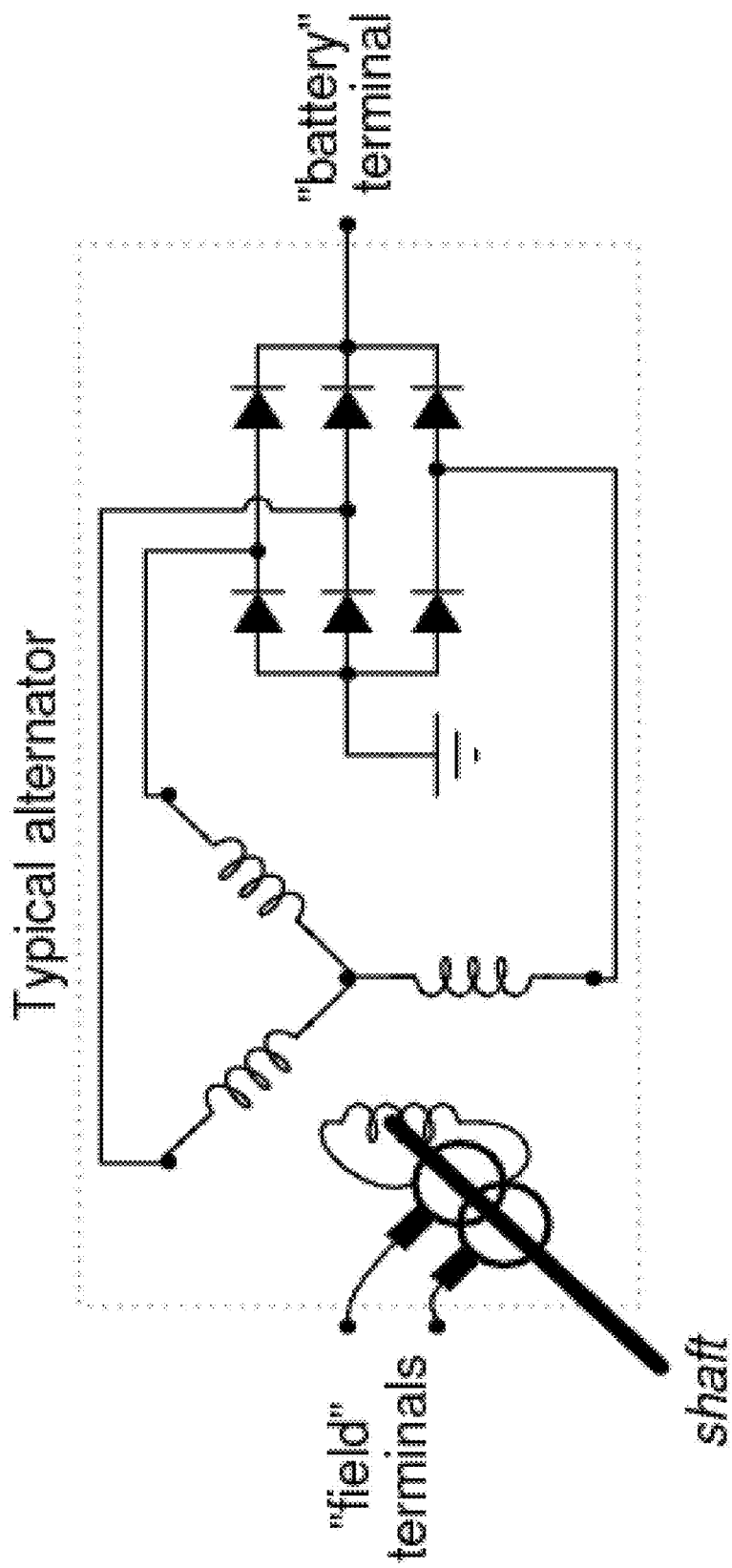
FIG. 21c shows a circuit diagram of a typical alternator used in automotive applications.

FIGS. 21a and 21b show example embodiments of the present invention as a battery component for a power supply for a forced-air induction system, in particular an Electric Super Charger (ESC). FIG. 21c shows the circuit diagram of a typical alternator used in automotive applications. FIG. 21a includes an alternator 334 (designated "Alt") to supply voltage, Valt (13-14V), to recharge a typical 12V lead-acid car battery 336. A Multi-tap reconfigurable battery 303 (designated "VVB") is shown connected in parallel with a car battery 336, and the alternator 334, allowing charging of the multi-tap reconfigurable battery 303 by the alternator 334. An ESC is shown consisting of a Motor Control 338, A 3-phase motor 340, a ducted fan 342 to provide boost, a manifold absolute pressure sensor 344, possibly placed upstream of the ducted fan as well as downstream of the ducted fan to give a pressure differential reading, and a Mass Air Flow sensor 346, to measure airflow within the intake system.

The ducted fan 342 driven by the electric motor 340 and controlled by Motor controller 338 is added to the air intake system between the air filter and throttle valve, for example. The ducted fan 342 compresses incoming air ported to the combustion chamber of the engine, in a manner similar to a super charger or a turbo charger. Typically around 5 psi of boost is provided to produce an increase in engine output power. For a typical small engine, the battery power needed for the electric motor and fan assembly to produce air flow meeting this boost pressure is on the order of several kilowatts at maximum engine RPM. The required maximum power is not available directly from the alternator (typically 60 Amps× 14 Volts=840 Watts). At least 20 to 30 Volts are needed to run the ducted fan to get the speed required for the boost pressure and air flow Also, 50 to 100 Amps are needed at these voltages to get enough power to the motor. Lead-acid automotive batteries nominally supply 12V and multiple lead-acid batteries would need to be connected in series to obtain the required voltage, adding significant weight to the system.

The use of a variable voltage multi-tap (or multi-port) reconfigurable battery 303 overcomes the voltage limitation of lead-acid batteries and power output limitations of alternators. A Multi-Tap (or Multi-Port) reconfigurable battery 303 using high power density Lithium Ion battery cells (e.g. LiFePo batteries) can easily supply 100+ amps in short bursts without risking damage or thermal stability problems. These batteries work well since the combustion engine boost requirements are intermittent, occurring only during heavy acceleration that last tens of seconds or less, allowing the alternator to recharge a subset of battery cells of the Multi-tap reconfigurable battery 303 between bursts. Also the power needed is reduced at lower engine RPM (power=pressure×air flow rate). As a result, under normal driving conditions, the average power needed is only a small fraction of the maximum power required, thereby permitting a battery design having a reduced capacity and weight.

In FIG. 21a, a first tap 309 (designated "Vt1") is connected to the car's alternator 334 and battery 336 to continuously charge the Multi-Tap battery 303 at 13-14 volts, and at a safe charging current. A second tap 309 (designated "Vt2") is connected to the ducted fan motor 340 through a motor speed control unit 338, typically a brushless 3-phase motor. The Multi-Tap battery 303 is configured to provide the high voltage and current needed on Vt2 by the ducted fan motor 340 of the ESC.

A controller unit 348 monitors various sensors including the accelerator pedal position (increased pedal pressure translates to throttle opening requiring increased boost), engine and electric motor RPM, Mass Air Flow (MAF), and Manifold Absolute Pressure (MAP) to prevent overboost, and manifold air temperature to prevent knocking. Battery output voltage (designated "Vt2") and current (designated "I2") are controlled and monitored by the controller unit 348. The controller unit 348 relays information to the electric motor control 340 to regulate the on/off duty cycle and motor speed in response to accelerator pedal position, provided that adequate voltage is available at the Multi-tap battery 303. If inadequate voltage is detected by the controller 348, and surplus battery cell capacity is available, the Multi-tap battery 303 can be reconfigured to provide continued power to the ESC.

The controller unit 348 also controls Multi-Tap battery 303 charging and discharging by configuring the battery taps 309 for load balancing, and monitoring the alternator output voltage (designated "Valt"), and current (designated "I1").

FIG. 21b, shows an alternative configuration similar to FIG. 21a, except the motor control unit 338 from FIG. 21a is absent and the Multi-Tap reconfigurable battery 303 is configured to directly drive the brushless motor 350. The brushless motor 350 typically requires a 3-phase sinusoidal waveform that can be supplied by a Multi-Tap battery 303, as previously described. Output taps Vt2, Vt3, and Vt4 supply phased voltage to the electric motor 350 in response to signals monitored by the controller 348, which also monitors the current (designated "I2", "I3", and "I4") drawn by the electric motor 350. Changes in the voltage required by the electric motor driven ESC may occur as the electric motor 350 speeds up to the desired speed or ESC boost level. If any of the Multi-tap battery cells drop in voltage, the controller 348 can reconfigure the battery 303 to maintain the desired voltage. Suitable waveform filtering and transient suppression circuits can also be supplied for the reconfigurable battery 303 taps (or ports).

The design using a Ducted Fan 342 described in FIG. 21a and FIG. 21b can also be replaced with other types of axial-flow fans, or alternatively can be replaced by radial-flow fans (e.g. centrifugal type), that supply compressed air for forced-air induction of a combustion engine. Combustion engines fitted with the electric motor driven forced-air induction system with a reconfigurable battery 303 can be of the external combustion engine or internal combustion engine types. Use of a Multi-Tap or Multi-port reconfigurable battery 303 for use as a power supply for an ESC as described in FIGS. 21a and 21b, offers the flexibility to mate the power supply to various electrical supercharger system configurations. Power can be supplied for both single phase and 3-phase AC electric motor designs (e.g. Induction), and DC motors (e.g. brushed or brushless). The Multi-Tap or Multi-port reconfigurable battery 303 also allows use of a single standard alternator 334 for charging both a 12V lead-acid car battery 336 and the reconfigurable battery 303. Partial charging of the reconfigurable battery 303 during periods when the vehicle is running, but the ESC is unused, allows load balancing the internal cells of the battery to make sure that power remains available to the ESC on demand. It is also possible with the configuration as shown in FIG. 21a or 21b, to reduce the size of the car lead-acid battery or replace it entirely by a multi-port or Multi-tap reconfigurable battery. A car battery is typically needed to stabilize the voltage out of the alternator and to start the engine. A Multi-port reconfigurable battery can be powerful enough to start the engine through a port and simultaneously be used for the ESC. The ESC described, using a Multi-tap or Multi-port reconfigurable battery 303 can reduce the battery weight of ESC designs while allowing a small engine to behave like a larger engine, saving cost, weight, and fuel.

Although the invention has been described in connection with various illustrated embodiments, numerous modifications and adaptations may be made thereto without departing from the spirit and scope of the invention as set forth in the claims.

What is claimed is:

1. A multi-port reconfigurable battery, comprising at least one bank of:
   a statically joined plurality of series connected battery cells;
   each of said battery cells comprising a first voltage pole and a second voltage pole; and
   a plurality of ports, each port comprising:
      at least one processor controlled switch electrically connected between said first voltage pole of each of said battery cells and a first electrical output connection, and
      at least one processor controlled switch electrically connected between said second voltage pole of each of said battery cells and a second electrical output connection;
   wherein said processor controlled switches are adapted to electrically reconfigure said battery cells by coupling a first voltage pole of one of said battery cells to said first electrical output connection and a second voltage pole of one of said battery cells to said second electrical output connection to provide a reconfigurable battery output voltage between said first and second electrical output connections.

2. The multi-port reconfigurable battery according to claim 1 further comprising:
   for each said port:
   at least one switch electrically connected between said first voltage pole of a beginning battery cell in said statically joined plurality of series connected battery cells and said second electrical output connection.

3. The reconfigurable battery according to claim 1 further comprising:
   for each said port:
   at least one switch electrically connected between said second voltage pole of an end battery cell in said statically joined plurality of series connected battery cells and said first electrical output connection.

4. The multi-port reconfigurable battery according to claim 1, wherein said multi-port reconfigurable battery output voltage is approximately equal to the voltage summation of the electrically reconfigured battery cells, and is in a range between zero volts and a maximum absolute value of an output voltage for said statically joined plurality of series connected battery cells.

5. The multi-port reconfigurable battery according to claim 1 further comprising a plurality of banks of said statically joined plurality of series connected battery cells connected in a parallel configuration.

6. The multi-port reconfigurable battery according to claim 1, wherein a series joining of a first bank of said statically joined plurality of series connected battery cells to a second bank of said statically joined plurality of series connected battery cells comprises:
   a first intermediate processor controlled switch connected between a second voltage pole of an end positioned battery cell in a first bank and a first voltage pole of a beginning positioned battery cell in a second bank;
   a second intermediate processor controlled switch connected between a first voltage pole of a beginning positioned battery cell in a first bank and a second voltage pole of an end positioned battery cell in a second bank; and
   for each said port:
      connection of said first electrical output connection of said first bank to said first electrical output connection of said second bank, and
      connection of said second electrical output connection of said first bank to said second electrical output connection of said second bank;
   wherein said first intermediate processor controlled switch and said second intermediate processor controlled switch cannot simultaneously be in a closed state.

7. The multi-port reconfigurable battery according to claim 6 wherein said second bank comprising a statically joined plurality of series connected battery cells is substituted by a single battery cell.

8. The reconfigurable battery according to claim 1, wherein said second electrical output connection is a common electrical connection connecting all said plurality of ports.

9. The multi-port reconfigurable battery according to claim 1, further comprising at least one of an inductive or a capacitive element for at least one of voltage and current waveform filtering.

10. The multi-port reconfigurable battery according to claim 1, further comprising a voltage monitoring means and a current monitoring means.

11. The multi-port reconfigurable battery according to claim 10, wherein said voltage and current monitoring means comprise a battery cell condition control system.

12. The multi-port reconfigurable battery according to claim 6, wherein said switches and said intermediate switches comprise at least one of solid state and mechanical switches.

13. The multi-port reconfigurable battery according to claim 1, wherein said first voltage pole is at a higher voltage potential than said second voltage pole.

14. The multi-port reconfigurable battery according to claim 1, wherein said battery provides energy for an electrical load comprising a vehicle with at least one electrical motor, electronic equipment, or a computer.

15. The multi-port reconfigurable battery according to claim 14, wherein said vehicle is one of an electric bicycle, an electric scooter, an electric vehicle, a hybrid automobile, a hybrid truck, an electric powered wheelchair, and an electric powered golf cart.

16. The multi-port reconfigurable battery according to claim 1, wherein said battery provides electrical power comprising at least one of alternating current (AC) or direct current (DC) to an electrical load.

17. The multi-port reconfigurable battery according to claim 16, wherein said AC or DC current comprises at least one of a constant, periodic or arbitrary waveform.

18. The multi-port reconfigurable battery according to claim 17, wherein said alternating current comprises one of single frequency waveforms, or variable frequency waveforms, and one of single phase waveforms, or multi-phase waveforms.

19. The multi-port reconfigurable battery according to claim 18, wherein said battery is simultaneously configured to provide alternating current (AC) from at least one said port of said battery and direct current (DC) from at least one other port of said battery.

20. The multi-port reconfigurable battery according to claim 1, wherein said battery is configured to simultaneously provide electrical power to a plurality of electrical loads by connection of each of said electrical loads to a separate one of said plurality of ports.

21. The multi-port reconfigurable battery according to claim 1, wherein:
said battery is charged by connecting at least one AC or at least one DC power source to said battery, and said power source comprises at least one of a generator, a Main AC line, and a vehicle electrical system adapted for regenerative charging.

22. The multi-port reconfigurable battery according to claim 21, wherein an input voltage of said power source for charging said battery is variable from a voltage about equal to one of said battery cells in said battery to a voltage equal to about the sum of all battery cells in said battery.

23. The multi-port reconfigurable battery according to claim 1, wherein said battery is configured to simultaneously charge a portion of said battery cells and discharge an alternate portion of said battery cells by connecting a power source to at least one port and simultaneously connecting at least one electrical load to at least one other port.

24. The multi-port reconfigurable battery according to claim 23, further comprising:
a) at least one switch for regulating power entering said battery;
b) at least one switch for regulating power exiting said battery; and
c) a controller for monitoring voltage, current and regulating at least one processor controlled switch;
wherein said battery functions as an uninterruptible power supply.

25. The multi-port reconfigurable battery according to claim 24, further comprising a switch for allowing power to bypass said battery to supply power to a connected electrical load.

26. The multi-port reconfigurable battery according to claim 24, further comprising a line filter for conditioning power exiting from said uninterruptible power supply.

27. The multi-port reconfigurable battery according to claim 20, wherein said electrical load is at least one electric motor driven forced-air induction system adapted for a combustion engine.

28. The multi-port reconfigurable battery according to claim 27, wherein said electric motor driven forced-air induction system comprises at least one of a single-phase AC electric motor, a three-phase AC electric motor, or a DC electric motor.

29. The multi-port reconfigurable battery according to claim 27, further comprising:
a) at least one switch for regulating power entering said battery;
b) at least one switch for regulating power exiting said battery;
c) a controller for monitoring voltage, current, and regulating at least one processor controlled switch; and d) a controller for monitoring performance of said motor driven forced-air induction system and said combustion engine and regulating power to at least one electric motor of said system;
wherein said battery functions as a power supply for said electric motor driven forced-air induction system.

30. A method for reconfiguring a multi-port battery comprising
for each port of a plurality of ports:
arranging a portion of a statically joined plurality of series connected battery cells into a first configuration adapted to provide a first battery voltage, and
reconfiguring at least a portion of said statically joined plurality of series connected battery cells into a second configuration adapted to provide a second battery voltage;
wherein said reconfiguring comprises:
closing a first processor controlled switch to electrically couple a first voltage pole of a battery cell in said statically joined plurality of series connected battery cells to a first electrical output connection; and
closing a second processor controlled switch to electrically couple a second voltage pole of a battery cell in said statically joined plurality of series connected battery cells to a second electrical output connection.

31. A method in accordance with claim 30, wherein said reconfiguring for a series joined first bank of said statically joined plurality of series connected battery cells to a second bank of said statically joined plurality of series connected battery cells comprises alternatively closing:
a) a first intermediate processor controlled switch connected between a second voltage pole of an end positioned battery cell in said first bank and a first voltage pole of a beginning positioned battery cell in said second bank, or
b) a second intermediate processor controlled switch connected between a first voltage pole of a beginning positioned battery cell in said first bank and a second voltage pole of an end positioned battery cell in said second bank.

32. A method in accordance with claim 30, wherein said processor controlled switches comprise one of pulse width modulation processor controlled switches or pulse density modulation processor controlled switches.

33. A method in accordance with claim 30, wherein said first voltage pole is at a higher voltage potential than said second voltage pole.

34. A method in accordance with claim 30, wherein said second processor controlled switch comprises alternatively switching by pulse width modulation switching or pulse density modulation switching between a first configuration of series connected battery cells exhibiting a first voltage and a second configuration of series connected battery cells exhibiting a second voltage to produce an intermediate output voltage.

35. A method in accordance with claim 30, wherein said multi-port battery is configured to simultaneously provide energy to at least one electrical load and to receive energy for recharging.

36. A method in accordance with claim 35, wherein said electrical load comprises a vehicle with at least one electrical motor, electronic equipment, or at least one computer.

37. A method in accordance with claim 35, wherein:
said multi-port reconfigurable battery is recharged by connecting at least one power source to said battery; and said power source provides regenerative charging via a vehicle braking action that activates at least one electric motor, inducing current flow to said battery.

38. A method in accordance with claim 37, further comprising:
monitoring voltage and current of battery power discharge;
monitoring voltage and current of battery power charge; and
controlling said reconfiguring based on said monitoring.

39. A method in accordance with claim 38, further comprising:
providing an auxiliary power source for said monitoring, for said controlling, and for said reconfiguring of a plurality of series connected battery cells.

40. A method in accordance with claim 30, further comprising:
joining said second electrical output connection for each of said plurality of ports to a common electrical connection.

41. A method in accordance with claim 31, wherein said processor controlled switches comprise one of pulse width modulation processor controlled switches or pulse density modulation processor controlled switches.

42. A method in accordance with claim 31, wherein said first voltage pole is at a higher voltage potential than said second voltage pole.

43. A method in accordance with claim 31, wherein said second processor controlled switch comprises alternatively switching by pulse width modulation switching or pulse density modulation switching between a first configuration of series connected battery cells exhibiting a first voltage and a second configuration of series connected battery cells exhibiting a second voltage to produce an intermediate output voltage.

44. A method in accordance with claim 31, wherein said reconfigurable battery is configured to provide energy to at least one electrical load and to receive energy for recharging.

45. A method in accordance with claim 44, wherein said electrical load comprises a vehicle with at least one electrical motor, electronic equipment, or at least one computer.

46. A method in accordance with claim 44, wherein:
said multi-port reconfigurable battery is recharged by connecting at least one power source to said battery; and
said power source provides regenerative charging via a vehicle braking action that activates at least one electric motor, inducing current flow to said battery.

47. A method in accordance with claim 44, further comprising:
monitoring voltage and current of battery power discharge;
monitoring voltage and current of battery power charge; and
controlling said reconfiguring based on said monitoring.

48. A method in accordance with claim 47, further comprising:
providing an auxiliary power source for said monitoring, for said controlling, and for said reconfiguring of a plurality of series connected battery cells.

49. A method in accordance with claim 31, further comprising:
joining said second electrical output connection for each of said plurality of ports to a common electrical connection.

\* \* \* \* \*